(12) United States Patent  
Matsuoka

(10) Patent No.: US 12,434,376 B2
(45) Date of Patent: Oct. 7, 2025

(54) COUPLING STRUCTURE INCLUDING PLURALITY OF COUPLING PARTS, AND SHAPE-VARIABLE MEMBER

(71) Applicant: FUJIMIYASEISAKUSHO CO., LTD., Arao (JP)

(72) Inventor: Norimichi Matsuoka, Arao (JP)

(73) Assignee: FUJIMIYASEISAKUSHO CO., LTD., Arao (JP)

( * ) Notice: Subject to any disclaimer, the term of this patent is extended or adjusted under 35 U.S.C. 154(b) by 0 days.

(21) Appl. No.: 18/024,566

(22) PCT Filed: Jan. 19, 2023

(86) PCT No.: PCT/JP2023/001445
§ 371 (c)(1),
(2) Date: Mar. 3, 2023

(87) PCT Pub. No.: WO2023/145587
PCT Pub. Date: Aug. 3, 2023

(65) Prior Publication Data
US 2024/0280135 A1    Aug. 22, 2024

(30) Foreign Application Priority Data

Jan. 31, 2022 (JP) ................................ 2022-013667

(51) Int. Cl.
*B25J 1/06* (2006.01)
(52) U.S. Cl.
CPC ..................................... *B25J 1/06* (2013.01)
(58) Field of Classification Search
CPC .. B25J 1/06; B25J 18/02; A63H 33/06; A63H 33/00; F16M 11/38; F16M 2200/061;
(Continued)

(56) References Cited

U.S. PATENT DOCUMENTS 1,006,195 A    10/1911  Frasch
4,942,700 A *  7/1990  Hoberman ............ E04B 1/3211
                                                52/109
(Continued)

FOREIGN PATENT DOCUMENTS

EP      3287177 B1    11/2018
JP    2001104239 A     4/2001
(Continued)

OTHER PUBLICATIONS

Office Action dated May 10, 2022 for corresponding Japanese Patent Application No. 2022-013667, 11 pages including English translation.
(Continued)

*Primary Examiner* — Jessica L Laux
(74) *Attorney, Agent, or Firm* — MH2 Technology Law Group, LLP

(57) ABSTRACT

The invention relates to a shape-variable multiple junction point extendable structure that is configured to extend and contract by coupling a plurality of coupling structures 20. Each of the coupling structures 20 includes two rigid members 21, and a plurality of horizontal coupling parts 40 each attached to a respective one of the rigid members 21. Each of the horizontal coupling parts 40 is capable of being rotatably coupled to each other. In each of the coupling structures 20, the horizontal coupling parts 40 attached to a central part of each of the rigid members 21 are coupled to each other. In each of the coupling structures 20, each of the horizontal coupling parts 40 attached to an end part of each of the rigid members 21 is coupled to the horizontal coupling part 40 of another coupling structure 20.

22 Claims, 48 Drawing Sheets

(58) Field of Classification Search
CPC ........ E04B 1/32; E04B 1/343; E04B 1/34384;
E04B 1/3441; E04B 1/19; E04B 1/1903;
E04B 1/1909; E04B 1/1912; E04B
2001/3223; E04B 2001/3235; E04B
2001/3241; E04B 2001/3247; E04B
2001/1915; E04B 2001/192
See application file for complete search history.

(56) References Cited

U.S. PATENT DOCUMENTS

| | | | | |
|---|---|---|---|---|
| 5,000,713 | A * | 3/1991 | Cheng | A63H 33/06 446/128 |
| 5,069,572 | A * | 12/1991 | Niksic | F16B 7/0486 135/147 |
| 5,074,094 | A * | 12/1991 | Gassler | E04B 1/1906 403/171 |
| 5,095,677 | A * | 3/1992 | Godbout | F16B 12/32 403/176 |
| 5,797,695 | A * | 8/1998 | Prusmack | E04H 15/48 135/145 |
| 6,378,265 | B1 * | 4/2002 | Konstandt | E04B 1/1903 403/171 |
| 6,408,889 | B1 | 6/2002 | Komachi | |
| 9,316,350 | B2 | 4/2016 | Matsuoka | |
| 9,840,837 | B1 | 12/2017 | Matsuoka | |
| 10,267,031 | B2 | 4/2019 | Matsuoka | |
| 10,631,603 | B2 * | 4/2020 | Ma | A45B 25/10 |
| 10,738,458 | B2 | 8/2020 | Matsuoka | |
| 10,844,593 | B1 * | 11/2020 | Matsuoka | E04H 15/50 |
| 11,542,133 | B2 | 1/2023 | Matsuoka | |
| 2015/0300560 | A1 | 10/2015 | Matsuoka | |
| 2016/0319985 | A1 | 11/2016 | Matsuoka | |
| 2018/0019155 | A1 | 1/2018 | Tsang et al. | |
| 2018/0155922 | A1 * | 6/2018 | Matsuoka | E04B 1/3441 |
| 2021/0354503 | A1 | 11/2021 | Matsuoka | |

FOREIGN PATENT DOCUMENTS

| | | |
|---|---|---|
| JP | 2014159070 A | 9/2014 |
| JP | 5837023 B2 | 11/2015 |
| JP | 2016101219 A | 6/2016 |
| JP | 5996713 B1 | 9/2016 |
| JP | 6456881 B2 | 1/2019 |
| JP | 6937527 B1 | 9/2021 |

OTHER PUBLICATIONS

Office Action dated Sep. 27, 2022 for corresponding Japanese Patent Application No. 2022-013667, 10 pages including English translation.

International Search Report dated Mar. 20, 2023 for corresponding Application No. PCT/JP2023/001445 with English translation, 5 pages.

* cited by examiner

COUPLING STRUCTURE INCLUDING PLURALITY OF COUPLING PARTS, AND SHAPE-VARIABLE MEMBER

CROSS-REFERENCE TO RELATED APPLICATIONS

This application is a U.S. National Stage application of PCT/JP2023/001445 filed 19 Jan. 2023, which claims priority to Japanese application No. 2022-013667 filed 31 Jan. 2022, the entire disclosures of which are hereby incorporated by reference in their entireties.

TECHNICAL FIELD

The invention relates to a coupling structure in which two rigid members are rotatably coupled to each other, and a shape-variable multiple junction point extendable structure configured to extend and contract by coupling a plurality of coupling structures.

BACKGROUND ART

The Applicant of the present application has proposed, in PTL 1 and PTL 2, an extendable arm for performing extension and contraction actions by arranging a plurality of cross units in which two rigid members intersect.

In the extendable arm described in PTL 1, the two rigid members have a curved shape such that coupling points at both ends of the rigid members are shifted from a central coupling point. For example, this extendable arm may be configured so that the coupling points at both ends are curved in a side view from the central coupling point, or may be configured so that the coupling points at both ends are curved in a planar view from the central coupling point. In this extendable arm, an arc shaped or spherical shaped structure can be implemented.

In the extendable arm described in PTL 2, the ends of two extendable arms are coupled to each other by a coupled member in which two bent members are rotatably coupled to each other. In this way, an area of a frame constituted by a plurality of extendable arms or a volume of a three-dimensional structure can be changed in accordance with extension and contraction actions of the extendable arms. In this extendable arm, a polygonal shaped structure can be implemented.

Moreover, the Applicant of the present application proposed, in PTL 3, a visual interest stimulating structure that can change from its original shape to a completely different shape, by coupling a plurality of bent rigid members.

CITATION LIST

Patent Literature

PTL 1: Japanese Patent No. 5837023
PTL 2: Japanese Patent No. 5996713
PTL 3: Japanese Patent No. 6937527

SUMMARY OF INVENTION

Technical Problem

In the extendable arms described in PTL 1 and PTL 2, each of the cross units is coupled in a row form. Accordingly, the extendable arm is configured so that two rigid members are overlapped, at a coupling position of two adjacent cross units. Similarly, in the visual interest stimulating structure described in PTL 3, the visual interest stimulating structure is configured so that two rigid members are overlapped, at a coupling point of two adjacent rigid members.

For example, in the extendable arms described in PTL 1 and PTL 2 and the visual interest stimulating structure described in PTL 3, the extendable arm and the visual interest stimulating structure are configured so that two rigid members are coupled by one junction point, by forming a through hole at each of the two overlapped rigid members, and inserting a central coupling shaft into the through hole of each rigid member. In such a configuration, it is time consuming to form a configuration for coupling a plurality of rigid members to one rigid member.

Therefore, the objective of the present invention is to solve this problem, and the present invention provides a coupling structure that can easily implement a configuration in which one rigid member is coupled to a plurality of rigid members, and a shape-variable multiple junction point extendable structure in which a plurality of coupling structures is coupled.

Solution to Problem

In order to achieve this objective, the present invention is configured such as follows.

A coupling structure relating to one aspect of the present invention is a coupling structure used for a shape-variable member configured to extend and contract by coupling a plurality of coupling structures, the coupling structure including:

a first member having a first intermediate coupling part, a pair of first extension parts extending laterally from the first intermediate coupling part, and a first end side coupling part on an end side of each of the first extension parts, the pair of first extension members extending linearly or in an arc shape via the first intermediate coupling part, and a second member having a second intermediate coupling part, a pair of second extension parts extending laterally from the second intermediate coupling part, and a second end side coupling part on an end side of each of the second extension parts, the pair of second extension members extending linearly or in an arc shape via the second intermediate coupling part, wherein one of a convex shaped engaging part and a concave shaped engaged part capable of being engaged with the engaging part is arranged on a first facing part facing the second intermediate coupling part in the first intermediate coupling part, wherein the other of the engaging part and the engaged part is arranged on a second facing part facing the first facing part in the second intermediate coupling part, wherein one of the engaging part and the engaged part arranged on the first facing part engages with the other of the engaging part and the engaged part arranged on the second facing part to form a coupling structure in which the first intermediate coupling part and the second intermediate coupling part are coupled oppositely in a vertical direction, and to enable a rotation action centered on a rotation axis extending in the vertical direction, wherein the engaging part or the engaged part is arranged on a first opposing part positioned on an opposite side in the vertical direction to the first facing part in the first intermediate coupling part, and another coupling structure is coupled by stacking in the vertical direction to enable a rotation action centered on a rotation axis extending in the vertical direction, wherein one of each of a convex shaped end side engaging part and a concave shaped end side engaged part capable of being engaged with the end side engaging part is arranged on each of the first end side coupling part and the second end side coupling part, wherein the first end side coupling part engages with one of the first end side coupling part and the second end side coupling part of the another coupling structure to enable a rotation action centered on a rotation axis extending in the vertical direction, wherein the second end side coupling part engages with the other of the first end side coupling part and the second end side coupling part of the another coupling structure to enable a rotation action centered on a rotation axis extending in the vertical direction, and wherein the first member and the second member constituting one of the coupling structures intersect in an X-shape when seen from the vertical direction by positioning the first end side coupling parts on different sides straddling the second member and positioning the second end side coupling parts on different sides straddling the first member.

Advantageous Effects of Invention

According to the present invention, a configuration for coupling one rigid member to a plurality of rigid members can be easily implemented.

DESCRIPTION OF EMBODIMENTS

Figure 1:
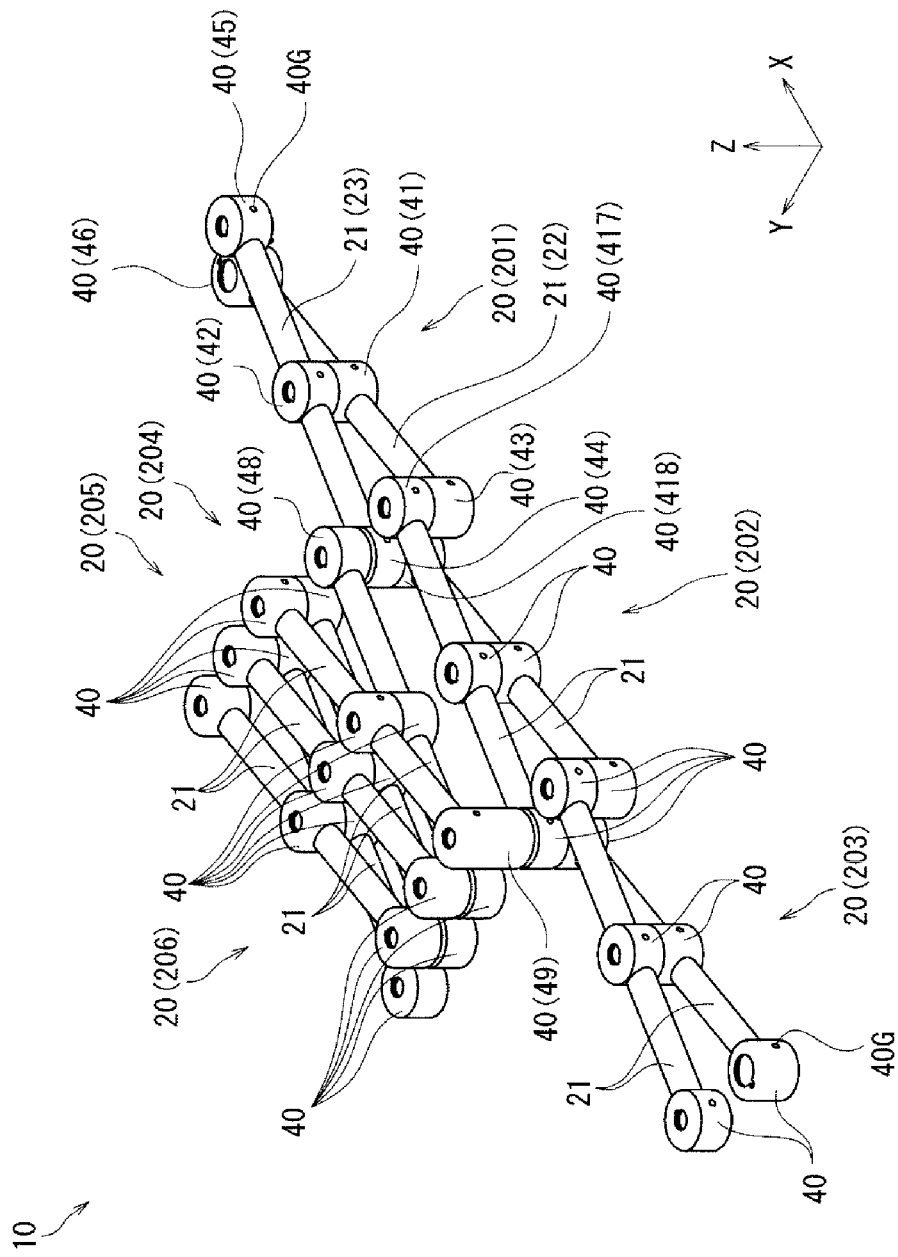
FIG. 1 is a perspective view of a multiple junction point extendable structure relating to a first embodiment of the present invention.

A multiple junction point extendable structure relating to one aspect of the present invention is
a multiple junction point extendable structure including a plurality of coupling structures in which two rigid members arranged overlapped in an overlapping direction are rotatably coupled around an axial line parallel to the overlapping direction, the multiple junction point extendable structure configured to extend and contract by coupling the plurality of coupling structures,
each of the plurality of coupling structures includes
the two rigid members, and
a plurality of horizontal coupling parts each provided at a respective one of the two rigid members,
each of the plurality of horizontal coupling parts includes
a pair of first surfaces facing opposite each other, and
a second surface coupling outer edge parts of the pair of first surfaces, and to which the rigid members are coupled,
a convex part, or a concave part into which the convex part is capable of being inserted, is formed on one of the pair of first surfaces,
the convex part provided on the horizontal coupling part is inserted into the concave part provided on the other of the horizontal coupling parts to enable two of the horizontal coupling parts to be rotatably coupled around an axial line parallel to the overlapping direction,
in each of the plurality of coupling structures, an intermediate coupling part, which is one of the plurality of horizontal coupling parts provided on each of the two rigid members, is rotatably coupled around an axial line parallel to the overlapping direction, and
in each of the plurality of coupling structures, at least one part excluding the intermediate coupling part, from among the plurality of horizontal coupling parts provided on one of the two rigid members, and at least one part excluding the intermediate coupling part, from among the plurality of horizontal coupling parts provided on the other of the two rigid members, are rotatably coupled to the horizontal coupling part of another coupling structure around an axial line parallel to the overlapping direction.

According to this configuration, the plurality of horizontal coupling parts can be coupled so as to be overlapped, by simply inserting the convex part into the concave part. The plurality of horizontal coupling parts can be coupled without a limit of number, by having the plurality of horizontal coupling parts overlapped. As a result of this, a configuration in which three or more rigid members are coupled by two or more junction points can be easily implemented. Moreover, the coupling of the horizontal coupling parts can be released, by simply removing the convex part from the concave part.

According to this configuration, an ornament or the like can be attached to the convex part and the concave part.

In the multiple junction point extendable structure, the convex part or the concave part may be formed on the other of the pair of first surfaces.

According to this configuration, by overlapping three or more horizontal coupling parts, the number of rigid members coupled to one rigid member, in other words, the number of junction points of the rigid members, can be increased.

In the multiple junction point extendable structure, the convex part may have a truncated cone shape or a cone shape with a smaller diameter as it approaches a distal end part, and the concave part may have a truncated cone shape or a cone shape with a smaller diameter as it approaches a bottom part.

For example, in the case where the convex part and the concave part both have a columnar shape, in order for the convex part to be surely inserted into the concave part, it is necessary for the inner diameter of the concave part to be larger than the diameter of the convex part. In this way, in a state where the convex part is inserted into the concave part, there is the possibility of the horizontal coupling part that includes the convex part being unstable with respect to the horizontal coupling part that includes the concave part.

According to this configuration, the convex part and the concave part both have a truncated cone shape or a cone shape. Accordingly, even in the case where the size of the convex part and the size of the concave part are the same, the convex part can be inserted into the concave part. In this way, at the time when the convex part is inserted into the concave part, unstableness of the horizontal coupling part that includes the convex part with respect to the horizontal coupling part that includes the concave part can be made smaller than that of a configuration in which the convex part and the concave part both have a columnar shape.

The multiple junction point extendable structure may further include at least one plate shaped member. Moreover, in the multiple junction point extendable structure, a groove part may be formed on at least one of the pair of first surfaces, and each of the plate shaped members may be fitted with the groove part of at least one of the horizontal coupling parts.

According to this configuration, by having the multiple junction point extendable structure include a plate shaped member mounted in the groove part, the multiple junction point extendable structure can be configured in a plane shape. In this way, the usage value of the multiple junction point extendable structure can be increased.

The multiple junction point extendable structure may further include a holding mechanism for holding the coupling of two horizontal coupling parts.

According to this configuration, by having the multiple junction point extendable structure include a holding mechanism, the possibility of the coupling of two horizontal coupling parts being unintentionally released can be reduced.

In the multiple junction point extendable structure,
the holding mechanism may include
a projection provided on one of an outer side surface of the convex part and an inner side surface of the concave part,
an annular groove formed across the entire periphery of the other of an outer side surface of the convex part and an inner side surface of the concave part, and
a notched part in which the other of an outer side surface of the convex part and an inner side surface of the concave part is cut out to enable passage of the projection, the notched part communicates between the annular groove and the outside of the horizontal coupling part along an insertion direction of the convex part to the concave part.

By having the projection pass through the notched part, coupling and releasing of two horizontal coupling parts can be easily performed. In a state where the convex part is inserted into the concave part, at the time when the projection is not overlapped with the notched part in a planar view, the convex part can be prevented from being pulled out from the concave part.

In the multiple junction point extendable structure, the rigid member may have a bent rod shape.

According to this configuration, the multiple junction point extendable structure can extend and contract in a curved direction.

In the multiple junction point extendable structure,
each of the horizontal coupling parts of the two rigid members may include the intermediate coupling part, a one side coupling part, and an other side coupling part,
in one of the two rigid members, when seen from the overlapping direction, a first virtual line, from the one side coupling part to the other side coupling part via the intermediate coupling part, may have a V-shape, and
in the other of the two rigid members, when seen from the overlapping direction, a second virtual line, from the one side coupling part to the other side coupling part via the intermediate coupling part, may have a V-shape, and the second virtual line may not intersect the first virtual line.

By coupling a plurality of coupling structures that include horizontal coupling parts with such a configuration, a member capable of shape variation, which has a shape before and after an action that is different to the extent of being beyond anticipation, can be assembled.

In the multiple junction point extendable structure,
the plurality of horizontal coupling parts may include
a low-back coupling part in which a length between the pair of first surfaces of the horizontal coupling part is a first length, and
a high-back coupling part in which a length between the pair of first surfaces of the horizontal coupling part is longer than the first length.

According to this configuration, by using a high-back coupling part, the spacing in an overlapping direction between rigid members attached to each of two coupled horizontal coupling parts can be increased.

According to this configuration, by combining horizontal coupling parts of various heights, the configuration of the multiple junction point extendable structure can easily be made complex.

In the multiple junction point extendable structure,
at least two of the plurality of coupling structures may include an extension coupling part attached to at least one of the rigid members,
each of the extension coupling parts may have an extension part extending from the rigid member in a direction intersecting the overlapping direction, and
the extension part of the extension coupling part may be rotatably coupled, to the extension part of the extension coupling part included in another coupling structure, around an axial line parallel to the overlapping direction.

According to this configuration, two coupling structures can be arranged in a row via the extension coupling part.

In the multiple junction point extendable structure,
the horizontal coupling part may have a fitting part, on the second surface, capable of being fitted with the rigid member of another coupling structure.

According to this configuration, a plurality of coupling structures can be coupled to each other, by simply fitting the fitting part into the rigid member. In this way, since the coupling of a plurality of coupling structures is performed by a simple means, assembly of the members that form the plurality of coupling structures can be easily performed, without using a tool such as a screwdriver.

According to this configuration, by having the fitting part and the rigid member fitted together, the coupling structure can be coupled to another coupling structure. In this way, the plurality of coupling structures can be widened on a virtual surface that intersects the overlapping direction.

In the multiple junction point extendable structure,
at least one of the plurality of coupling structures may include a horizontal joint member,
at least one of the horizontal coupling parts provided on one of the two rigid members of the coupling structure may include a support coupling part,
each of the two horizontal joint members may be rotatably supported, by each of the support coupling parts of the two horizontal coupling parts, around an axial line parallel to the overlapping direction,
the convex part may include
a first convex part provided on the horizontal coupling part, and
a second convex part provided on the horizontal joint member, the second convex part protruding in an intersecting direction that intersects the overlapping direction,
the concave part may include
a first concave part provided on the horizontal coupling part, and into which the first convex part is capable of being inserted, and
a second concave part provided on an opposite side to the second convex part in the horizontal joint member, and into which the second convex part is capable of being inserted in the intersecting direction.

According to this configuration, the plurality of coupling structures can be coupled to each other, by simply inserting the first convex part and the second convex part into the first concave part and the second concave part. In this way, since the coupling of a plurality of the coupling structures is performed by a simple means such as the insertion of a convex part into a concave part, assembly of the multiple junction point extendable structure that includes the plurality of coupling structures can be easily performed, without using a tool such as a screwdriver.

According to this configuration, the coupling structure can be coupled to another coupling structure via the horizontal joint member. In this way, the plurality of coupling structures can be widened on a virtual surface that intersects the overlapping direction.

According to this configuration, since the horizontal joint member is rotatable, one of the two coupling structures coupled via the horizontal joint member can be rotated with respect to the other. In this way, complex actions can be performed by the members that form the plurality of coupling structures.

The multiple junction point extendable structure may further include a vertical joint member rotatably supported, by the horizontal coupling part, around an axial line parallel to the overlapping direction, in the multiple junction point extendable structure, the vertical joint member may include at least one of an insertion part protruding in an intersecting direction that intersects the overlapping direction, and capable of being inserted into the rigid member or the horizontal coupling part of another coupling structure, and an inserted part into which the rigid member or the horizontal coupling part of the coupling structure is capable of being inserted in the intersecting direction.

According to this configuration, by having a plurality of coupling structures coupled via the vertical joint member, the multiple junction point extendable structure can be configured in a three-dimensional manner.

In the multiple junction point extendable structure, the rigid members or the horizontal coupling parts coupled to the vertical joint member via the insertion part or the inserted part may be rotatably supported, by the vertical joint member, around an axial line parallel to the intersecting direction.

According to this configuration, since the rigid members are rotatable, the extension and contraction direction of the multiple junction point extendable structure can be changed.

In the multiple junction point extendable structure, the convex part may be attachable and detachable with respect to the concave part.

According to this configuration, the horizontal coupling parts can be coupled, by simply inserting the convex part into the concave part. Moreover, the coupling of the horizontal coupling parts can be released, by simply pulling out the convex part from the concave part.

In the multiple junction point extendable structure, at least one part of the plurality of horizontal coupling parts may be attachable and detachable with respect to the rigid member.

According to this configuration, the configuration of the multiple junction point extendable structure can be changed in a flexible manner.

In the multiple junction point extendable structure, at least one part of the plurality of horizontal coupling parts may be integrally configured with the rigid member.

According to this configuration, the coupling structure can be configured in a firm manner.

In the multiple junction point extendable structure, the horizontal coupling part may include the intermediate coupling part, a one side coupling part, and an other side coupling part, the rigid member may include a one side rigid member on which the one side coupling part is provided, and an other side rigid member on which the other side coupling part is provided, at least one of the one side rigid member and the other side rigid member may be capable of being selectively coupled at a plurality of relative positions with respect to the intermediate coupling part, and an angle formed by a virtual line coupling the one side coupling part and the intermediate coupling part, and a virtual line coupling the other side coupling part and the intermediate coupling part, may be different in accordance with each of the plurality of relative positions.

According to this configuration, an angle formed by a virtual line coupling the one side coupling part and the intermediate coupling part, and a virtual line coupling the other side coupling part and the intermediate coupling part, can be changed by simply changing the relative positions where the one side rigid member and the other side rigid member are coupled. In this way, in the multiple junction point extendable structure, a plurality of types of coupling structures, in which this angle is different, can be easily formed.

The multiple junction point extendable structure may include a first extendable arm to which the plurality of coupling structures is coupled in a row form, a second extendable arm to which the plurality of coupling structures is coupled in a row form different to the first extendable arm, and an intervening part intervening between the first extendable arm and the second extendable arm to couple the first extendable arm and the second extendable arm, the intervening part constituted by one of the coupling structures, and in the intervening part, at least one of the two rigid members may include the one side rigid member and the other side rigid member.

According to this configuration, in the intervening part, by changing an angle formed by a virtual line coupling the one side coupling part and the intermediate coupling part, and a virtual line coupling the other side coupling part and the intermediate coupling part, an angle formed by the first extendable arm and the second extendable arm can be changed.

According to this configuration, by changing the configuration of the intervening part (for example, the angle mentioned above), the other of the first extendable arm and the second extendable arm can be extended, in conjunction with a contraction of one of the first extendable arm and the second extendable arm. Moreover, at least one of a variation rate and a variation length at the time of extension and contraction of the first extendable arm can be different to at least one of a variation rate and a variation length at the time of an extension and contraction of the second extendable arm.

In the multiple junction point extendable structure, the multiple junction point extendable structure may be a frame having a plurality of corner parts, in the coupling structures arranged at the corner parts, from among the plurality of coupling structures, each of the horizontal coupling parts of the two rigid members may include the intermediate coupling part, a one side coupling part, and an other side coupling part, and in each of the two rigid members, when seen from the overlapping direction, a first virtual line, from the one side coupling part to the other side coupling part via the intermediate coupling part, may have a V-shape.

First Embodiment

Figure 2:
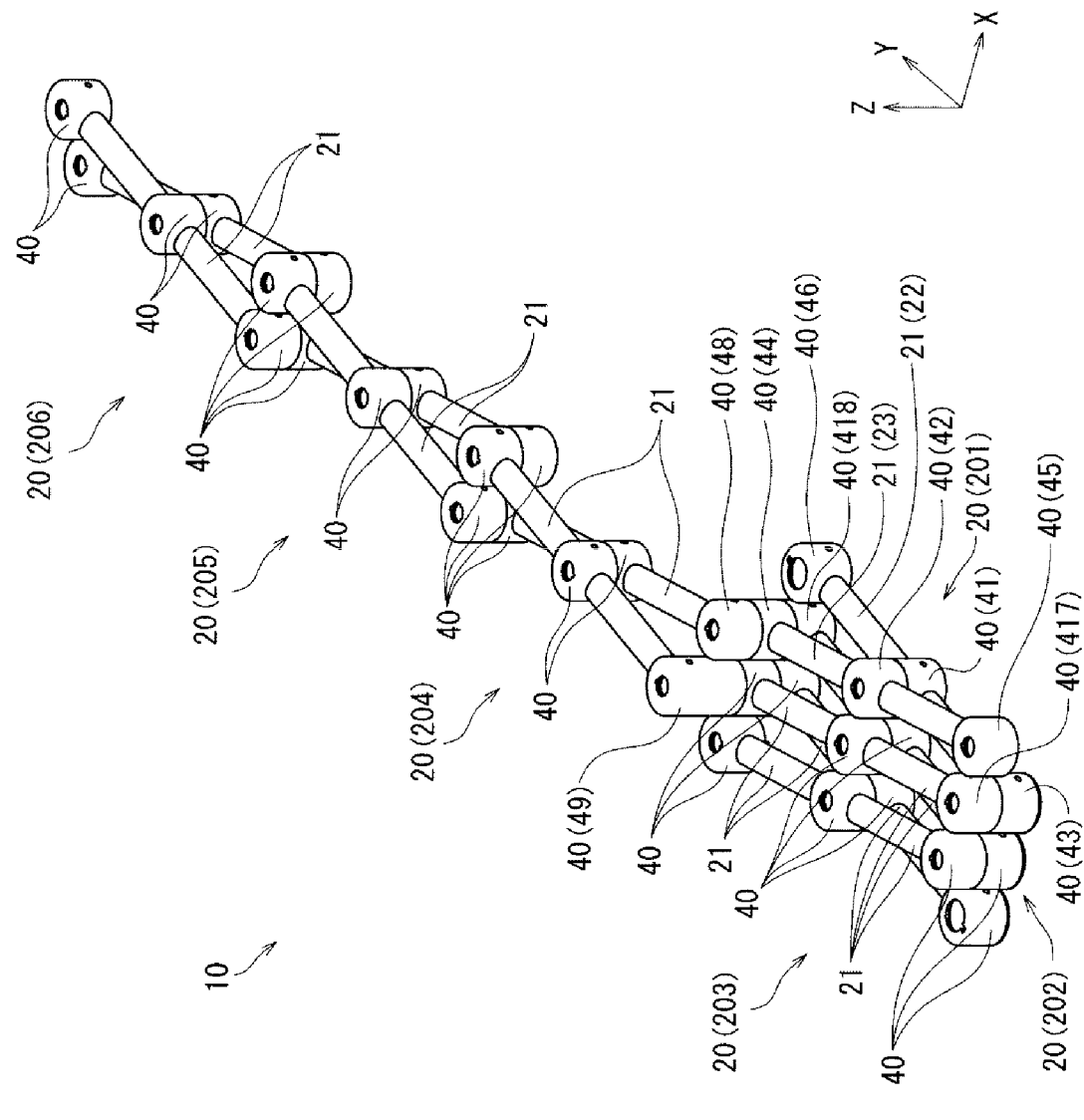
FIG. 2 is a perspective view of a multiple junction point extendable structure to a first relating embodiment of the present invention.

FIG. 1 is a perspective view of a multiple junction point extendable structure relating to a first embodiment of the present invention. FIG. 2 is a perspective view of a multiple junction point extendable structure relating a first embodiment of the present invention. The X-direction, the Y-direction, and the Z-direction of FIG. 1 to FIG. 35 are orthogonal to each other. The X-direction, the Y-direction, and the Z-direction respectively show a first extension and contraction direction, a second extension and contraction direction, and a height direction of a multiple junction point extendable structure. Note that, in this document, while terms showing directions such as "horizontal", "vertical", and "height" are used, these terms do not mean that the usage state and the like of the multiple junction point extendable structure relating to the present invention is limited.

In the first embodiment, a multiple junction point extendable structure 10 includes six coupling structures 20 (coupling structures 201 to 206), such as shown in FIG. 1 and FIG. 2. Note that, the number of the coupling structures 20 included in the multiple junction point extendable structure 10 is not limited to six. The multiple junction point extendable structure 10 may be constituted by only two of the coupling structures 20, may be constituted by three to five of the coupling structures 20, or may be constituted by seven or more of the coupling structures 20. In other words, the multiple junction point extendable structure 10 may include a plurality of the coupling structures 20.

At least a part of the plurality of coupling structures 20 are coupled to each other in a row form. In the first embodiment, three of the coupling structures 201, 202, and 203 are coupled in a row form along the X-direction, and four of the coupling structures 202, 204, 205, and 206 are coupled in a row form along the Y-direction. In other words, the multiple junction point extendable structure 10 includes a first coupling structure group formed by the three coupling structures 201, 202, and 203, and a second coupling structure group formed by the four coupling structures 202, 204, 205, and 206.

As shown in FIG. 1, at the time when the first coupling structure group is extended, the second coupling structure group is contracted. The second coupling structure group extents as the first coupling structure group contracts. Moreover, the first coupling structure group contracts as the second coupling structure group extends. In this way, as shown in FIG. 2, at the time when the first coupling structure group is contracted, the second coupling structure group is extended. In this way, the multiple junction point extendable structure 10 can perform a plurality of extension and contraction actions at the same time.

Figure 3:
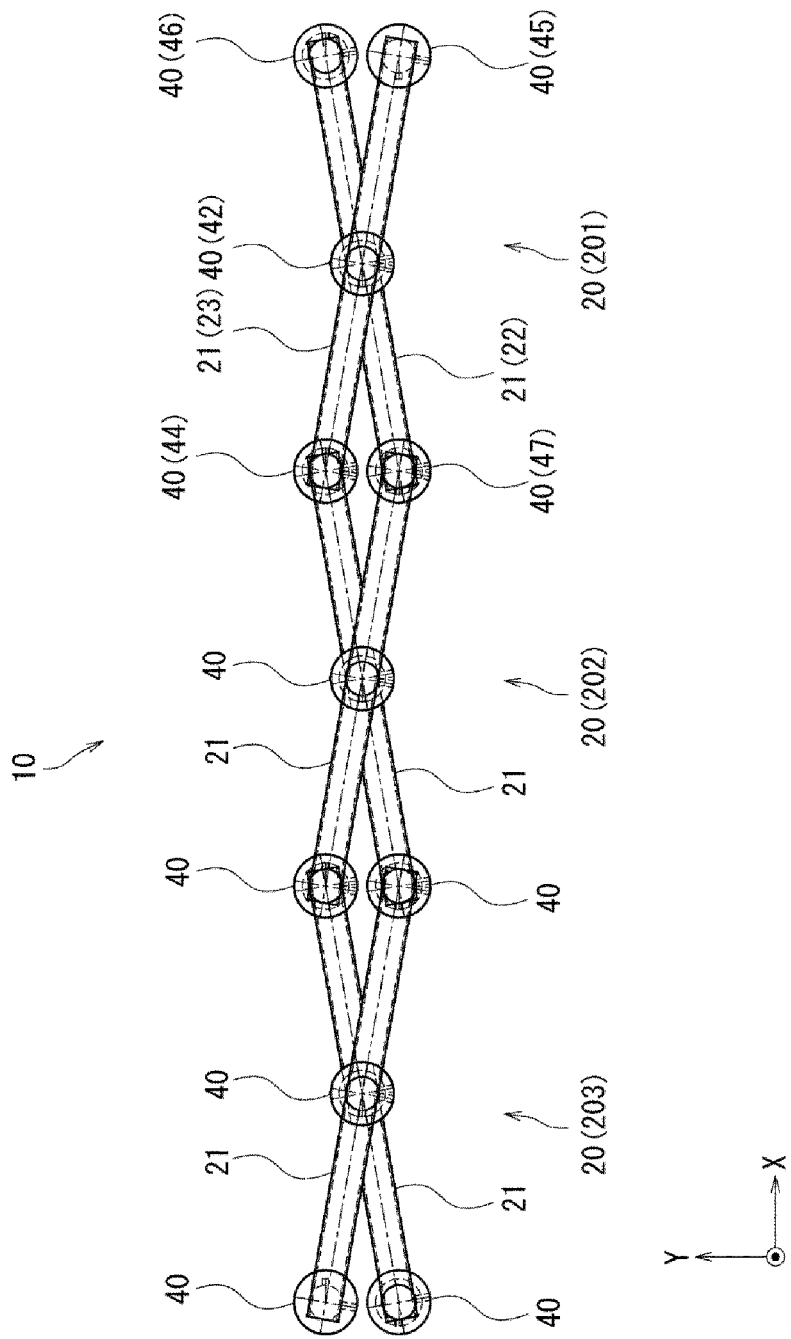
FIG. 3 is a planar view of an extension state of a multiple junction point extendable structure relating to a first embodiment of the present invention.
Figure 4:
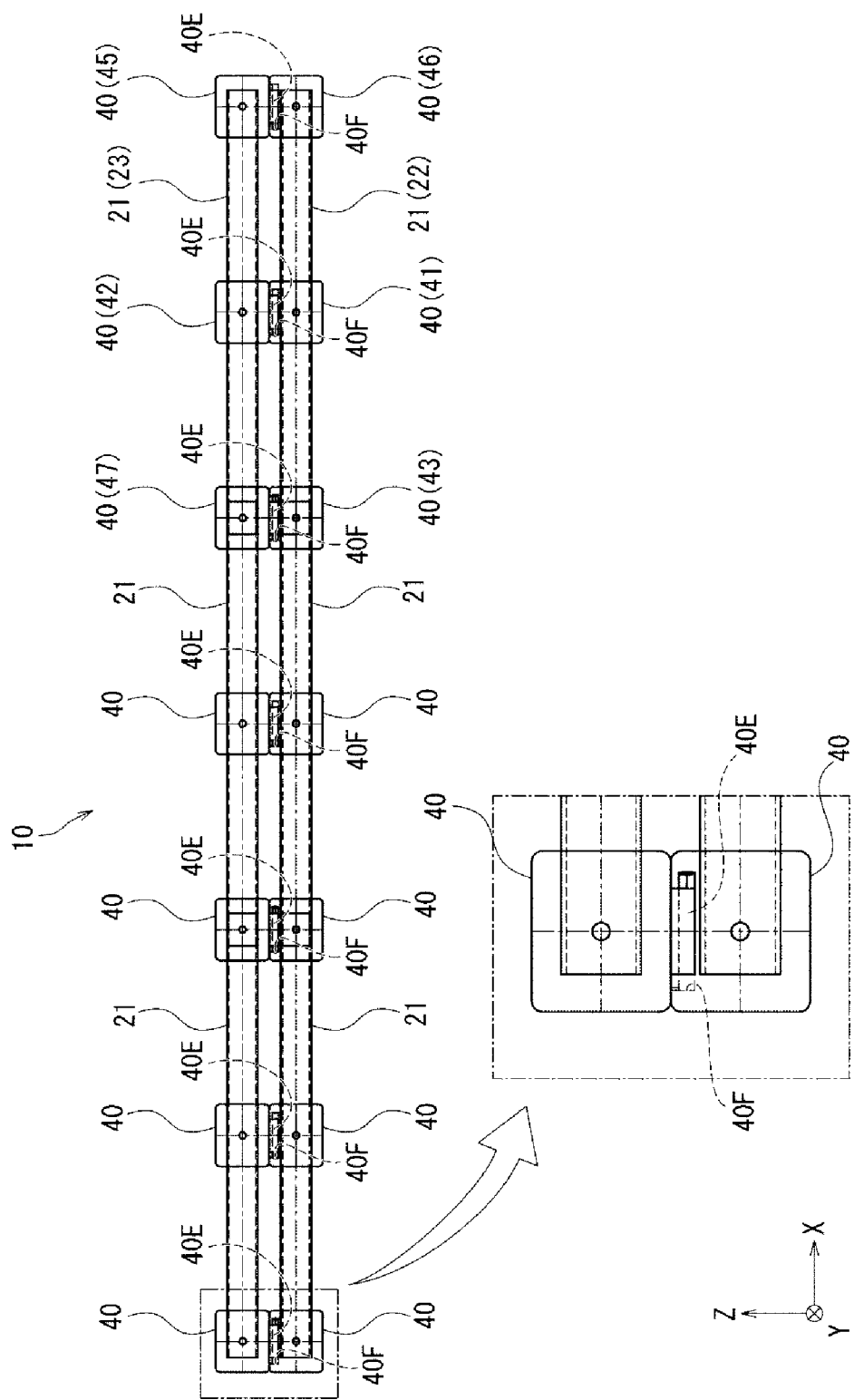
FIG. 4 is a front view of an extension state of a multiple junction point extendable structure relating to a first embodiment of the present invention.
Figure 5:
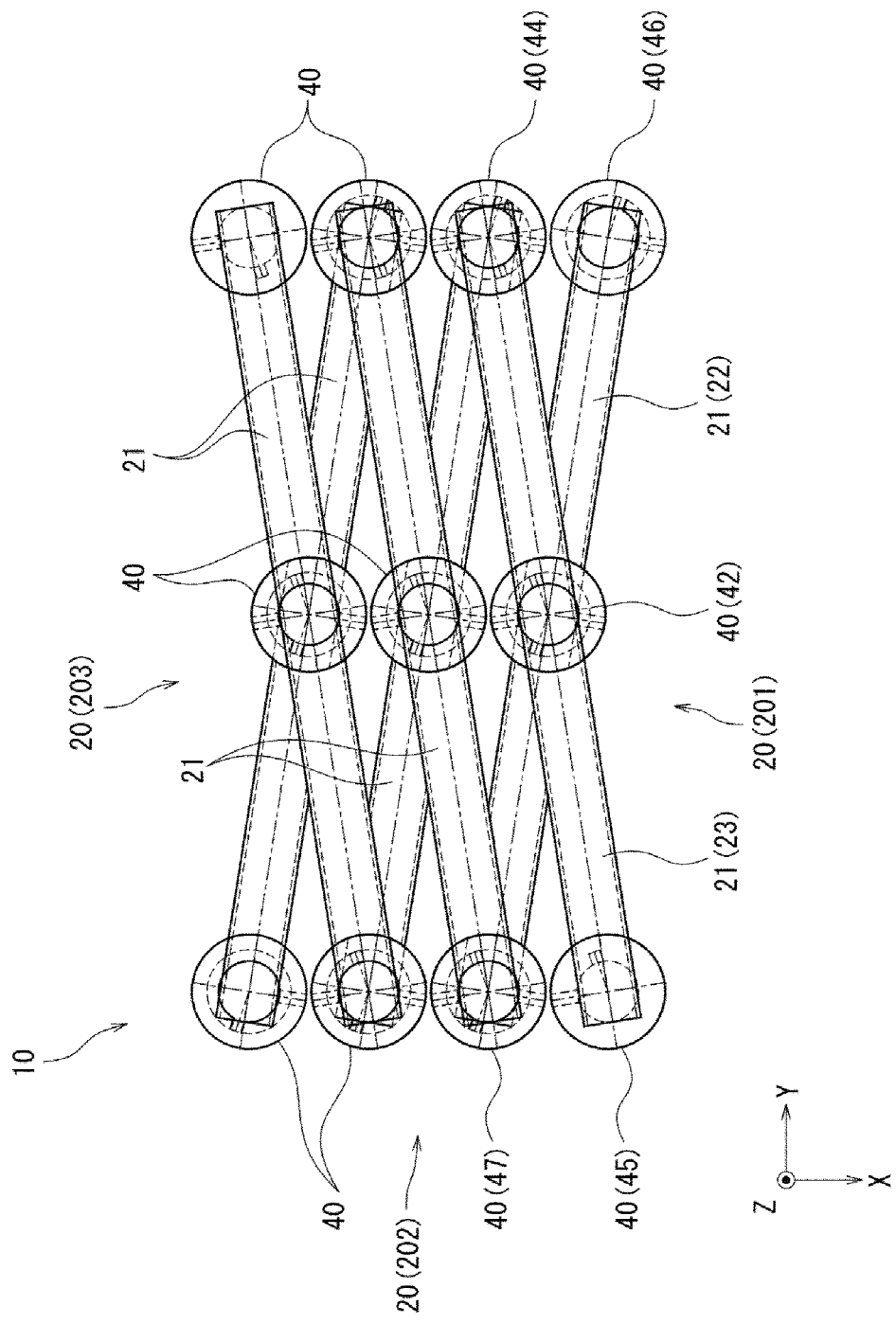
FIG. 5 is a planar view of a contraction state of a multiple junction point extendable structure relating to a first embodiment of the present invention.

The multiple junction point extendable structure 10 may perform only one extension and contraction action at the same time. FIG. 3 is a planar view of an extension state of the multiple junction point extendable structure relating to the first embodiment of the present invention. FIG. 4 is a front view of an extension state of the multiple junction point extendable structure relating to the first embodiment of the present invention. FIG. 5 is a planar view of a contraction state of the multiple junction point extendable structure relating to the first embodiment of the present invention. For example, as shown in FIG. 3 to FIG. 5, the multiple junction point extendable structure 10 may not include the second coupling structure group, and may be constituted by only the first coupling structure group. In other words, the multiple junction point extendable structure 10 may be formed by the three coupling structures 201, 202, and 203. In this case, in the multiple junction point extendable structure 10, an extension action and a contraction action are selectively executed. A state is described, in FIG. 3 and FIG. 4, in which the multiple junction point extendable structure 10 formed by the three coupling structures 201, 202, and 203 is extended. A state is described, in FIG. 5, in which the multiple junction point extendable structure 10 formed by the three coupling structures 201, 202, and 203 is contracted.

As shown in FIG. 1 and FIG. 2, each of the coupling structures 20 includes two rigid members 21 (rigid members 22 and 23), and six horizontal coupling parts 40 (horizontal coupling parts 41 to 46).

Hereinafter, the configuration of the coupling structure 201, from among the six coupling structures 201 to 206, will be described. The coupling structures 202 to 205 have the same configuration or approximately the same configuration as the coupling structure 201. Accordingly, a description of the configurations of the coupling structures 202 to 205 will be, in principle, omitted, and described as necessary.

As shown in FIG. 1, the rigid member 22 is a rod shaped member, which has a circular shaped cross section and is hollow. In other words, the rigid member 22 is a round pipe. Note that, the shape of the rigid member 22 is not limited to a rod shape, which has a circular shaped cross section and is hollow. For example, the rigid member 22 may be a round rod that is not hollow. Moreover, the cross section of the rigid member 22 may not have a circular shape, and may have a square shape. Moreover, the rigid member 22 may not have a rod shape. For example, the rigid member 22 may have a portion, which excludes the coupling portions with the horizontal coupling parts 40, configured in a plate shape.

The rigid member 22 is made of resin. Note that, the rigid member 22 is not limited to resin. For example, the rigid member 22 may be made of glass, porcelain, wood, bamboo, metal or the like.

The other rigid members 21, which include the rigid member 23, have the same configuration as the rigid member 22.

The two rigid members 22 and 23 are arranged overlapped in the Z-direction. The Z-direction is an example of an overlapping direction.

Figure 6:
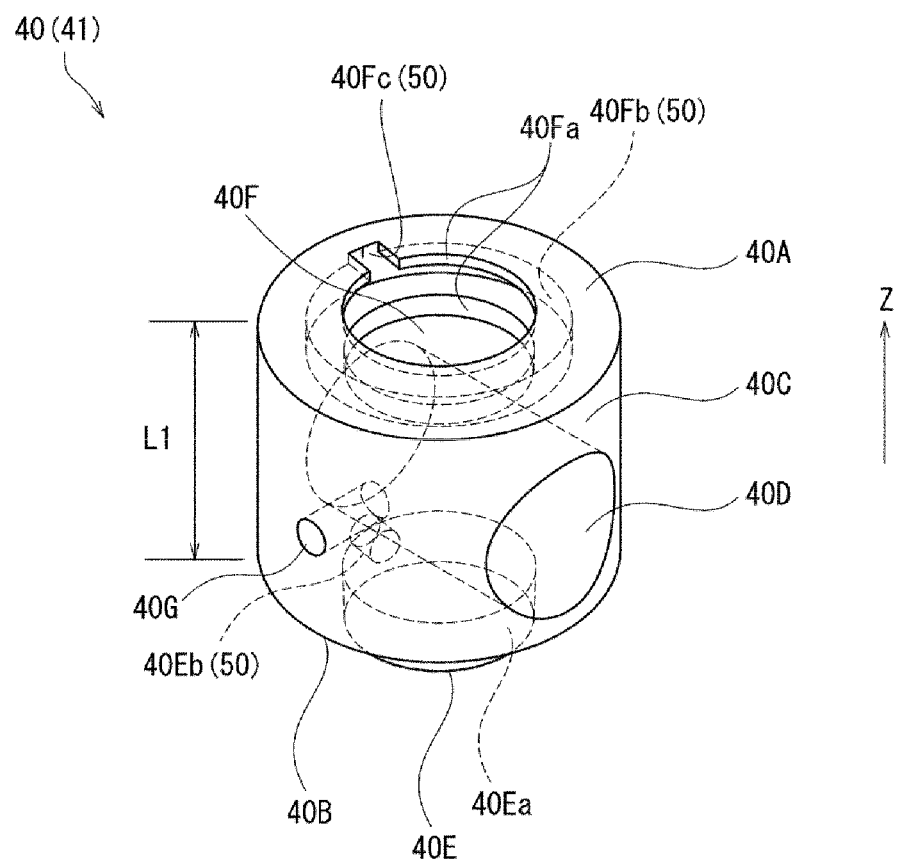
FIG. 6 is a perspective view of a horizontal coupling part.

FIG. 6 is a perspective view of a horizontal coupling part. Hereinafter, the configuration of the horizontal coupling part 41 will be described, while referring to FIG. 6. Each of the horizontal coupling parts 40 has the same configuration or approximately the same configuration. Accordingly, the configurations of the other horizontal coupling parts 40, which excludes the horizontal coupling part 41, will be, in principle, omitted, and described as necessary.

As shown in FIG. 6, the horizontal coupling part 41 has a roughly columnar shape. The horizontal coupling part 41 includes, as outer surfaces, a pair of bottom surfaces 40A and 40B, and a side surface 40C. The bottom surface 40A faces the Z-direction. The bottom surface 40B faces an opposite direction to the Z-direction. In other words, the bottom surfaces 40A and 40B are facing opposite each other. The side surface 40C connects the outer edge parts of the pair of bottom surfaces 40A and 40B. The pair of bottom surfaces 40A and 40B is an example of a pair of first surfaces. The side surface 40C is an example of a second surface.

Note that, in each figure, which includes FIG. 6, while the boundary parts between the pair of bottom surfaces 40A and 40B and the side surface 40C are bent, the boundary parts between the pair of bottom surfaces 40A and 40B and the side surface 40C may be curved by chamfering or the like. Moreover, the horizontal coupling part 41 may have a shape other than a columnar shape.

The horizontal coupling part 41 includes a hole 40D, a convex part 40E, a concave part 40F, and a hole 40G.

Figure 7:
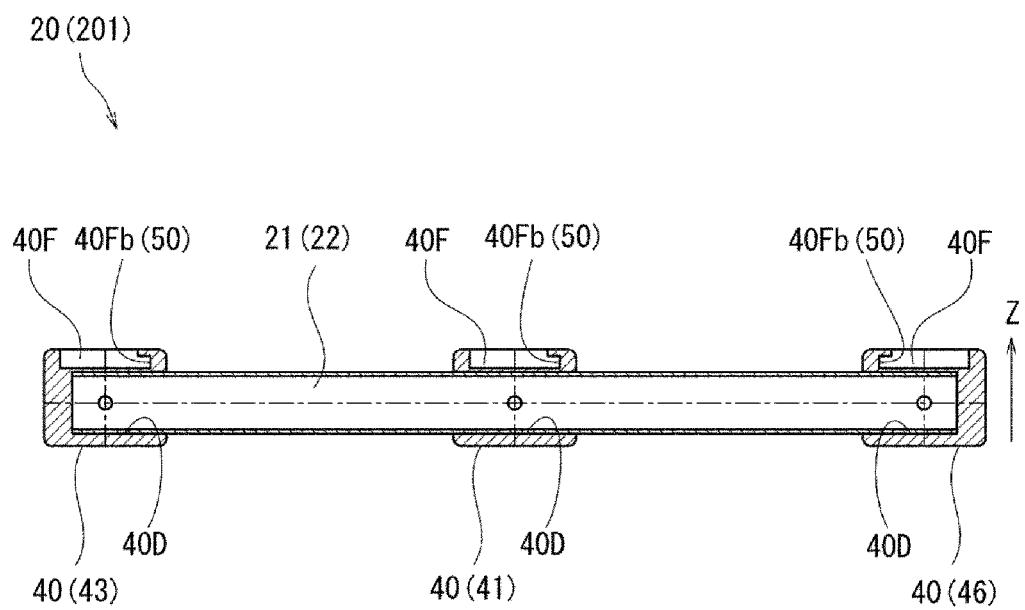
FIG. 7 is a section view of horizontal coupling parts and a rigid member.
Figure 8:
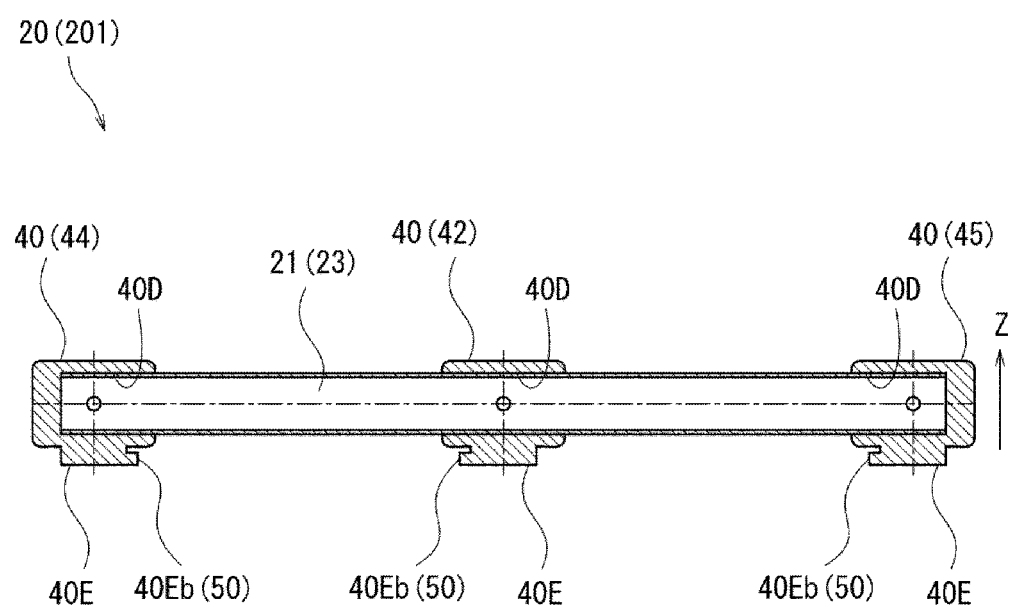
FIG. 8 is a section view of horizontal coupling parts and a rigid member.

The hole 40D is formed on the side surface 40C. FIG. 7 is a cross section of horizontal coupling parts and a rigid member. FIG. 8 is a cross section of horizontal coupling parts and a rigid member. As shown in FIG. 7 and FIG. 8, the rigid member 21 is inserted into the hole 40D. In this way, the hole 40D is capable of being fitted with the rigid member 21. The hole 40D is an example of a fitting part. The horizontal coupling part 40 is attached to the rigid member 21, by fitting the hole 40D and the rigid member 21. In other words, the rigid member 21 is connected to the side surface 40C of the horizontal coupling part 40.

As shown in FIG. 7, three of the horizontal coupling parts 41, 43, and 46 are attached to the rigid member 22. As shown in FIG. 8, three of the horizontal coupling parts 42, 44, and 45 are attached to the rigid member 23. Note that, the number of horizontal coupling parts 40 attached to one rigid member 21 is not limited to three, and may be two, or four or more. In other words, a plurality of the horizontal coupling parts 40 is provided at a respective one of the rigid members 21.

As shown in FIG. 7 and FIG. 8, the hole 40D provided in the horizontal coupling parts 41 and 42 penetrates through the horizontal coupling part 41 in a direction orthogonal to the Z-direction. Note that, the through direction of the hole 40D may be in a direction that intersects the Z-direction, and is not limited to a direction orthogonal to the Z-direction. On the other hand, the hole 40D provided in the horizontal coupling parts 43 to 46 does not penetrate through the horizontal coupling part 41. By being configured in such a way, the horizontal coupling parts 43 to 46 are suitable for attachment to the end parts of the rigid member 21 in the longitudinal direction. On the other hand, the horizontal coupling parts 41 and 42 are suitable for attachment to a location other than the end parts of the rigid member 21 in the longitudinal direction. Note that, the horizontal coupling parts 41 and 42 may be attached to the end parts of the rigid member 21 in the longitudinal direction.

The cross section shape of the hole 40D is set to match the cross section shape of the inserted rigid member 21. In the first embodiment, the cross section shape of the hole 40D is a circular shape that matches the cross section of the rigid member 21.

As described above, the rigid member 21 is attached to the horizontal coupling part 40 by being inserted into the hole 40D, and is detached from the horizontal coupling part 40 by being pulled out from the hole 40D. In other words, the rigid member 21 and the horizontal coupling part 40 are capable of being attached and detached with respect to each other. Note that, the rigid member 21 and the horizontal coupling part 40 may be fixed in a state where coupled to each other.

As shown in FIG. 6, the convex part 40E is formed on the bottom surface 40B. The concave part 40F is formed on the bottom surface 40A. Two of the horizontal coupling parts 40 are capable of being coupled to each other, by inserting the convex part 40E provided on one of the two horizontal coupling parts 40, along the Z-direction, into the concave part 40F provided on the other of the two horizontal coupling parts 40. The Z-direction is an example of an insertion direction of the convex part to the concave part. However, as mentioned later, there is a limitation, by a projection 40Eb of the convex part 40E and a notched part 40Fc of the concave part 40F, for the insertion of the convex part 40E to the concave part 40F. Note that, in FIG. 7, an illustration of the convex part 40E is omitted, and in FIG. 8, an illustration of the concave part 40F is omitted.

In the first embodiment, two of the horizontal coupling parts 40 are coupled to each other by inserting the convex part 40E into the concave part 40F, and the coupling to each other is released by pulling out the convex part 40E from the concave part 40F. In other words, the convex part 40E is capable of being attached and detached with respect to the concave part 40F. Note that, the convex part 40E may be configured so as not to be pulled out with respect to the concave part 40F. In other words, the convex part 40E and the concave part 40F may maintain a state where the convex part 40E is inserted into the concave part 40F.

The convex part 40E has a truncated cone shape with a smaller diameter as it approaches a distal end part. The concave part 40F is a truncated cone shape with a smaller diameter as it approaches a bottom part. The convex part 40E and the concave part 40F have the same shape and the same size.

Figure 9:
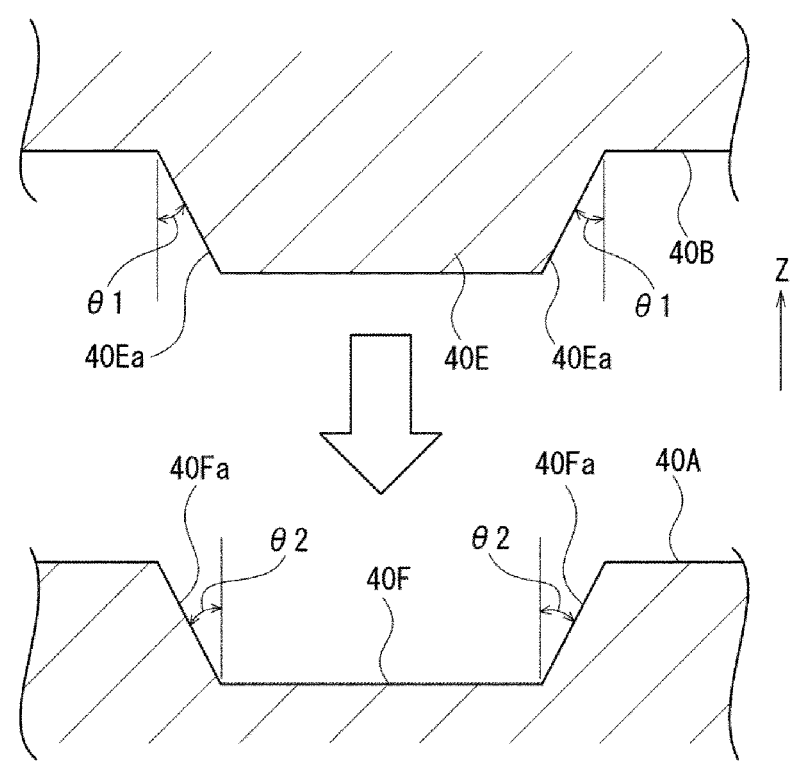
FIG. 9 is a section view schematically showing a convex part and a concave part.

FIG. 9 is a cross section schematically showing a convex part and a concave part. In FIG. 9, an illustration of a projection 40Eb of the convex part 40E, and an annular groove 40Fb and a notched part 40Fc of the concave part 40F, such as shown in FIG. 6, is omitted. In the first embodiment, as shown in FIG. 9, an angle $\theta 1$ of an outer side surface 40Ea of the convex part 40E with respect to the Z-direction, and an angle $\theta 2$ of an inner side surface 40Fa of the concave part 40F with respect to the Z-direction, are the same, and are two degrees. Note that, the angle $\theta 1$ may be an angle different to the angle $\theta 2$, and the angles $\theta 1$ and $\theta 2$ may each be an angle other than two degrees.

Two of the horizontal coupling parts 40 coupled by inserting the convex part 40E into the concave part 40F (refer to FIG. 1) are rotatable around an axial line parallel to the Z-direction with respect to each other. In this way, the two rigid members 22 and 33, on each of which the horizontal coupling parts 40 are provided, are rotatable around an axial line parallel to the Z-direction with respect to each other. Note that, the range of the rotation angle of one of the convex part 40E and the concave part 40F with respect to the other may be limited, by having a stopper formed on at least one of the convex part 40E and the concave part 40F. For example, the rotation angle of the convex part 40E with respect to the concave part 40F may be limited to 120 degrees. It is needless to say that the stopper may not be formed. In this case, the range of the rotation angle is 360 degrees.

Note that, the convex part 40E and the concave part 40F are not limited to a truncated cone shape. For example, the convex part 40E and the concave part 40F may have a cone shape, a columnar shape, or a square columnar shape. The convex part 40E and the concave part 40F may have different shapes, or may have different sizes. However, there is a condition in which two of the coupled horizontal coupling parts 40 are rotatable around an axial line parallel to the Z-direction with respect to each other, by inserting the convex part 40E inserted into the concave part 40F.

As shown in FIG. 6, a projection 40Eb is formed on the outer side surface 40Ea of the convex part 40E.

The concave part 40F includes an annular groove 40Fb and a notched part 40Fc. The annular groove 40Fb is formed across the entire periphery of the inner side surface 40Fa of the concave part 40F. The notched part 40Fc is a part of the inner side surface 40Fa of the concave part 40F that is cut out to enable passage of the projection 40Eb. The notched part 40Fc communicates between the annular groove 40Fb and the outside of the horizontal coupling part 41 along the Z-direction.

At the time when the convex part 40E of one of the two horizontal coupling parts 40 is inserted into the concave part 40F of the other of the two horizontal coupling parts 40, the projection 40Eb enters into the annular groove 40Fb of the concave part 40F, by passing through the notched part 40Fc. At the time when the projection 40Eb is overlapped with the notched part 40Fc, when seen from the Z-direction, the projection 40Eb passes through the notched part 40Fc, and can enter into the annular groove 40Fb. At this time, the convex part 40E is inserted into the concave part 40F (refer to FIG. 4). On the other hand, at the time when the projection 40Eb is not overlapped with the notched part 40Fc, when seen from the Z-direction, the projection 40Eb is blocked by the bottom surface 40A, and cannot enter into the annular groove 40Fb. At this time, the convex part 40E is not inserted into the concave part 40F.

In a state where the convex part 40E is inserted into the concave part 40F, and the projection 40Eb is positioned in the annular groove 40Fb, at the time when the projection 40Eb is not overlapped with the notched part 40Fc, when seen from the Z-direction, the projection 40Eb is blocked by the rear surface of the bottom surface 40A, and cannot be pulled out from the annular groove 40Fb. At this time, the convex part 40E is not removed from the concave part 40F. On the other hand, at the time when the projection 40Eb is overlapped with the notched part 40Fc, when seen from the Z-direction, the projection 40Eb passes through the notched part 40Fc, and can be pulled out from the annular groove 40Fb. At this time, the convex part 40E is removed from the concave part 40F.

By the above description, the projection 40Eb, the annular groove 40Fb, and the notched part 40Fc can maintain a state where the convex part 40E is inserted into the concave part 40F. In other words, a holding mechanism 50 for holding the coupling of two of the horizontal coupling parts 40 is constituted by the projection 40Eb, the annular groove 40Fb, and the notched part 40Fc.

As shown in FIG. 1, in the coupling structure 201, the horizontal coupling part 41 and the horizontal coupling part 42 are rotatably coupled to each other around an axial line parallel to the Z-direction. The horizontal coupling part 41 is one of the three horizontal coupling parts 41, 43, and 46 provided on the rigid member 22. The horizontal coupling part 42 is one of the three horizontal coupling parts 42, 44, and 45 provided on the rigid member 23. The horizontal coupling part 41 and the horizontal coupling part 42 are examples of intermediate coupling parts. In this way, in the coupling structure 201, the two rigid members 22 and 23 are rotatably coupled to each other via the two horizontal coupling parts 41 and 42. In other words, the two rigid members 22 and 23 constituting the coupling structure 201 are coupled at one junction point.

In the coupling structure 201, the horizontal coupling part 43 is rotatably coupled, to the horizontal coupling part 417 of the coupling structure 202, around an axial line parallel to the Z-direction. In the coupling structure 201, the horizontal coupling part 44 is rotatably coupled, to both the horizontal coupling part 418 of the coupling structure 202 and the horizontal coupling part 48 of the coupling structure 204, around an axial line parallel to the Z-direction. In other words, the three horizontal coupling parts 418, 44, and 48 are coupled to each other in an overlapped state. In this way, in the multiple junction point extendable structure 10, three or more of the horizontal coupling parts 40 can be coupled by being overlapped, without stopping at a coupling of two of the horizontal coupling parts 40. In FIG. 1, for example, in the three overlapped horizontal coupling parts 418, 44, and 48, the rigid member 21 is coupled at two junction points.

Moreover, in the coupling structure 201, the horizontal coupling parts 45 and 46 are not coupled to the other horizontal coupling parts 40. Note that, the horizontal coupling parts 45 and 46 may be coupled to the other horizontal coupling parts 40, similar to the horizontal coupling parts 41 to 44.

According to the above description, in the coupling structure 201, the horizontal coupling part 43, which is a part excluding the horizontal coupling part 41 of the three horizontal coupling parts 41, 43, and 46 attached to the rigid member 22, is rotatably coupled, to the horizontal coupling part 417 of the another coupling structure 202, around an axial direction parallel to the Z-direction. Moreover, in the coupling structure 201, the horizontal coupling part 44, which is a part excluding the horizontal coupling part 42 of the three horizontal coupling parts 42, 44, and 45 attached to the rigid member 23, is rotatably coupled, to the horizontal coupling parts 418 and 48 of the another coupling structures 202 and 204, around an axial line parallel to the Z-direction.

In the coupling structure 201, the horizontal coupling parts 43 and 46, which are all of the parts excluding the horizontal coupling part 41 of the three horizontal coupling parts 41, 43, and 46, may be rotatably coupled, to the horizontal coupling part 40 of the another coupling structure 202, around an axial line parallel to the Z-direction. Moreover, in the coupling structure 201, the horizontal coupling parts 44 and 45, which are all of the parts excluding the horizontal coupling part 42 of the three horizontal coupling parts 42, 44, and 45, may be rotatably coupled, to the horizontal coupling part 40 of the another coupling structure 202, around an axial line parallel to the Z-direction.

Note that, the another coupling structures 202 to 206 are configured similar to the coupling structure 201.

According to the above description, the multiple junction point extendable structure 10 is configured as a multiple junction body having multiple junction points. The coupling structure 201, which is a part of the multiple junction point extendable structure 10, for example, has one junction point in the horizontal coupling parts 41 and 42, one junction point in the horizontal coupling parts 43 and 417, and two junction points in the horizontal coupling parts 418, 44, and 48. In other words, the coupling structure 201 has four junction points.

As shown in FIG. 6, the hole 40G is opened on the side surface 40C. The hole 40G communicates between the hole 40D and the outside of the horizontal coupling part 41. The rigid member 22 inserted into the hole 40D can be held in a state where inserted into the hole 40D, by inserting a pin, screw or the like into the hole 40D.

According to the first embodiment, a plurality of horizontal coupling parts 40 can be coupled so as to be overlapped, by simply inserting the convex part 40E into the concave part 40F. By having a plurality of the horizontal coupling parts 40 overlapped, a plurality of the horizontal coupling parts 40 can be coupled without a limit of number. As a result of this, a configuration in which three or more of the rigid members 21 are coupled by two or more junction points can be easily implemented. Moreover, the coupling of the horizontal coupling parts 40 can be released, by simply pulling out the convex part 40E from the concave part 40F.

According to the first embodiment, an ornament or the like can be attached to the convex part 40E and the concave part 40F.

According to the first embodiment, by overlapping three or more of the horizontal coupling parts 40, the number of rigid members 21 coupled to one of the rigid members 21, in other words, the number of junction points of the rigid members 21, can be increased.

For example, in the case where the convex part 40E and the concave part 40F both have a columnar shape, in order for the convex part 40E to be surely inserted into the concave part 40F, it is necessary for the inner diameter of the concave part 40F to be larger than the diameter of the convex part 40E. In this way, in a state where the convex part 40E is inserted into the concave part 40F, there is the possibility of the horizontal coupling part 40 that includes the convex part 40E being unstable with respect to the horizontal coupling part 40 that includes the concave part 40F.

According to the first embodiment, the convex part 40E and the concave part 40F both have a truncated cone shape. Accordingly, even in the case where the size of the convex part 40E and the size of the concave part 40F are the same, the convex part 40E can be inserted into the concave part 40F. In this way, at the time when the convex part 40E is inserted into the concave part 40F, unstableness of the horizontal coupling part 40 that includes the convex part 40E with respect to the horizontal coupling part 40 that includes the concave part 40F can be made smaller than that of a configuration in which the convex part 40E and the concave part 40F both have a columnar shape.

According to the first embodiment, by including the holding mechanism 50 in the multiple junction point extendable structure 10, the possibility of the coupling of two of the horizontal coupling parts 40 being unintentionally released can be reduced.

By having the projection 40Eb pass through the notched part 40Fc, coupling and releasing of two of the horizontal coupling parts 40 can be easily performed. In a state where the convex part 40E is inserted into the concave part 40F, at the time when the projection 40Eb is not overlapped with the notched part 40Fc, in a planar view, the convex part 40E can be prevented from being pulled out from the concave part 40F.

According to the first embodiment, the rigid member 21 is a round rod or a round pipe. In this way, variations in the strength of each part of the rigid member 21 can be made closer to uniform than a configuration in which the rigid member 21 has a shape other than a round rod or a round pipe, for example, a rod with a square columnar shape.

According to the first embodiment, by having the rigid member 21 as a pipe, the rigid member 21 can be made lighter. According to the first embodiment, the horizontal coupling parts 40 can be coupled, by simply inserting the convex part 40E into the concave part 40F. Moreover, the coupling of the horizontal coupling parts 40 can be released, by simply pulling out the convex part 40E from the concave part 40F.

According to the first embodiment, since the horizontal coupling parts 40 are capable of being attached and detached with respect to the rigid member 21, the configuration of the multiple junction point extendable structure 10 can be changed in a flexible manner.

Modified Example 1 of the First Embodiment

The horizontal coupling part 40 shown in FIG. 6 includes the convex part 40E on the bottom surface 40A, and includes the concave part 40F on the bottom surface 40B. However, the horizontal coupling part 40 is not limited to such a configuration.

Figure 10:
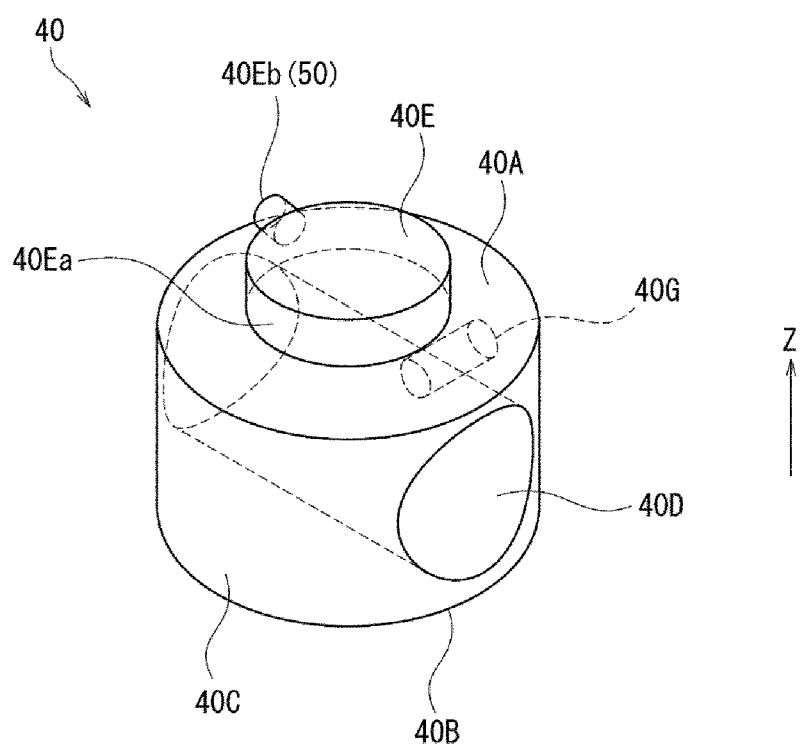
FIG. 10 is a perspective view of a horizontal coupling part of a modified example.
Figure 11:
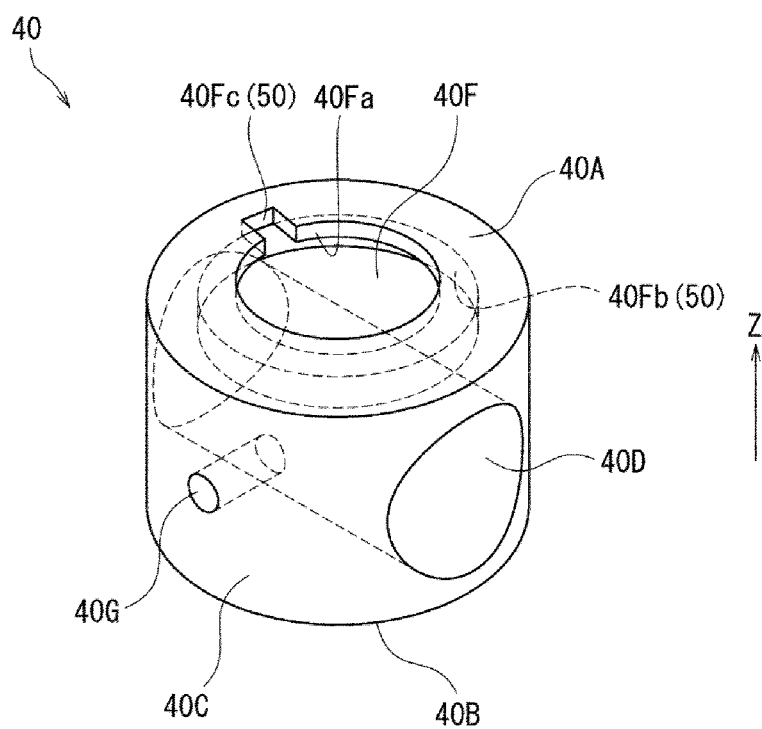
FIG. 11 is a perspective view of a horizontal coupling part of a modified example.

FIG. 10 is a perspective view of a horizontal coupling part of a modified example. FIG. 11 is a perspective view of a horizontal coupling part of a modified example. For example, as shown in FIG. 10, the horizontal coupling part 40 may include the convex part 40E on the bottom surface 40A, while on the other hand, may not include either of the convex part 40E and the concave part 40F on the bottom surface 40B. Moreover, for example, as shown in FIG. 11, the horizontal coupling part 40 may include the concave part 40F on the bottom surface 40A, while on the other hand, may not include either of the convex part 40E and the concave part 40F on the bottom surface 40B. Moreover, for example, the horizontal coupling part 40 may include the convex part 40E on both the bottom surfaces 40A and 40B. Moreover, for example, the horizontal coupling part 40 may include the concave part 40F on both the bottom surfaces 40A and 40B.

In the configuration shown in FIG. 6, all of the plurality of horizontal coupling parts 40 included in each of the coupling structures 20 include the convex part 40E on the bottom surface 40A, and include the concave part 40F on the bottom surface 40B, such as shown in FIG. 6. However, the plurality of horizontal coupling parts 40 included in each of the coupling structures 20 may have different configurations. For example, from among the six horizontal coupling parts 40 included in the coupling structure 201, the horizontal coupling parts 41, 43, and 46 may have a configuration such as shown in FIG. 11, and the horizontal coupling parts 42, 44, and 45 may have a configuration such as shown in FIG. 10.

Modified Example 2 of the First Embodiment

Figure 12:
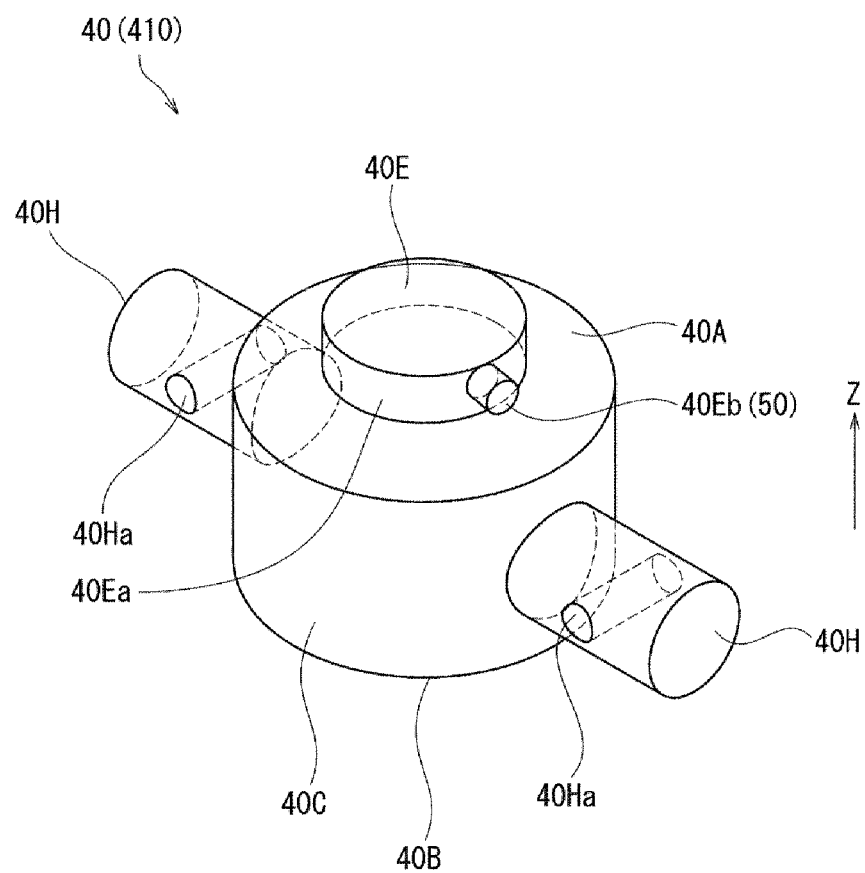
FIG. 12 is a perspective view of a horizontal coupling part of a modified example.

The horizontal coupling part 40 shown in FIG. 6 includes the hole 40D into which the rigid member 21 is inserted. The horizontal coupling part 40 is attached to the rigid member 21, by having the rigid member 21 inserted into the hole 40D. However, the configuration for attaching the horizontal coupling part 40 to the rigid member 21 is not limited to the hole 40D. For example, as shown in FIG. 12, the horizontal coupling part 410 may include the convex part 40H, instead of the hole 40D. FIG. 12 is a perspective view of a horizontal coupling part of a modified example. The convex part 40H protrudes from the side surface 40C. The convex part 40H is inserted into an inner space of the rigid member 21, which is hollow. In this way, the horizontal coupling part 40 is attached to the rigid member 21. In this case, the convex part 40H corresponds to a fitting part.

A hole 40Ha, through which the convex part 40H passes, is formed on the convex part 40H of the horizontal coupling part 410. By inserting a pin, screw or the like into the hole 40Ha, the rigid member 22, into which the convex part 40H is inserted, can be maintained in a state where the convex part 40H is inserted.

Modified Example 3 of the First Embodiment

Figure 13:
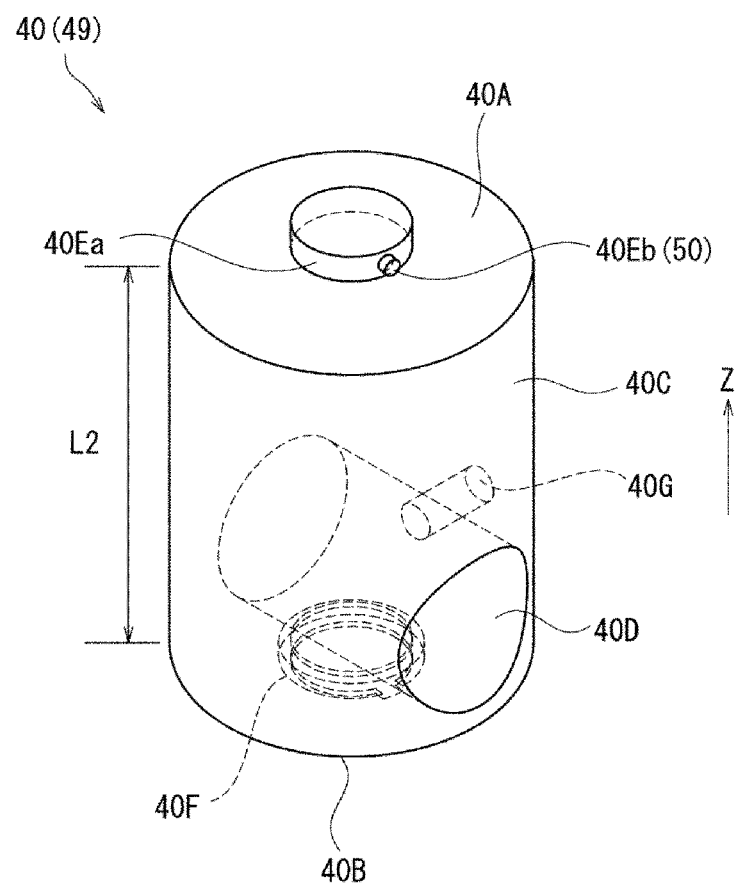
FIG. 13 is a perspective view of a high-back coupling part.

The heights (lengths in the Z-direction) of the plurality of horizontal coupling parts 40 included in each coupling structure 20 may be different from each other. The height of the horizontal coupling part 40 (length in the Z-direction) is the length between the pair of bottom surfaces 40A and 40B. For example, the coupling structure 204 of the multiple junction point extendable structure 10 shown in FIG. 1 includes a horizontal coupling part 49 (refer to FIG. 13). FIG. 13 is a perspective view of a high-back coupling part.

As shown in FIG. 1, the coupling structure 204 includes the horizontal coupling part 49. The horizontal coupling part 49 is longer in the Z-direction than the other horizontal coupling parts 40 (for example, the horizontal coupling parts 41 to 48 shown in FIG. 1). In other words, in the case where the length of the other horizontal coupling parts 40 in the Z-direction is a first length L1 (refer to FIG. 6), a second length L2 (refer to FIG. 13) of the horizontal coupling part 49 in the Z-direction is longer than the first length L1. In this case, the horizontal coupling part 49 corresponds to a high-back coupling part, and the other horizontal coupling parts 40 other than the horizontal coupling part 49 correspond to low-back coupling parts. According to the above description, the plurality of horizontal coupling parts 40 may include the horizontal coupling part 49, and the horizontal coupling parts 40 that are shorter than the horizontal coupling part 49 in the Z-direction.

Note that, the heights (lengths in the Z-direction) of all of the horizontal coupling parts 40 included in each coupling structure 20 may be the same. Moreover, the multiple junction point extendable structure 10 may include a plurality of high-back coupling parts.

According to modified example 3 of the first embodiment, by using the horizontal coupling part 49, the spacing between the rigid members 21 attached to each of two coupled horizontal coupling parts 40 can be increased.

According to modified example 3 of the first embodiment, by combining horizontal coupling parts 40 of various heights, the configuration of the multiple junction point extendable structure 10 can easily be made complex.

Modified Example 4 of the First Embodiment

In the horizontal coupling parts 40 shown in FIG. 6 and FIG. 10, the convex part 40E includes the projection 40Eb. In the horizontal coupling parts 40 shown in FIG. 6 and FIG. 11, the concave part 40F includes the annular groove 40Fb and the notched part 40Fc. In this case, the holding mechanism 50 is constituted by the projection 40Eb, the annular groove 40Fb, and the notched part 40Fc. However, the holding mechanism 50 is not limited to such a configuration.

Figure 14:
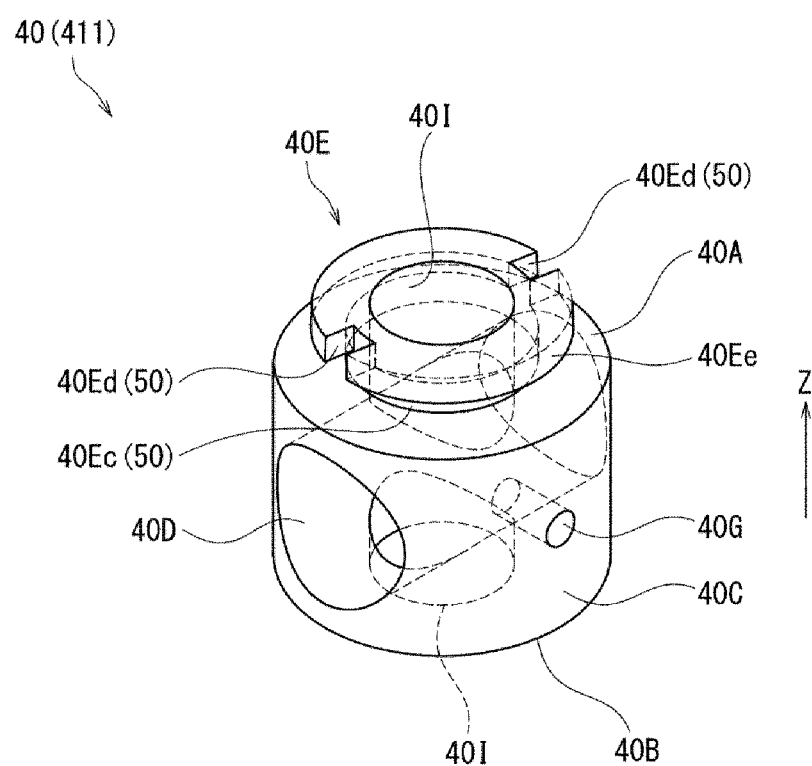
FIG. 14 is a perspective view of a horizontal coupling part of a modified example.
Figure 15:
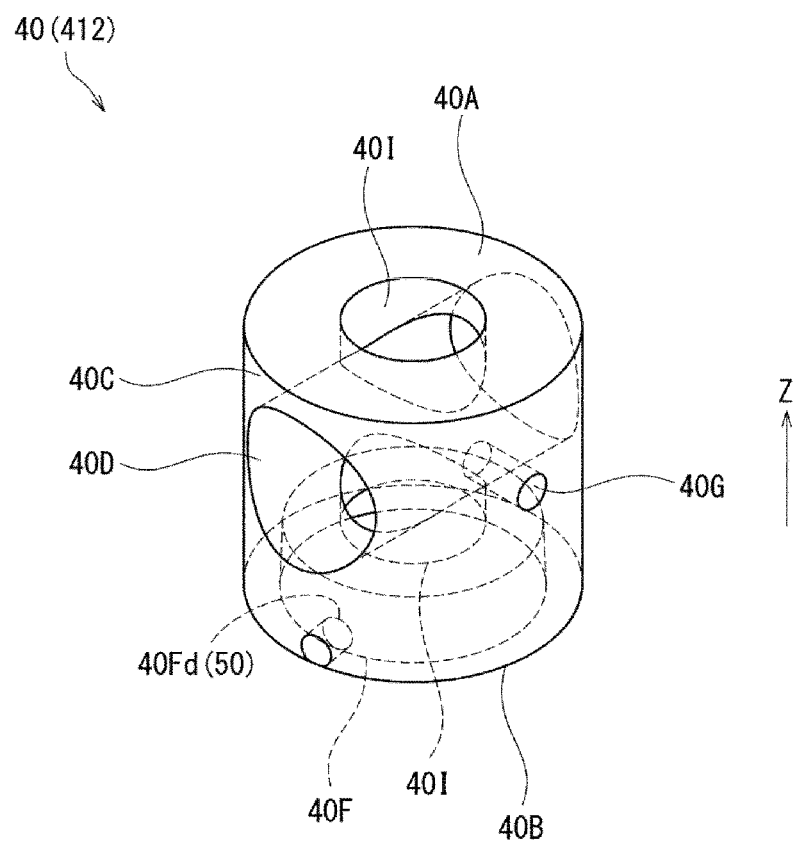
FIG. 15 is a perspective view of a horizontal coupling part of a modified example.
Figure 16:
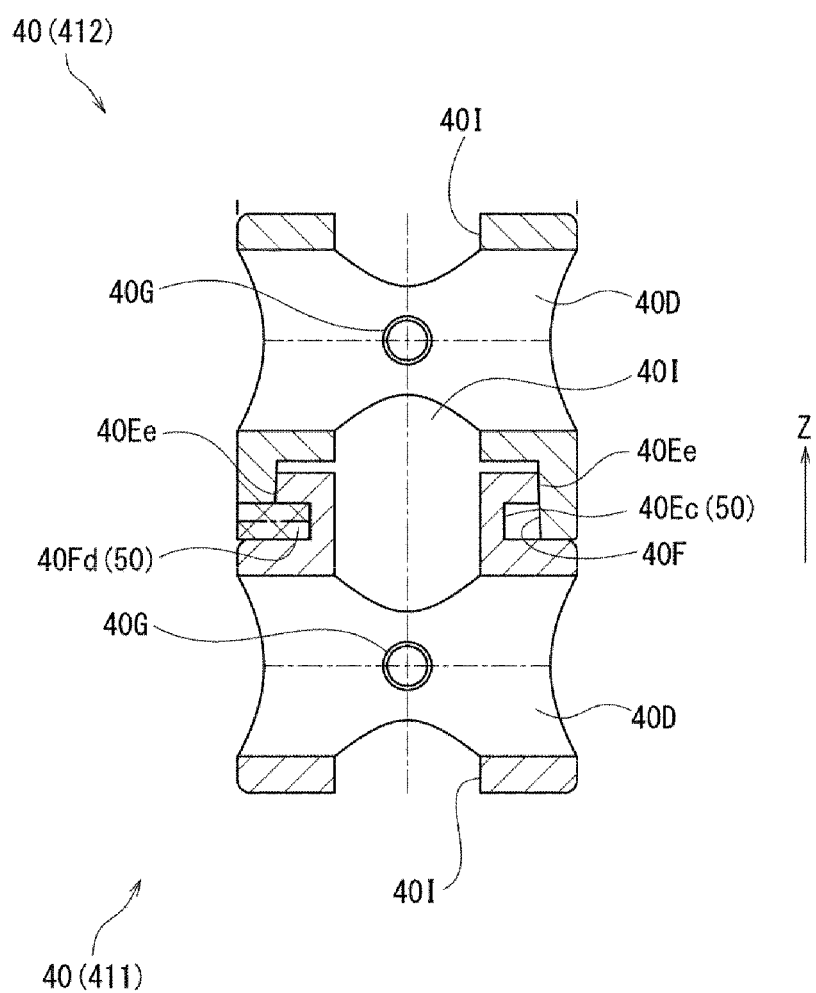
FIG. 16 is a section view of two horizontal coupling parts coupled to each other.

FIG. 14 is a perspective view of a horizontal coupling part of a modified example. FIG. 15 is a perspective view of a horizontal coupling part of a modified example. FIG. 16 is a section view of two horizontal coupling parts coupled to each other. For example, the holding mechanism 50 of the horizontal coupling parts 411 and 412 of modified example 4 may be constituted by an annular groove 40Ec and a notched part 40Ed provided on the convex part 40E of the horizontal coupling part 411 shown in FIG. 14, and a projection 40Fd provided on the concave part 40F of the horizontal coupling part 412 shown in FIG. 15.

As shown in FIG. 14 and FIG. 16, the annular groove 40Ec is formed across the entire periphery of the outer side surface 40Ee of the convex part 40E. The notched part 40Ed is a part of the outer side surface 40Ee of the convex part 40E that is cut out to enable passage of the projection 40Fd. The notched part 40Ed communicates between the annular groove 40Ec and the outside of the horizontal coupling part 411 along the Z-direction.

As shown in FIG. 15 and FIG. 16, the projection 40Fd is formed on the inner side surface of the concave part 40F. Note that, in FIG. 15, the projection 40Fd is formed by inserting a rod shaped member into the concave part 40F form a hole formed on the side surface 40C of the horizontal coupling part 412. It is needless to say that the projection 40Fd may be integrally formed with the horizontal coupling part 412.

At the time when the convex part 40E of the horizontal coupling part 411 is inserted into the concave part 40F of the horizontal coupling part 412, the projection 40Fd enters into the annular groove 40Ec of the convex part 40E, by passing through the notched part 40Ed. At the time when the projection 40Fd is overlapped with the notched part 40Ed, when seen from the Z-direction, the projection 40Fd passes through the notched part 40Ed, and can enter into the annular groove 40Ec. At this time, the convex part 40E is inserted into the concave part 40F. On the other hand, at the time when the projection 40Fd is not overlapped with the notched part 40Ed, when seen from the Z-direction, the projection 40Fd is blocked by the distal end surface of the convex part 40E, and cannot enter into the annular groove 40Ec. At this time, the convex part 40E is not inserted into the concave part 40F.

In a state where the convex part 40E is inserted into the concave part 40F, and the projection 40Fd is positioned in the annular groove 40Ec, at the time when the projection 40Fd is not overlapped with the notched part 40Ed, when seen from the Z-direction, the projection 40Fd is blocked by the rear surface of the distal end surface of the convex part 40E, and cannot be pulled out from the annular groove 40Ec. At this time, the convex part 40E is not released from the concave part 40F. On the other hand, at the time when the projection 40Fd is overlapped with the notched part 40Ed, when seen from the Z-direction, the projection 40Fd passes through the notched part 40Ed, and can be pulled out from the annular groove 40Ec. At this time, the convex part 40E is released from the concave part 40F.

As described above, the projection 40Fd, the annular groove 40Ec, and the notched part 40Ed can maintain a state where the convex part 40E is inserted into the concave part 40F. In other words, in modified example 4, the holding mechanism 50 is constituted by the projection 40Fd, the annular groove 40Ec, and the notched part 40Ed.

The horizontal coupling parts 411 and 412 of modified example 4 include a vertical through hole 40I. The vertical through hole 40I penetrates through the horizontal coupling parts 411 and 412 in the Z-direction. The horizontal coupling parts 40 of other embodiments and modified examples may include the vertical through hole 40I.

Modified Example 5 of the First Embodiment

Figure 17:
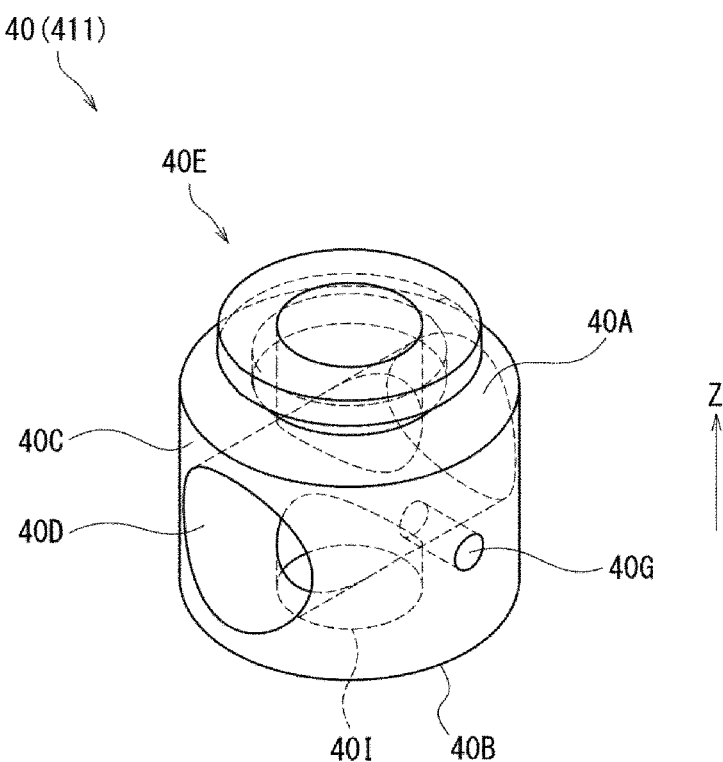
FIG. 17 is a perspective view of a horizontal coupling part of a modified example.
Figure 18:
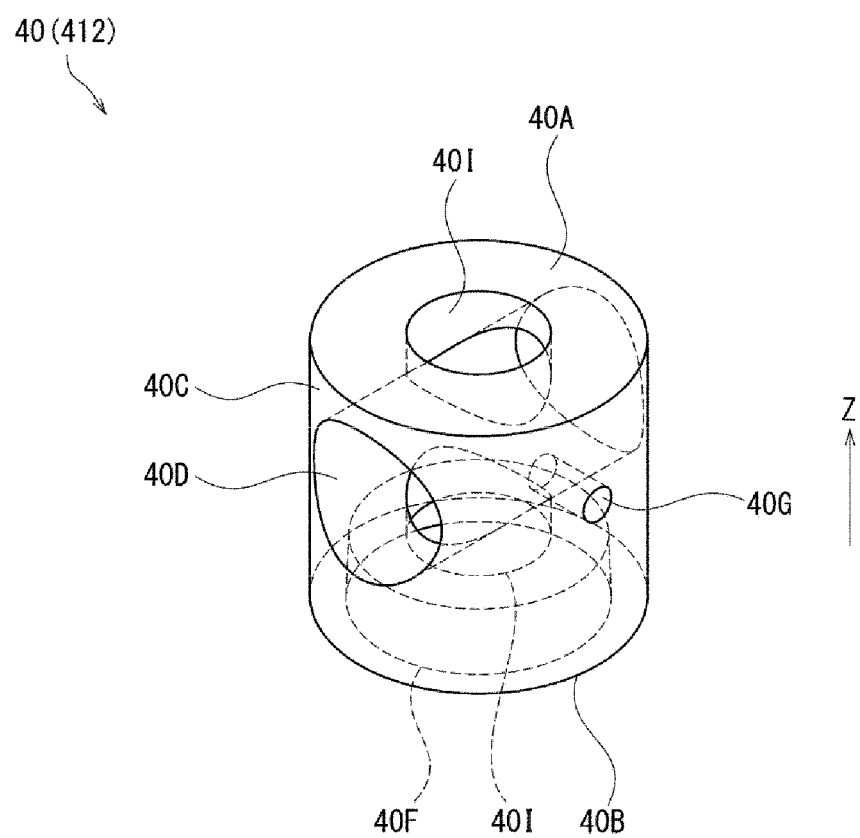
FIG. 18 is a perspective view of a horizontal coupling part of a modified example.

FIG. 17 is a perspective view of a horizontal coupling part of a modified example. FIG. 18 is a perspective view of a horizontal coupling part of a modified example. In modified example 4 mentioned above, as shown in FIG. 14, the convex part 40E of the horizontal coupling part 411 includes the annular groove 40Ec and the notched part 40Ed, and as shown in FIG. 15, the concave part 40F of the horizontal coupling part 412 includes the projection 40Fd. However, as shown in FIG. 17, the convex part 40E may not include the annular groove 40Ec and the notched part 40Ed. Moreover, as shown in FIG. 18, the concave part 40F may not include the projection 40Fd.

Figure 19:
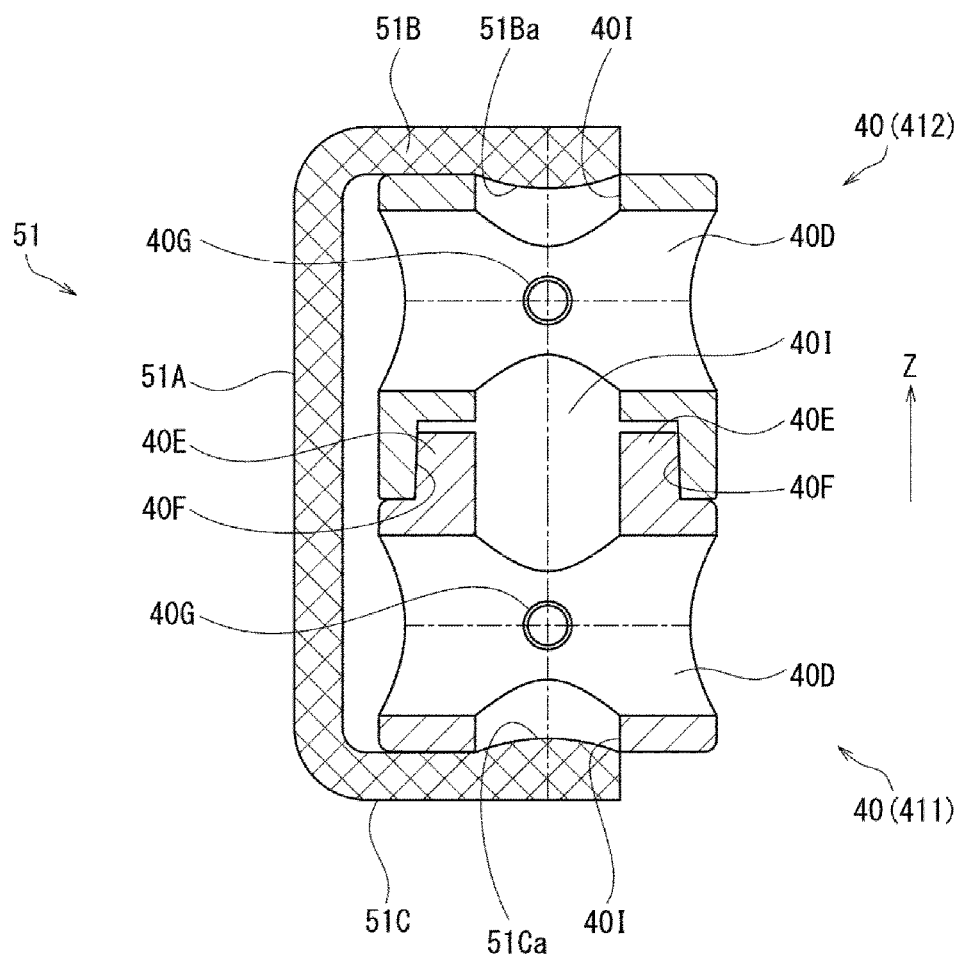
FIG. 19 is a section view of two horizontal coupling parts and a holding member coupled to each other.

In modified example 5, in order to prevent the convex part 40E from being unintentionally pulled out from the concave part 40F, a holding member 51 is provided, such as shown in FIG. 19. FIG. 19 is a section view of two horizontal coupling parts and a holding member coupled to each other.

As shown in FIG. 19, the holding member 51 is a member in which both end parts of a plate shaped member are bent in the same direction. The holding member 51 includes a first portion 51A, and a pair of second portions 51B and 51C. The second portions 51B and 51C are bent with respect to the first portion 51A at both end parts of the first portion 51A.

The pair of second portions 51B and 51C are opposite each other. A plurality of the horizontal coupling parts 40 are sandwiched between the pair of second portions 51B and 51C. In this way, the coupling of a plurality of the horizontal coupling parts 40 is held. In other words, the holding mechanism 50 for holding the coupling of a plurality of the horizontal coupling parts 40 is constituted by the holding member 51. In FIG. 19, two horizontal coupling parts 411 and 412 are sandwiched between the pair of second portions 51B and 51C. The spacing of the pair of second portions 51B and 51C is determined in accordance with the number of sandwiched horizontal coupling parts 40. For example, in the case where three of the horizontal coupling parts 40 are sandwiched between the pair of second portions 51B and 51C, the spacing of the pair of second portions 51B and 51C is set to a spacing the same or approximately the same as the length of the three overlapped horizontal coupling parts 40 in the Z-direction.

The pair of second portions 51B and 51C respectively include convex parts 51Ba and 51Ca. The convex part 51Ba protrudes from the second portion 51B toward the second portion 51C. The convex part 51Ca protrudes from the second portion 51C toward the second portion 51B. At the time when a plurality of the horizontal coupling parts 40 are sandwiched between the pair of second portions 51B and 51C, the convex part 51Ba is inserted into the vertical through hole 40I of the horizontal coupling part 40 positioned at one end part of the plurality of overlapped horizontal coupling parts 40. On the other hand, the convex part 51Ca is inserted into the vertical through hole 40I of the horizontal coupling part 40 positioned on the other end part of the plurality of overlapped horizontal coupling parts 40. In FIG. 19, the convex part 51Ba is inserted into the vertical through hole 40I of the horizontal coupling part 412, and the convex part 51Ca is inserted into the vertical through hole 40I of the horizontal coupling part 411. In this way, the possibility of the the coupling being sandwiching of horizontal parts 40 unintentionally released can be reduced by the holding member 51.

The multiple junction point extendable structure 10 may include a plurality of the holding members 51. In this case, the spacing of the pair of second portions 51B and 51C of each of the holding members 51 may be the same, or may be different. For example, in the case where the multiple junction point extendable structure 10 has three groups of a structure in which two of the horizontal coupling parts 40 are overlapped, and has four groups of a structure in which three of the horizontal coupling parts 40 are overlapped, the multiple junction point extendable structure includes two types of holding members 51. One of the two types of holding members 51 has the spacing of the pair of two portions 51B and 51C set to the length of the two horizontal coupling parts 40 in the Z-direction. The other of the two types of holding members 51 has the spacing of the pair of second portions 51B and 51C set to the length of the three horizontal coupling parts 40 in the Z-direction. In the case of this example, the multiple junction point extendable structure 10 includes three of the one of the two types of holding members 51, and includes four of the other of the two types of holding members 51.

Modified Example 6 of the First Embodiment

Figure 20:
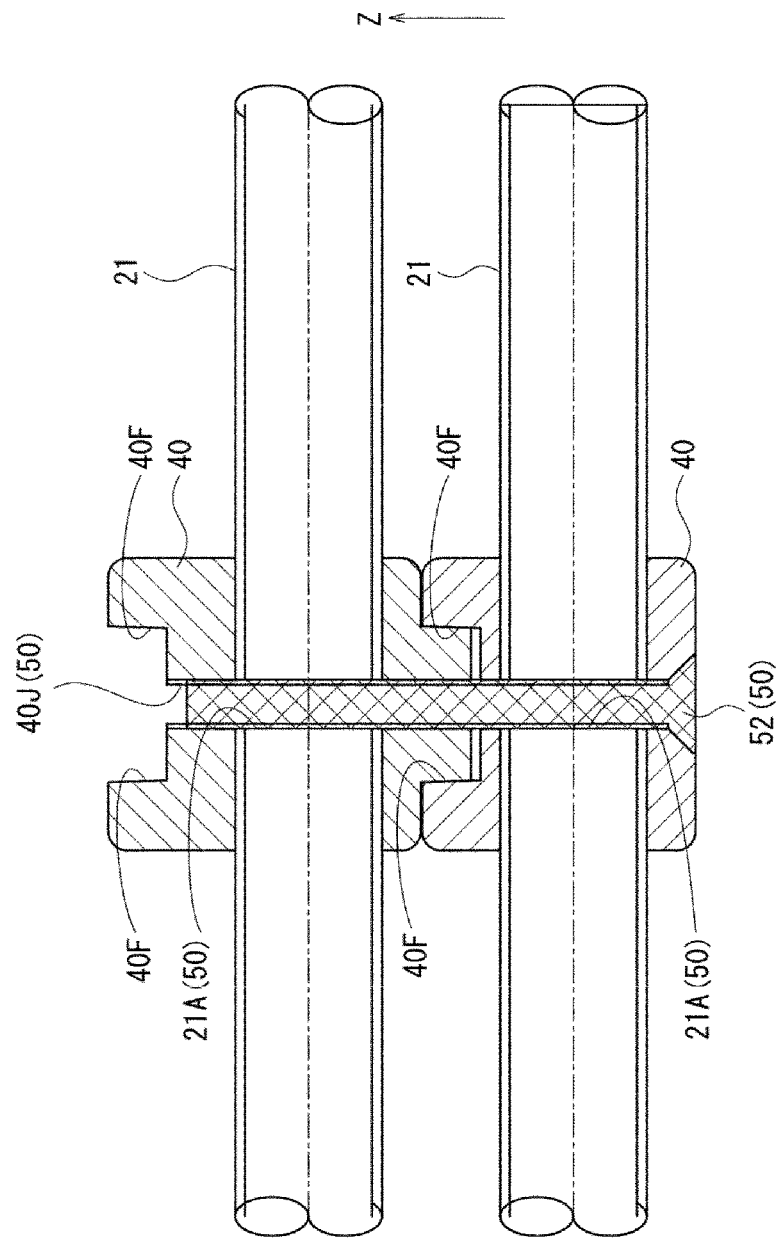
FIG. 20 is a section view of two horizontal coupling parts and a rigid member coupled to each other.

In the configurations shown in FIG. 1 to FIG. 15, the coupling of a plurality of the horizontal coupling parts 40 is held, by a projection provided on one of the convex part 40E and the concave part 40F, and an annular groove and notched part provided on one of the convex part 40E and the concave part 40F. In the configurations shown in FIG. 1 to FIG. 15, the coupling of the rigid member 21 with respect to the horizontal coupling part 40 is held, by inserting a pin, screw or the like into the holes 40G and 40Ha. However, the configuration for holding the coupling of a plurality of the horizontal coupling parts 40, and the configuration for holding the coupling of the rigid member 21 with respect to the horizontal coupling part 40, are not limited to the configurations shown in FIG. 1 to FIG. 15. For example, they may have the configuration shown in FIG. 20. FIG. 20 is a section view of two horizontal coupling parts and a rigid member coupled to each other.

As shown in FIG. 20, the horizontal coupling part 40 of modified example 6 includes a vertical through hole 40J, and the rigid member 21 of modified example 6 includes a through hole 21A. At the time when a plurality of the horizontal coupling parts 40 are overlapped, the vertical through holes 40J of each of the horizontal coupling parts 40 are in a straight line in the Z-direction. At the time when the rigid member 21 is inserted into each of the horizontal coupling parts 40, the rigid member 21 is positioned with respect to the horizontal coupling part 40, so that the through holes 21A are in a straight line in the Z-direction with respect to the vertical through holes 40J. A pin 52 is inserted into the vertical through holes 40J and the through holes 21A, which are in a straight line in the 2-direction. Note that, while not illustrated, a configuration for preventing unintended pulling out of the pin 52 from the vertical through holes 40J and the through holes 21A is applied to the pin 52, the rigid member 21, and at least one of the horizontal coupling parts 40. For example, the vertical through holes 40J and the through holes 21A are threaded, and the pin 52 is constituted by a screw that is capable of being screwed into the vertical through holes 40J and the through holes 21A.

In modified example 6, the holding mechanism 50 is constituted by the vertical through hole 40J, the through hole 21A, and the pin 52.

Various publicly known configurations are capable of being adopted as the configuration for holding the coupling of a plurality of the horizontal coupling parts 40, and the configuration for holding the coupling of the rigid member 21 with respect to the horizontal coupling part 40. For example, the horizontal coupling parts 40 may be made of a magnetic material, and the coupling of the plurality of horizontal coupling parts 40 may be configured so as to be held by a magnet.

Modified Example 7 of the First Embodiment

In the horizontal coupling parts 40 shown in FIG. 6, FIG. 10, and FIG. 11, the holding mechanism 50 is constituted by the projection 40Eb, the annular groove 40Fb, and the notched part 40Fc. In the horizontal coupling part 411 shown in FIG. 14 and FIG. 15, the holding mechanism 50 is constituted by the projection 40Fd, the annular groove 40Ec, and the notched part 40Ed. However, the holding mechanism 50 is not limited to such a configuration.

Figure 21:
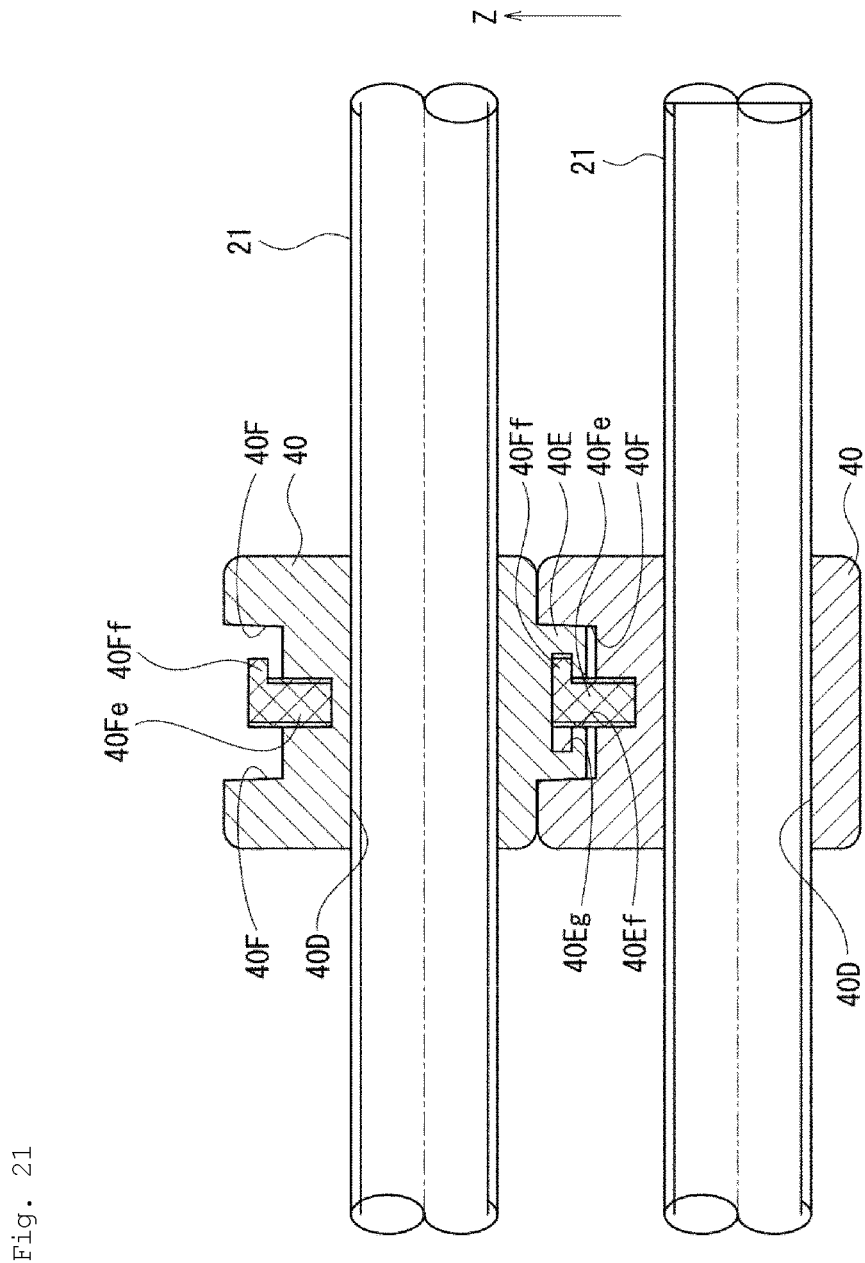
FIG. 21 is a section view of two horizontal coupling parts and a rigid member coupled to each other.

FIG. 21 is a section view of two horizontal coupling parts and a rigid member coupled to each other. As shown in FIG. 21, the holding mechanism 50 of the horizontal coupling part 40 may be constituted by the a concave part 40Ef, an annular groove 40Eg, and a notched part (not illustrated) provided on the convex part 40E, and a convex part 40Fe and a projection 40Ff provided on the concave part 40F.

The concave part 40Ef is formed on a distal end surface of the convex part 40E. The annular groove 40Eg is formed across the entire periphery of the inner side surface of the concave part 40Ef. The notched part, which is not illustrated, is a part of the inner side surface of the concave part 40Ef that is cut out to enable passage of the projection 40Ff. The notched part communicates between the annular groove 40Eg and the outside of the horizontal coupling part 41 along the Z-direction.

The convex part 40Fe is formed on the bottom surface of the concave part 40F. The projection 40Ff is formed on the outer side surface of the convex part 40Fe.

At the time when the convex part 40E of one of two of the horizontal coupling parts 40 is inserted into the concave part 40F of the other of the two horizontal coupling parts 40, the projection 40Ff enters into the annular groove 40Eg of the concave part 40Ef, by passing through the notched part of the convex part 40E. At the time when the projection 40Ff is overlapped with the notched part of the convex part 40E, when seen from the Z-direction, the projection 40Ff passes through the notched part of the convex part 40E, and can enter into the annular groove 40Eg. At this time, the convex part 40E is inserted into the concave part 40F. On the other hand, at the time when the projection 40Ff is not overlapped with the notched part of the convex part 40E, when seen from the Z-direction, the projection 40Ff is blocked by the distal end surface of the convex part 40E, and cannot enter into the annular groove 40Eg. At this time, the convex part 40E is not inserted into the concave part 40F.

In a state where the convex part 40E is inserted into the concave part 40F, and the projection 40Ff is positioned in the annular groove 40Eg, at the time when the projection 40Ff is not overlapped with the notched part of the convex part 40E, when seen from the Z-direction, the projection 40Ff is blocked by the rear surface of the distal end surface of the convex part 40E, and cannot be pulled out from the annular groove 40Eg. At this time, the convex part 40E is not released from the concave part 40F. On the other hand, at the time when the projection 40Ff is overlapped with the notched part of the convex part 40E, when seen from the Z-direction, the projection 40Ff passes through the notched part of the convex part 40E, and can be pulled out from the annular groove 40Eg. At this time, the convex part 40E is released from the concave part 40F.

As described above, in modified example 7, a holding mechanism for holding the coupling of two of the horizontal coupling parts 40 is constituted by the concave part 40Ef, the annular groove 40Eg, and the notched part provided on the convex part 40E, and the convex part 40Fe and the projection 40Ff provided on the concave part 40F.

Second Embodiment

Figure 22A:
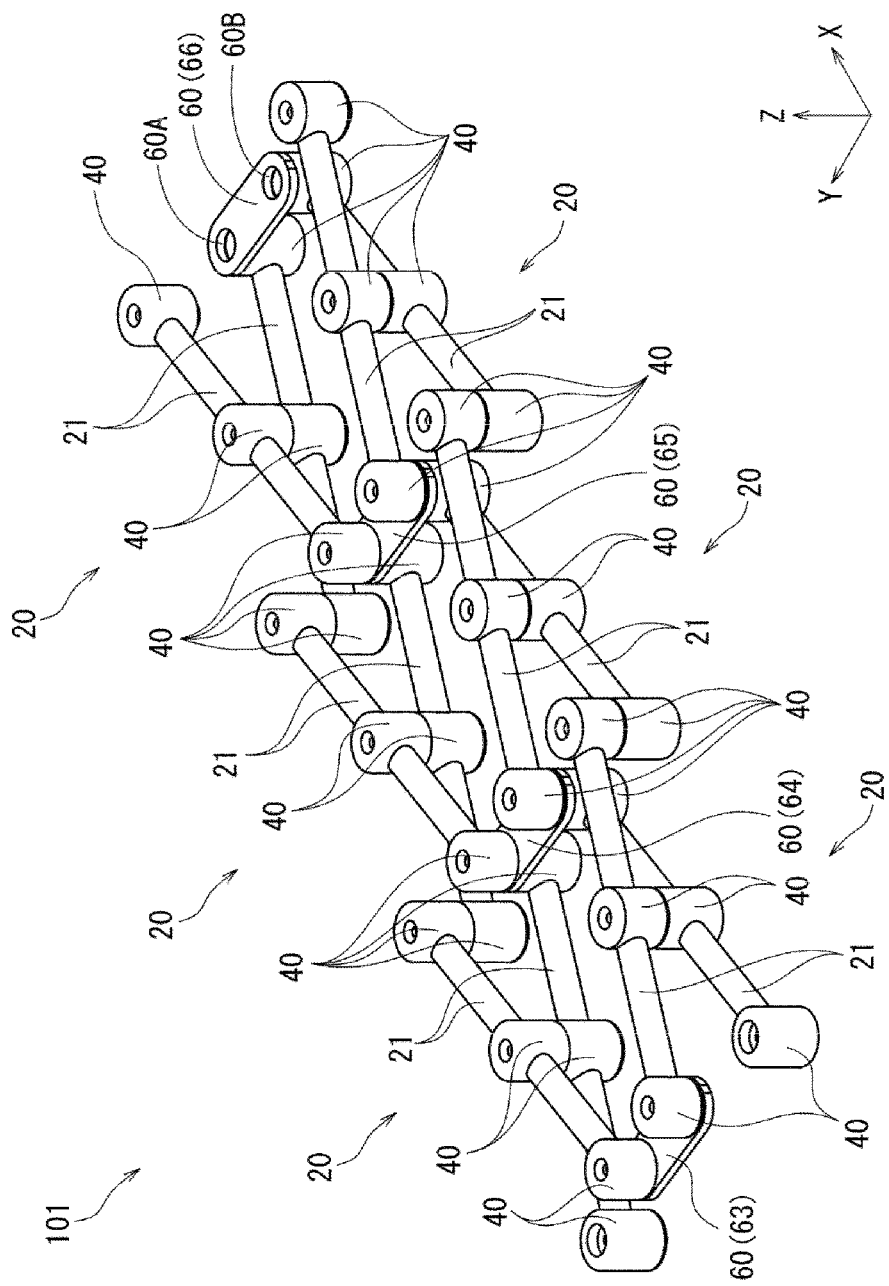
FIG. 22A is a perspective view of a multiple junction point extendable structure relating to second embodiment of the present invention.
Figure 22B:
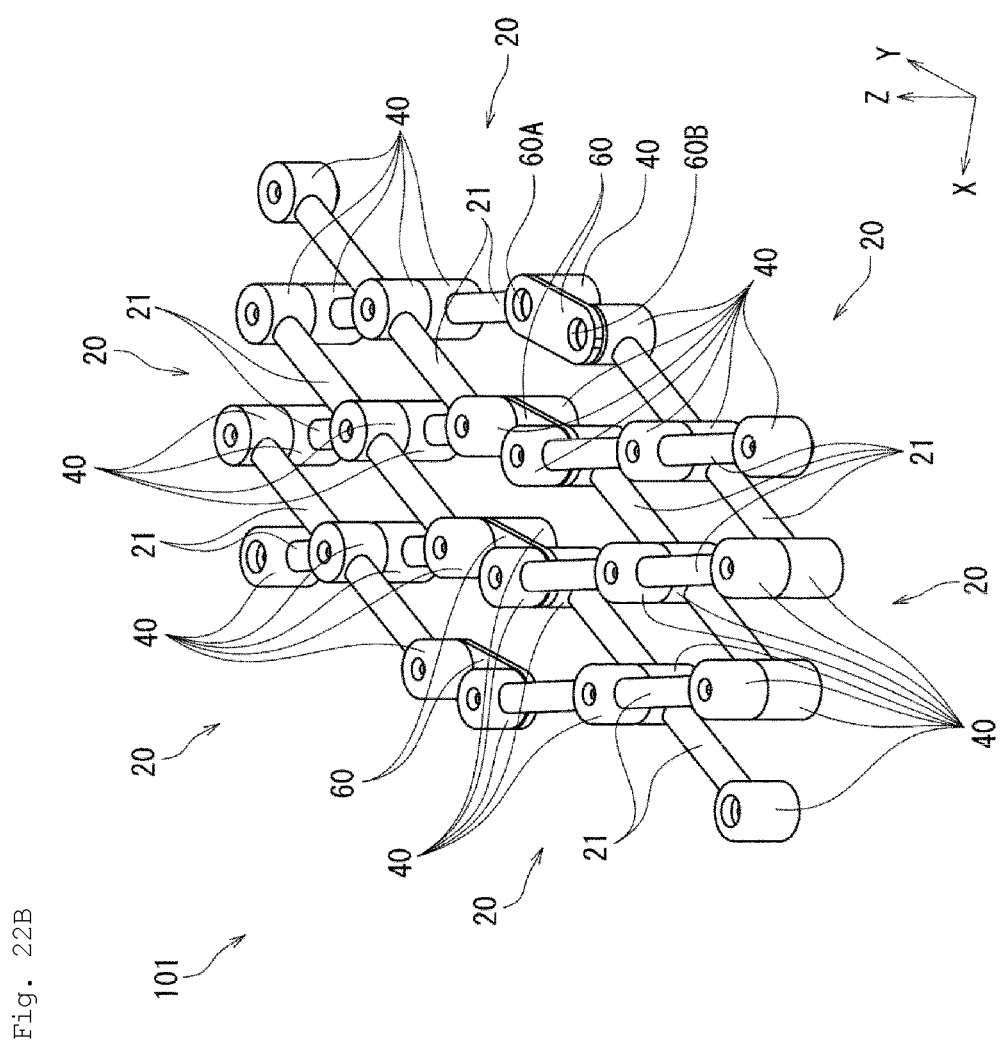
FIG. 22B is a perspective view of a multiple junction point extendable structure relating to a second embodiment of the present invention.
Figure 23:
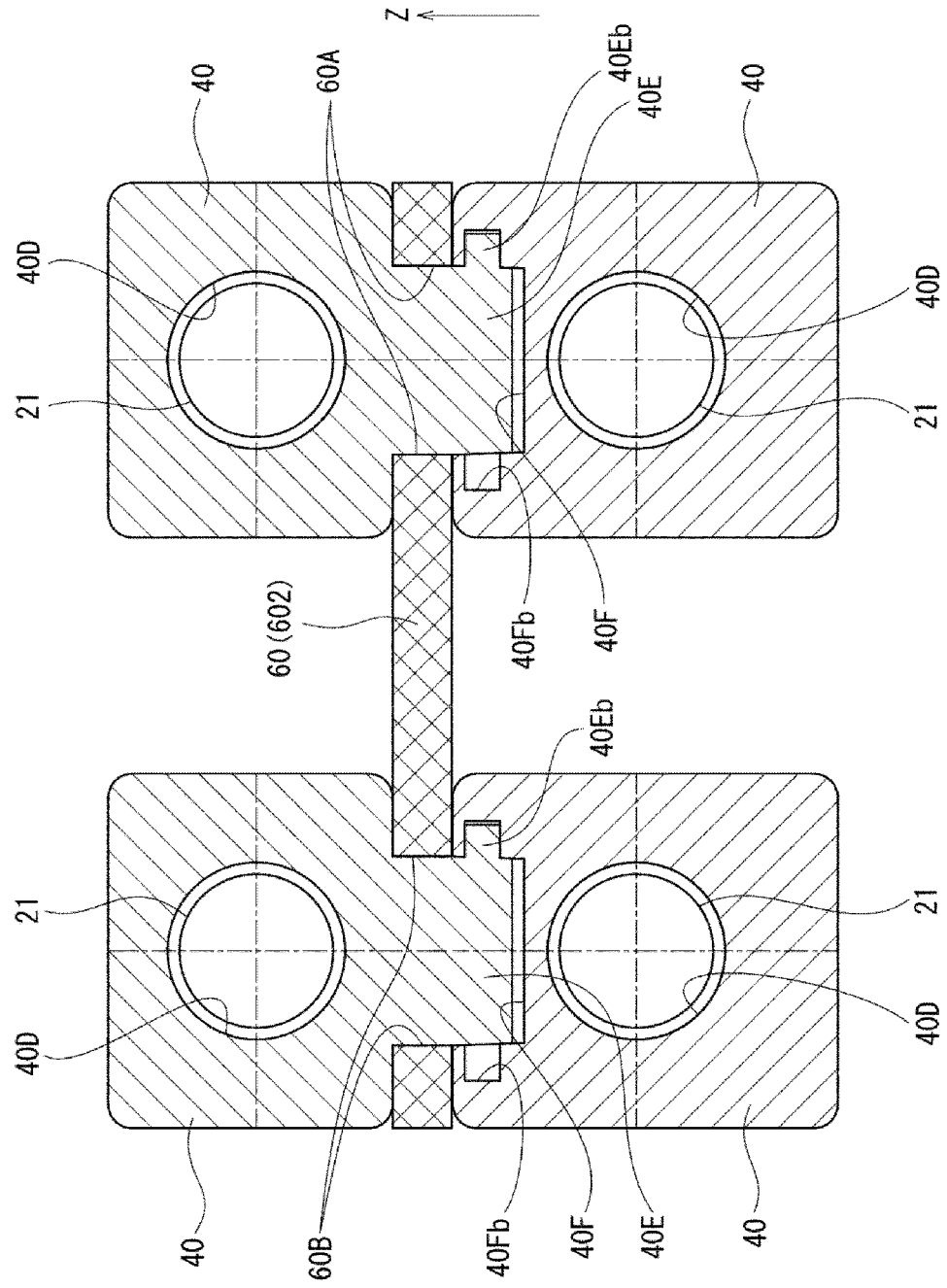
FIG. 23 is a section view of two horizontal coupling parts and an extension coupling part coupled to each other.

FIG. 22A is a perspective view of a multiple junction point extendable structure relating to a second embodiment of the present invention. FIG. 22B is a perspective view of a multiple junction point extendable structure relating to the second embodiment of the present invention. FIG. 23 is a section view of two horizontal coupling parts and an extension coupling part coupled to each other.

A multiple junction point extendable structure 101 relating to the second embodiment is different to the multiple junction point extendable structure 10 relating to the first embodiment in that it includes an extension coupling part 60. Hereinafter, the differences with the first embodiment will be described. Since the common points with the first embodiment have the same reference numerals attached, a description of these common points will be, in principle, omitted, and described as necessary.

As shown in FIG. 22A and FIG. 22B, the multiple junction point extendable structure 101, in addition to the plurality of rigid members 21 and the plurality of horizontal coupling parts 40, includes a plurality of the extension coupling parts 60. In FIG. 22A and FIG. 22B, the multiple junction point extendable structure 101 includes four of the extension coupling parts 60. Note that, the number of the extension coupling parts 60 included in the multiple junction point extendable structure 101 is not limited to four. In FIG. 22A, the four extension coupling parts 60 are positioned separated from each other in the X-direction. When the multiple junction point extendable structure 101 shown in FIG. 22A is contracted in the X-direction, it becomes the state shown in FIG. 22B. In FIG. 22B, the four extension coupling parts 60 are positioned proximate to each other in the X-direction.

In the second embodiment, each of the extension coupling parts 60 has a plate shape. Each of the extension coupling parts 60 has a plurality of through holes. In FIG. 22A and FIG. 22B, each of the extension coupling parts 60 has two through holes 60A and 60B. Note that, each of the extension coupling parts 60 may include three or more through holes. Moreover, each of the extension coupling parts 60 may have a shape other than a plate shape.

The convex part 40E of the horizontal coupling part 40 is capable of being inserted into each of the through holes 60A and 60B. In this way, the convex part 40E is connected to the extension coupling part 60, and the horizontal coupling part 40 and the extension coupling part 60 are coupled. At this time, the extension coupling part 60 may be rotatable with respect to the horizontal coupling part 40, or may be fixed to the horizontal coupling part 40 so as not to rotate.

As shown in FIG. 22A, the convex part 40E of the horizontal coupling part 40 is inserted into the through hole 60A of an extension coupling part 63, and a horizontal coupling part 40, which is different to this horizontal coupling part 40, is inserted into the through hole 60B of the extension coupling part 63. In this way, two of the horizontal coupling parts 40 are coupled via the extension coupling part 63.

In the case where two of the horizontal coupling parts 40 are coupled by inserting the convex part 40E into the concave part 40F, these two horizontal coupling parts 40 are overlapped in the Z-direction. On the other hand, in the case where two of the horizontal coupling parts 40 are coupled via the extension coupling part 63, these two horizontal coupling parts 40 are lined up in a direction orthogonal to the Z-direction.

The extension coupling part 60 is capable of being sandwiched by two of the horizontal coupling parts 40. In FIG. 22A, extension coupling parts 64 and 65 are sandwiched by two of the horizontal coupling parts 40. In this case, as shown in FIG. 23, the convex part 40E provided on one of the two horizontal coupling parts 40 penetrates through the through holes 60A and 60B of the extension coupling part 64, and is inserted into the concave part 40F provided on the other of the two horizontal coupling parts 40.

The horizontal coupling part 40 and the extension coupling part 60 can be coupled by a rod shaped member such as a pin or screw. In this case, as shown in FIG. 22A, a rod shaped member (not illustrated) penetrates through the through holes 60A and 60B of the extension coupling part 66, and is inserted into the concave part 40F of the horizontal coupling part 40.

In the configurations shown in FIG. 22A and FIG. 22B, each of the extension coupling parts 60 includes the through holes 60A and 60B. However, for example, each of the extension coupling parts 60 may include a convex part instead of the through holes 60A and 60B. In this case, the extension coupling part 60 and the horizontal coupling part 40 can be coupled, by inserting the convex part of the extension coupling part 60 into the concave part 40F of the horizontal coupling part 40.

Moreover, for example, each of the extension coupling parts 60 may include a convex part and a concave part instead of the through holes 60A and 60B. For example, a convex part is provided on one main surface of the plate shaped extension coupling part 60. The concave part is provided on the rear side of the concave part, in other words, on the other main surface of the plate shaped extension coupling part 60. In this case, the extension coupling part 60 and the horizontal coupling part 40 can be coupled, by inserting the convex part of the extension coupling part 60 into the concave part 40F of the horizontal coupling part 40. Moreover, the extension coupling part 60 and the horizontal coupling part 40 can be coupled, by inserting the convex part 40E of the horizontal coupling part 40 into the concave part of the extension coupling part 60. In this way, the extension coupling part 60 is capable of being sandwiched by two of the horizontal coupling parts 40.

It is not necessary for all of the plurality of extension coupling parts 60 included in the multiple junction point extendable structure 101 to have the same configuration, and they may have different configurations. For example, a part of the plurality of extension coupling parts 60 included in the multiple junction point extendable structure 101 may have a through hole, and the remainder of the plurality of extension coupling parts 60 included in the multiple junction point extendable structure 101 may have a convex part.

According to the second embodiment, two of the horizontal coupling parts 40 can be placed in a parallel arrangement via the extension coupling part 60.

Modified Example 1 of the Second Embodiment

Figure 24:
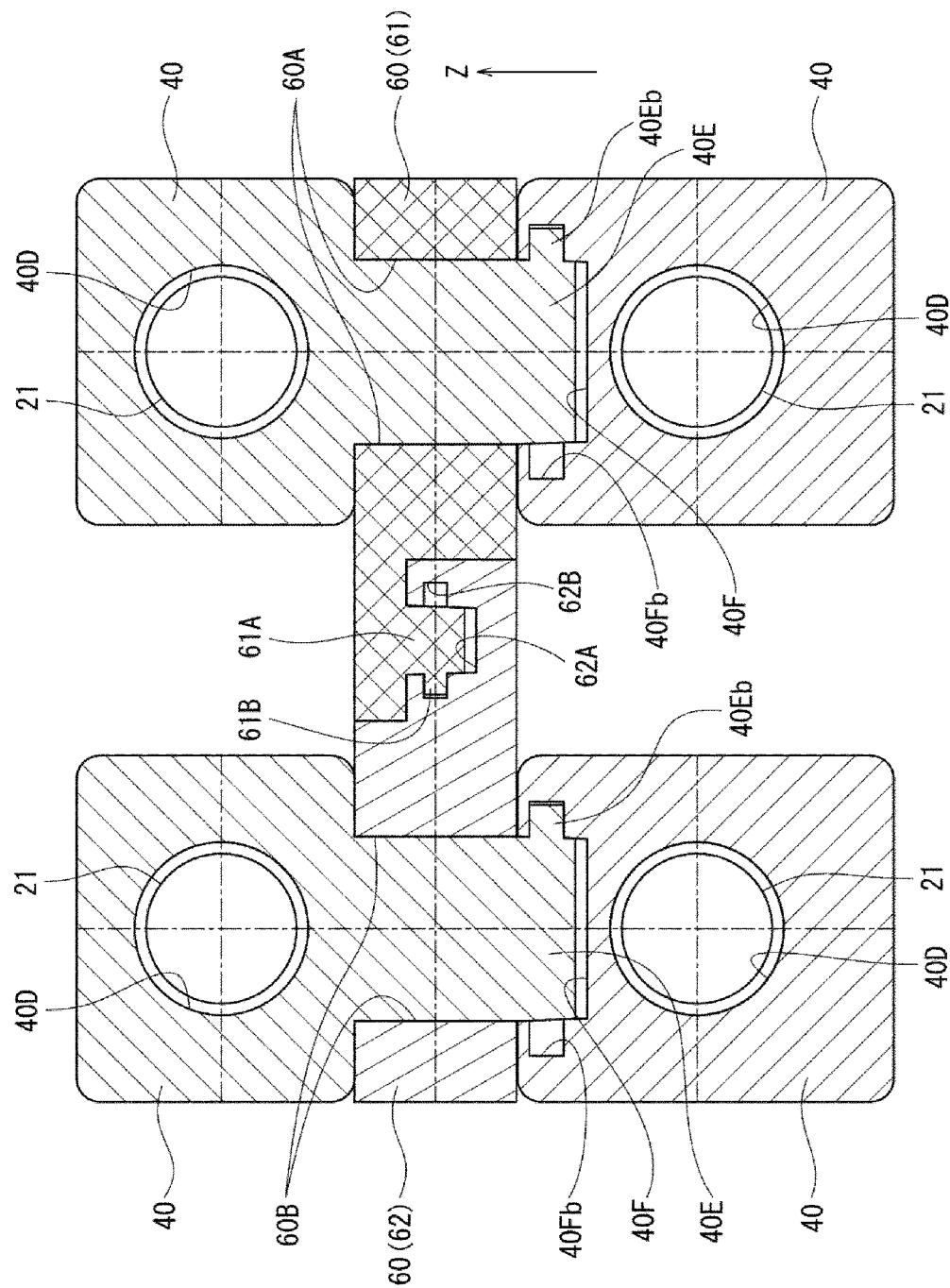
FIG. 24 is a section view of two horizontal coupling parts and an extension coupling part of a modified example coupled to each other.

FIG. 24 is a section view of two horizontal coupling parts and an extension coupling part of a modified example that are coupled to each other. As shown in FIG. 24, the extension coupling part 60 may be constituted by two portions (first portion 61 and second portion 62). Note that, the extension coupling part 60 may be constituted by three or more portions.

As shown in FIG. 24, the first portion 61 of the extension coupling part 60 includes the through hole 60A, and the second portion 62 of the extension coupling part 60 includes the through hole 60B. Each of the first portion 61 and the second portion 62 may include a plurality of through holes.

In FIG. 24, the coupling configuration of the first portion 61 and the second portion 62 has the same configuration as the coupling configuration of the two horizontal coupling parts 40 (refer to FIG. 6). Accordingly, the correspondence relationship of these two coupling configurations will be shown below, and a more detailed description will be omitted. The convex part 40E, the projection 40Eb, the concave part 40F, and the annular groove 40Fb in the coupling configuration of two of the horizontal coupling parts 40 (refer to FIG. 6) respectively correspond to a convex part 61A, a projection 61B, a concave part 62A, and an annular groove 62B in the coupling configuration of the first portion 61 and the second portion 62 (refer to FIG. 24). Moreover, the second portion 62 has a notched part that is a part of the inner side surface of the concave part 62A cut out to enable passage of the projection 61B. This notched part communicates between the annular groove 62B and the outside of the second portion 62 along the Z-direction. This notched part corresponds to the notched part 40Fc in the coupling configuration of two of the horizontal coupling parts 40 (refer to FIG. 6).

Modified Example 2 of the Second Embodiment

Figure 25:
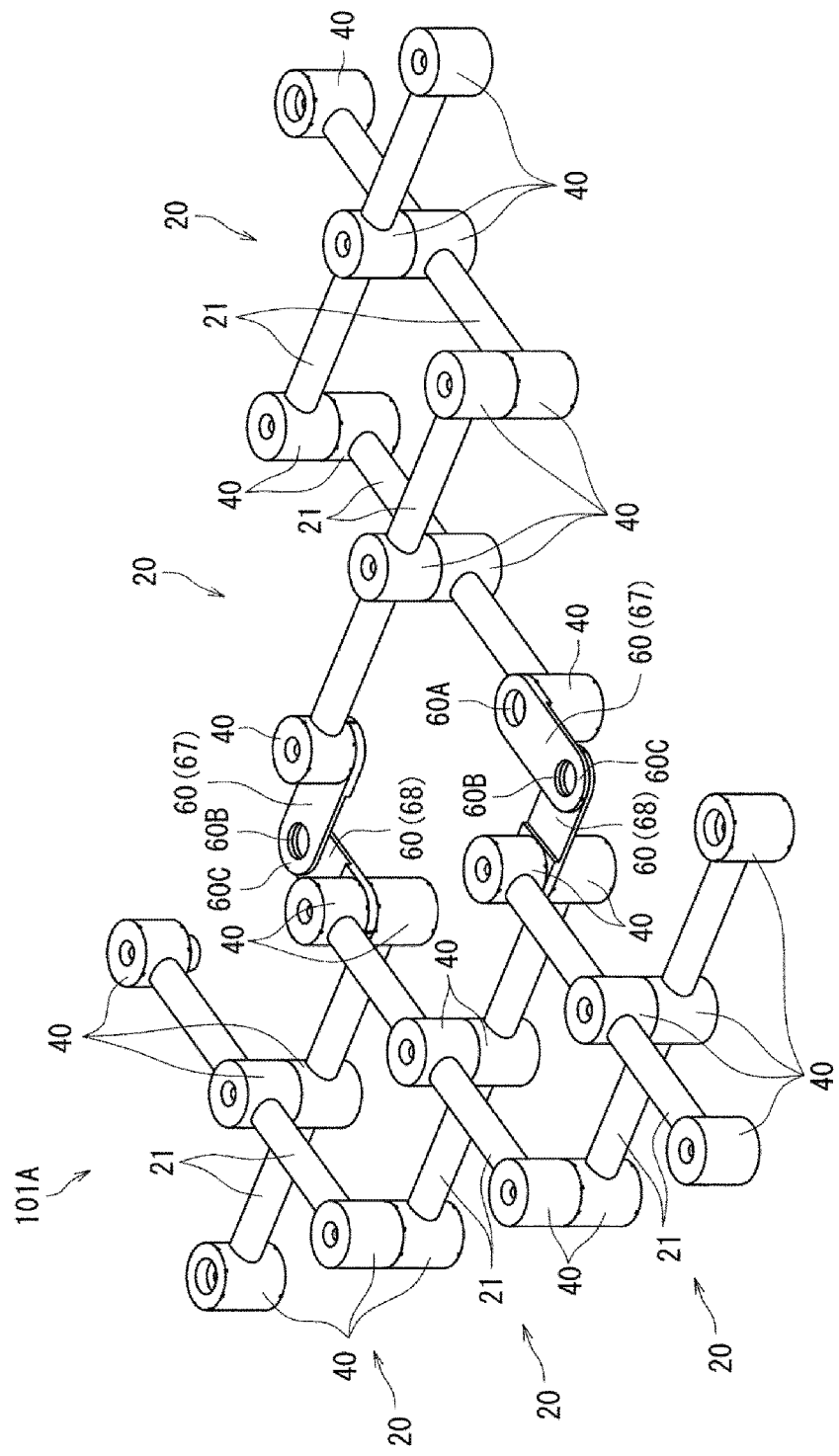
FIG. 25 is a perspective view of a multiple junction point extendable structure relating to a modified example of a second embodiment of the present invention.

FIG. 25 is a perspective view of a multiple junction point extendable structure relating to a modified example of the second embodiment of the present invention. Hereinafter, the differences of a multiple junction point extendable structure 101A relating to modified example 2 with the multiple junction point extendable structure 101 will be described.

In the multiple junction point extendable structure 101A, adjacent horizontal coupling parts 40 are coupled to each other via two of the extension coupling parts 60.

As shown in FIG. 25, an extension coupling part 67 is coupled to the horizontal coupling part 40, and an extension coupling part 68 is coupled to a different horizontal coupling part 40. While each of the extension coupling parts 67 and 68 are coupled to the horizontal coupling part 40, by inserting the convex part 40E of the horizontal coupling part 40 into the through hole 60A, the coupling means is not limited to this. Moreover, in modified example 2, each of the extension coupling parts 67 and 68 is fixed to the horizontal coupling part 40 so as to not rotate. Note that, each of the extension coupling parts 67 and 68 may be rotatably coupled with respect to the horizontal coupling part 40.

The extension coupling part 60 extends from the coupled horizontal coupling part 40 in a direction orthogonal to the Z-direction (for example, the X-direction or the Y-direction). This extended portion is an extension part 60C. Note that, the extension direction of the extension coupling part 60 from the horizontal coupling part 40 is not limited to a direction orthogonal to the Z-direction, and may be a direction that intersects the Z-direction.

The through hole 60B of the extension coupling part 67 and the through hole 60B of the extension coupling part 68 are overlapped when seen from the Z-direction. The extension coupling parts 67 and 68 are rotatably coupled around an axial line parallel to the Z-direction, by inserting a pin or screw into the two overlapped through holes 60B.

At the time when an angle formed by two of the rigid members 21 of each of the coupling structures 20 is 90 degrees, when seen from the Z-direction, it is preferable for an angle formed by the two extension coupling parts 60 (67 and 68) coupled to each other to be 90 degrees, which matches the angle formed by the two rigid members 21. However, an angle formed by the two extension coupling parts 60 (67 and 68) may not be the same as the angle formed by the two rigid members 21, or may be an angle other than 90 degrees. For example, at the time when an angle formed by the two rigid members 21 is 90 degrees, an angle formed by the two extension coupling parts 60 (67 and 68) coupled to each other may be 180 degrees.

According to modified example 2, two of the coupling structures 20 can be arranged in a row via the extension coupling part 60.

Third Embodiment

Figure 26:
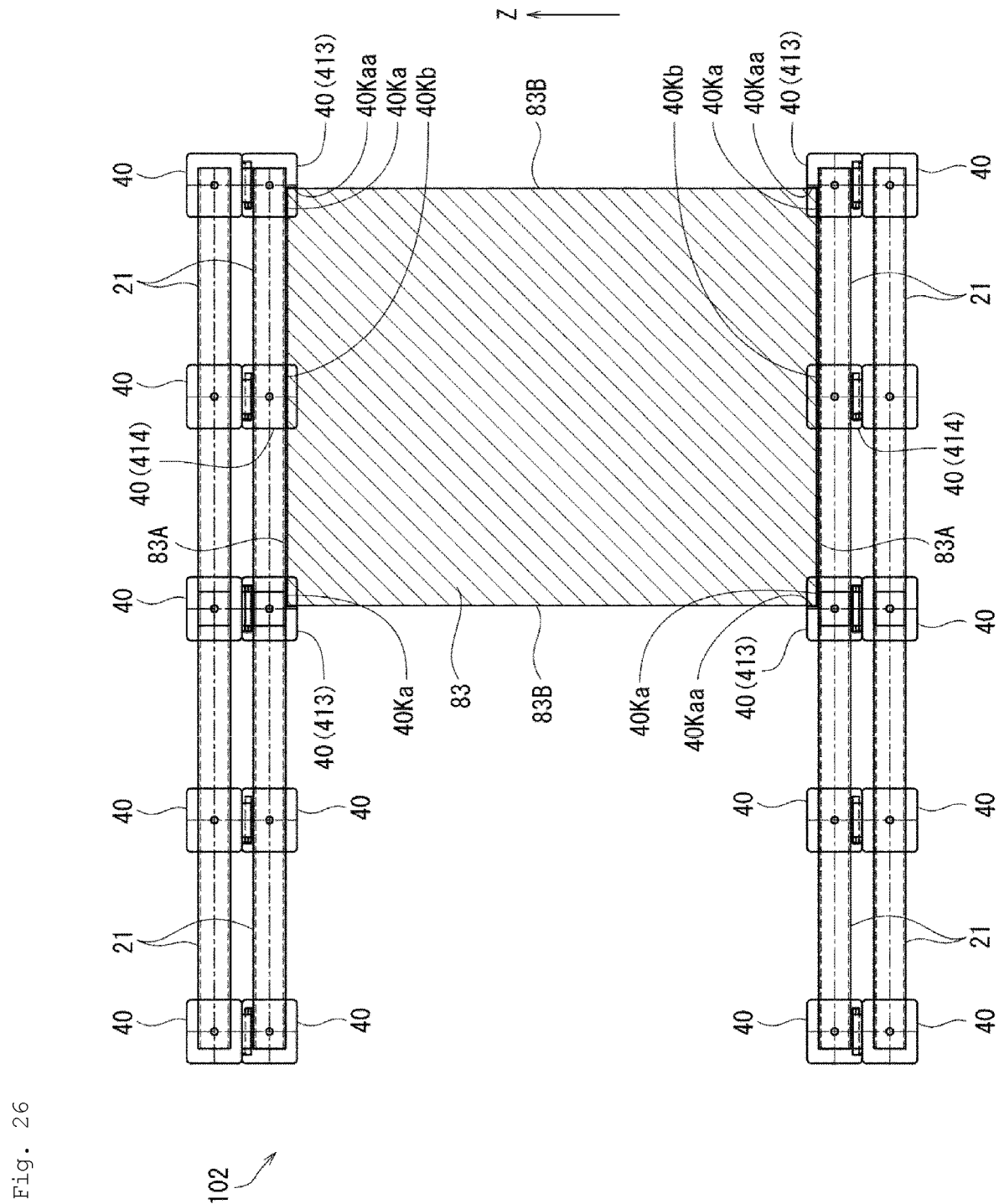
FIG. 26 is a front view of a multiple junction point extendable structure relating to a third embodiment of the present invention.
Figure 27:
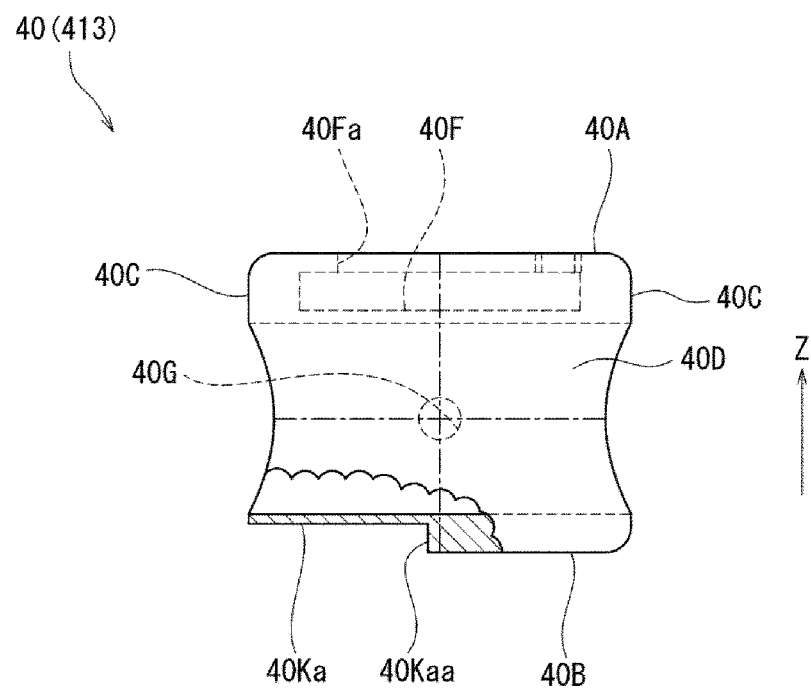
FIG. 27 is a front view of a horizontal coupling part having a groove part.
Figure 28:
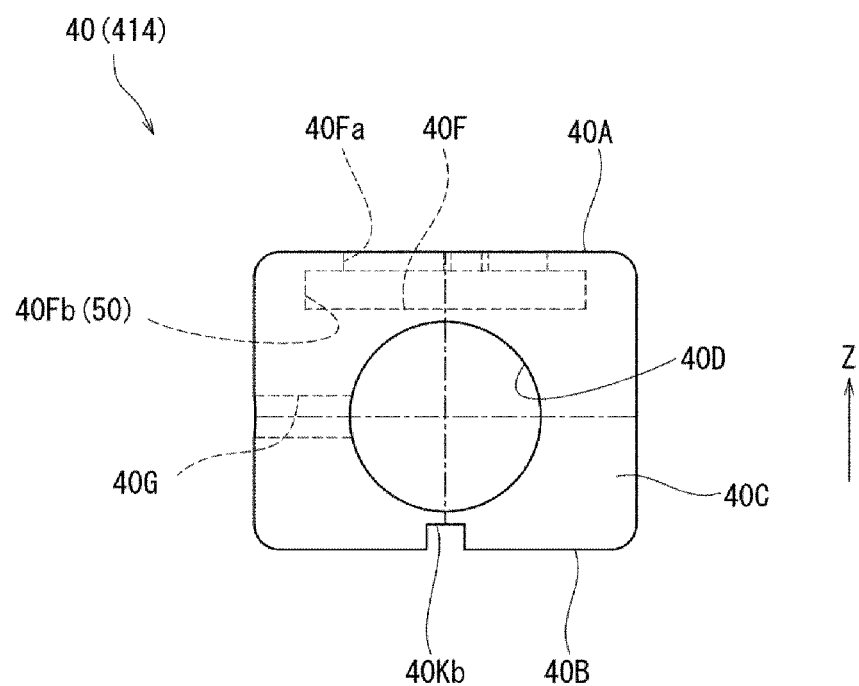
FIG. 28 is a side view of a horizontal coupling part having a groove part.

FIG. 26 is a front view of a multiple junction point extendable structure relating to a third embodiment of the present invention. FIG. 27 is a front view of a horizontal coupling part having a groove part. FIG. 28 is a side view of a horizontal coupling part having a groove part.

A multiple junction point extendable structure 102 relating to the third embodiment is different to the multiple junction point extendable structure 10 relating to the first embodiment in that it includes a plate shaped member 83, and at least a part of a plurality of the horizontal coupling parts 40 includes groove parts 40Ka and 40Kb. Hereinafter, the differences with the first embodiment will be described. Since the common points with the first embodiment have the same reference numerals attached, a description of these common points will be, in principle, omitted, and described as necessary.

As shown in FIG. 26, the multiple junction point extendable structure 102, in addition to a plurality of the rigid members 21 and a plurality of the horizontal coupling parts 40, includes one or a plurality of the plate shaped members 83. In FIG. 26, the multiple junction point extendable structure 102 includes one plate shaped member 83.

The plate shaped member 83 is made of a material such as a resin of acrylic or the like, glass, metal, or wood. In FIG. 26, while the main surface of the plate shaped member 83 is a rectangle, the shape of the main surface of the plate shaped member 83 is not limited to a rectangle, and may be, for example, a hexagon or the like. Moreover, the plate shaped member 83 may have a plurality of members that are combined. For example, the plate shaped member 83 may be a member in which paper is attached to a plate frame (specifically, a Japanese sliding screen, a paper sliding door or the like). Moreover, the plate shaped member 83 may be a fabric or a film. Moreover, for example, the plate shaped member 83 may be a member in which a knob made of metal or the like is attached to a plate, such as exemplified by a door or the like. Moreover, the plate shaped member 83 may be configured to be openable and closable, such as exemplified by the above mentioned door, Japanese sliding screen, paper sliding door or the like. Moreover, the plate shaped member 83 may be a window made of glass or the like, or may be stained glass.

Six (four horizontal coupling parts 413 and two horizontal coupling parts 414) of a plurality of the horizontal coupling parts 40 included in the multiple junction point extendable structure 102 include a groove part. Each of the horizontal coupling parts 413 includes a groove part 40Ka on the bottom surface 40B, and each of the horizontal coupling parts 414 includes a groove part 40Kb on the bottom surface 40B. The widths of the groove parts 40Ka and 40Kb are the same or approximately the same as the width of the plate shaped member 83.

As shown in FIG. 26 and FIG. 27, the groove part 40Ka extends from an outer edge part to a central part of the bottom surface 40B. In other words, one end part of the groove part 40Ka in the longitudinal direction is opened at the side surface 40C, while in contrast to this, the other end part of the groove part 40Ka in the longitudinal direction is closed by a surface 40Kaa. Note that, while FIG. 27 is a front view of the horizontal coupling part 40, it is a section view only of one portion (a lower portion than the wave line within the figure).

As shown in FIG. 26 and FIG. 28, the groove part 40Kb extends from one of the two outer edge parts of the bottom surface 40B to the other. In other words, the groove part 40Kb has both the one end part and the other end part in the longitudinal direction opened at the side surface 40C.

As shown in FIG. 26, both end parts of a short side 83A of the main surface of the plate shaped member 83 are fitted with the groove part 40Ka, by being inserted into the groove part 40Ka. In this way, each of two long sides 83B of the main surface of the plate shaped member 83 makes contact with the surface 40Kaa of the groove part 40Ka of the horizontal coupling part 413. A central part of the short side 83A of the main surface of the plate shaped member 83 is fitted with the groove part 40Kb, by being inserted into the groove part 40Kb. In FIG. 26, the plate shaped member 83 is supported by the horizontal coupling parts 40 at six locations, which include four corners of the main surface.

Note that, the groove parts 40Ka and 40Kb may be formed on the bottom surface 40A, or may be formed on both of the bottom surfaces 40A and 40B. The groove part 40Ka may be formed on one of the bottom surfaces 40A and 40B, and the groove part 40Kb may be formed on the other of the bottom surface 40A and 40B.

In FIG. 26, while the short side 83A of the main surface of the plate shaped member 83 is inserted into the groove parts 40Ka and Kb, the long side 83B of the main surface of the plate shaped member 83 may be inserted into the groove parts 40Ka and 40Kb. Moreover, both the short side 83A and the long side 83B of the main surface of the plate shaped member 83 may be inserted into the groove parts 40Ka and Kb.

According to the third embodiment, by including the plate shaped member 83 mounted in the groove parts 40Ka and 40Kb in the multiple junction point extendable structure 102, the multiple junction point extendable structure 102 can be configured in a plane shape. In this way, the usage value of the multiple junction point extendable structure 102 can be increased.

Fourth Embodiment

Figure 29:
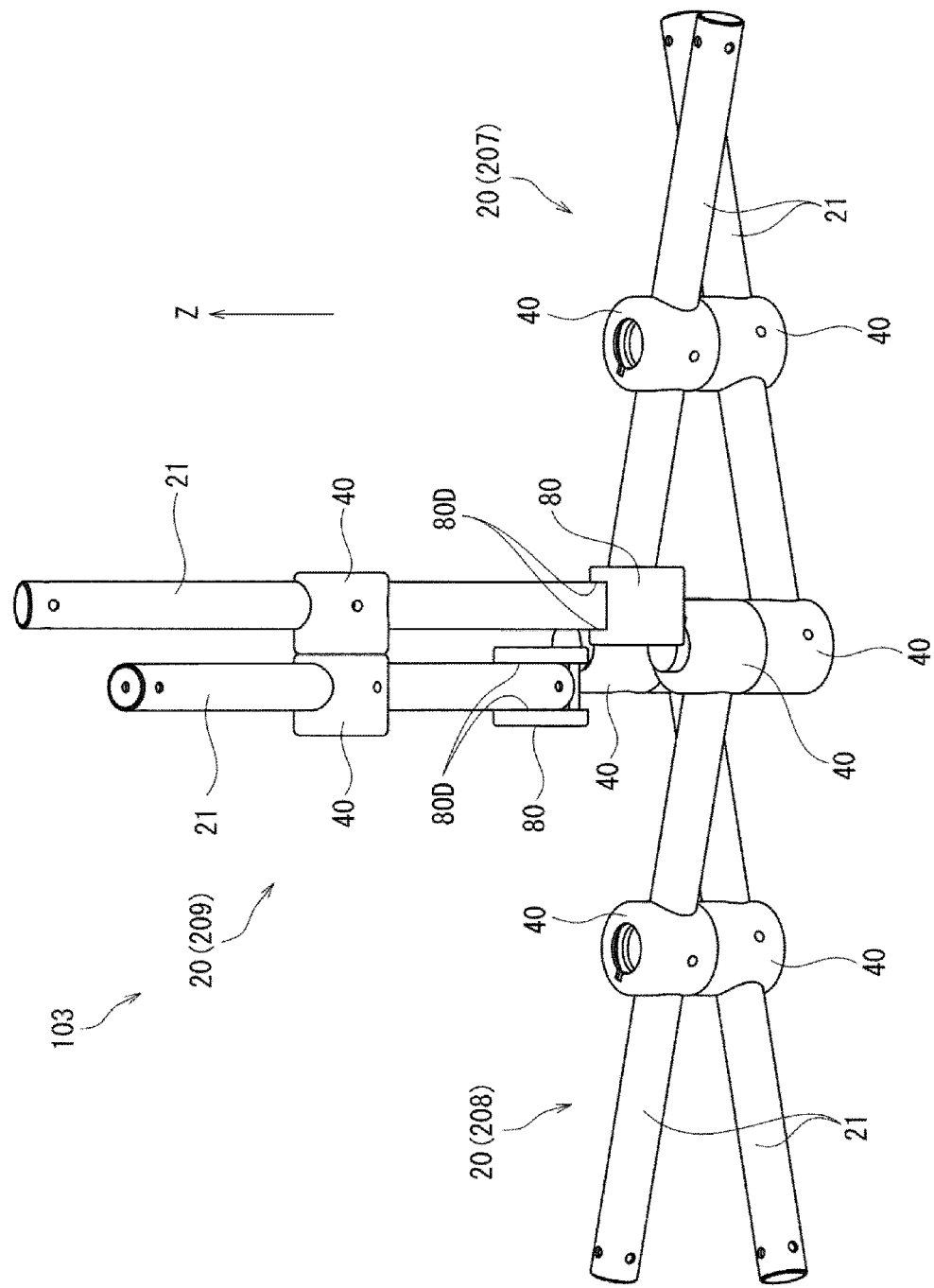
FIG. 29 is a perspective view of a multiple junction point extendable structure relating to a fourth embodiment of the present invention.
Figure 30:
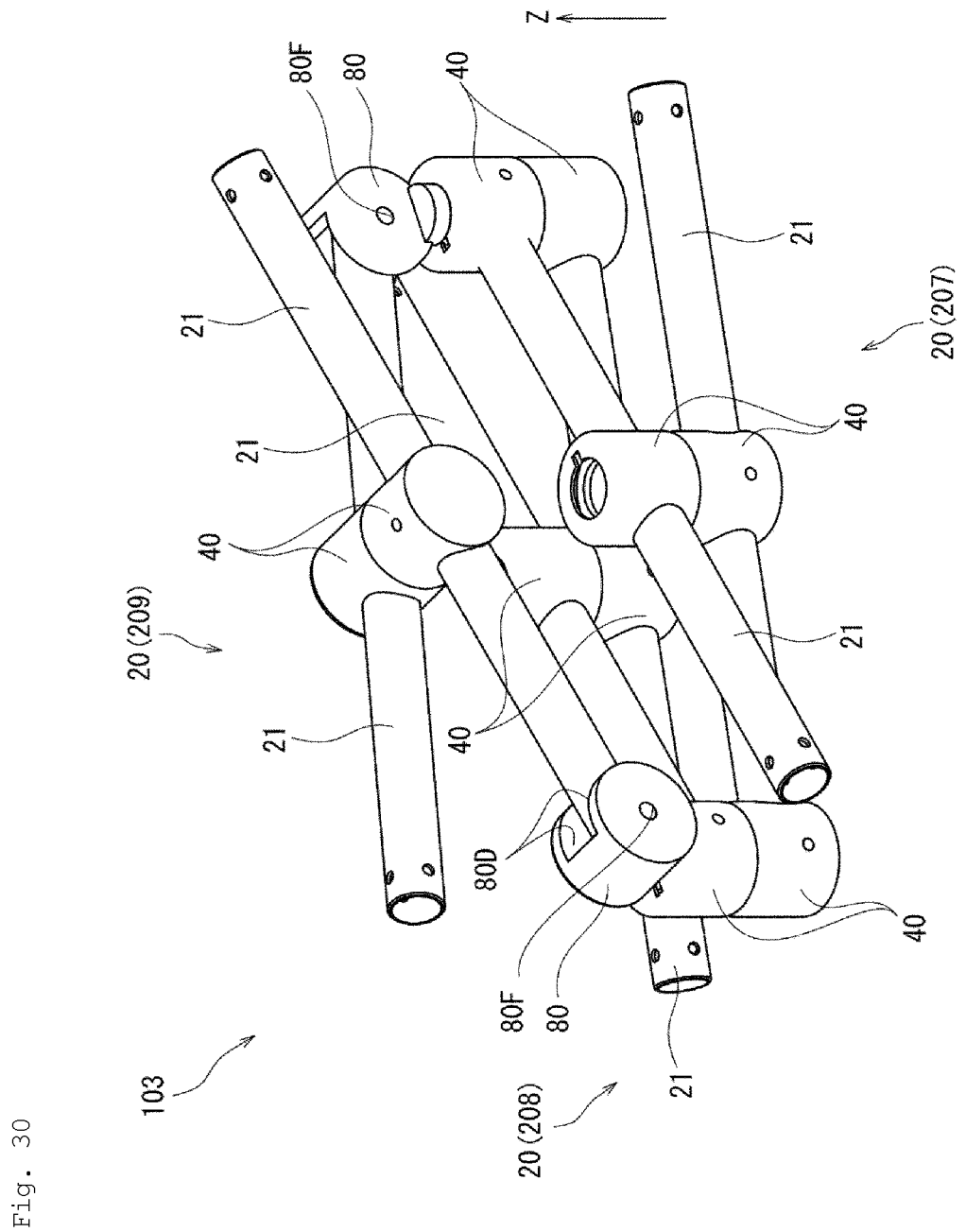
FIG. 30 is a perspective view of a multiple junction point extendable structure relating to a fourth embodiment of the present invention.
Figure 31:
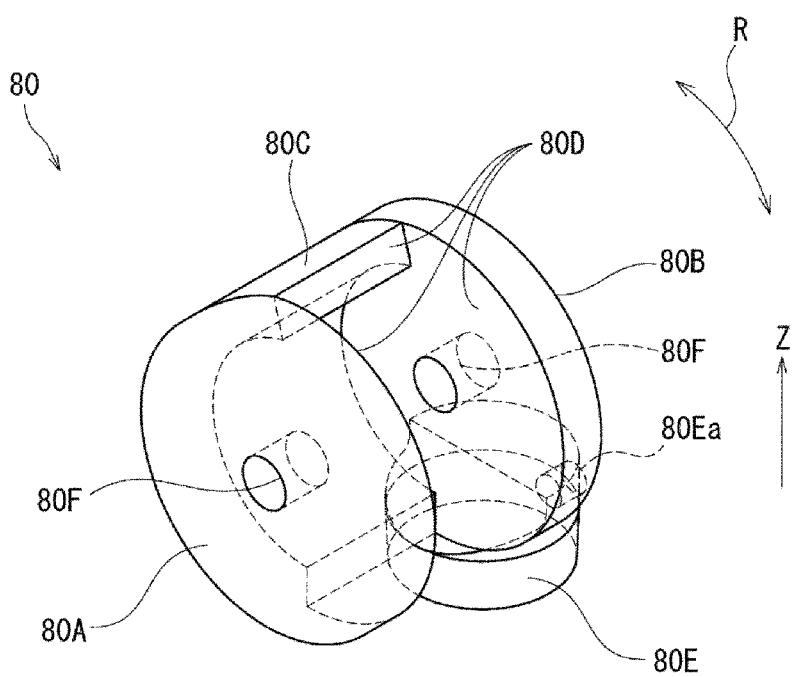
FIG. 31 is a perspective view of a vertical coupling part.

FIG. 29 is a perspective view of a multiple junction point extendable structure relating to a fourth embodiment of the present invention. FIG. 30 is a perspective view of a multiple junction point extendable structure relating to the fourth embodiment of the present invention. FIG. 31 is a perspective view of a vertical coupling part.

A multiple junction point extendable structure 103 relating to the fourth embodiment is different to the multiple junction point extendable structure 10 relating to the first embodiment in that it includes a vertical coupling part 80. The vertical coupling part 80 is an example of a vertical joint member. Hereinafter, the differences with the first embodiment will be described. Since the common points with the first embodiment have the same reference numerals attached, a description of these common points will be, in principle, omitted, and described as necessary.

As shown in FIG. 29 and FIG. 30, the multiple junction point extendable structure 103, in addition to a plurality of the rigid members 21 and a plurality of the horizontal coupling parts 40, includes at least one of the vertical coupling parts 80. In FIG. 29 and FIG. 30, the multiple junction point extendable structure 103 includes two of the vertical coupling parts 80. Note that, the number of the vertical coupling parts 80 included in the multiple junction point extendable structure 103 is not limited to two.

The multiple junction point extendable structure 103 includes three coupling structures 207, 208, and 209. Each of the coupling structures 207 and 208 includes two of the rigid members 21 and four of the horizontal coupling parts 40. The coupling structure 209 includes two of the rigid members 21, two of the horizontal coupling parts 40, and two of the vertical coupling parts 80. One of the two vertical coupling parts 80 is coupled to the horizontal coupling part 40 of the coupling structure 207. The other of the two vertical coupling parts 80 is coupled to the horizontal coupling part 40 of the coupling structure 208. In FIG. 29, the coupling structure 209 extends in the Z-direction, and the coupling structures 207 and 208 extend in a direction orthogonal to the Z-direction. In FIG. 30, the coupling structure 209 contracts in the Z-direction, and the coupling structures 207 and 208 contract in a direction orthogonal to the Z-direction.

The number of coupling structures included in the multiple junction point extendable structure 103 is not limited to three. Each number of the rigid members 21, the horizontal coupling parts 40, and the vertical coupling parts 80 included in each of the coupling structures is not limited to each number shown in FIG. 29 and FIG. 30. The coupling structures 207 and 208 may include the vertical coupling part 80, and the coupling structure 209 may not include the vertical coupling part 80.

Hereinafter, the configuration of the vertical coupling part 80 will be described, while referring to FIG. 31.

As shown in FIG. 31, the vertical coupling part 80 has a roughly columnar shape. The vertical coupling part 80 includes, as outer surfaces, a pair of bottom surfaces 80A and 80B, and a side surface 80C. The bottom surfaces 80A and 80B are facing opposite each other. The side surface 80C connects the outer edge parts of the pair of bottom surfaces 80A and 80B. Note that, the vertical coupling part 80 may have a shape other than a columnar shape.

The vertical coupling part 80 includes a support part 80D, a convex part 80E, and a through hole 80F. The support part 80D is an example of an inserted part.

The support part 80D is formed on the side surface 80C. The support part 80D is opened along a circumferential direction R of the side surface 80C. As shown in FIG. 29 and FIG. 30, the rigid member 21 is inserted into the support part 80D along an insertion direction that intersects the Z-direction. The insertion direction is an example of an intersecting direction. The rigid member 21 is rotatably supported along the circumferential direction R (refer to FIG. 31) by the support part 80D. In other words, the rigid member 21 is coupled to the vertical coupling part 80 via the support part 80D.

The circumferential direction R is along the circumference of an axial line parallel to a direction orthogonal to both the Z-direction and the insertion direction (in other words, a direction orthogonal to the pair of bottom surfaces 80A and 80B). In FIG. 31, this axial line passes through the center of the through hole 80F. The through hole 80F penetrates through the vertical coupling part 80 from the bottom surface 80A to the bottom surface 80B, via the support part 80D. Note that, this axial line is not limited to a direction orthogonal to the pair of bottom surfaces 80A and 80B, and may extend in a direction that intersects the pair of bottom surfaces 80A and 80B.

In the fourth embodiment, a through hole (not illustrated) is formed in the rigid member 21 inserted into the support part 80D. The rigid member 21 is positioned with respect to the support part 80D, so that this through hole is positioned on a straight line with the through hole 80F. Afterwards, a shaft rod (not illustrated) is inserted into this through hole and the through hole 80F. In this way, as mentioned above, the rigid member 21 is rotatably supported along the circumferential direction R (in other words, rotatably around the axial line) by the support part 80D.

Note that, the configuration in which the rigid member 21 is rotatably supported by the support part 80D is not limited to the above mentioned configuration, and various publicly known configurations are capable of being adopted. Moreover, the rigid member 21 may be fixed with respect to the vertical coupling part 80. In other words, the rigid member 21 may not rotate with respect to the support part 80D. Moreover, the rigid member 21 and the vertical coupling part 80 may be attachable and detachable with respect to each other, similar to the rigid member 21 and the horizontal coupling part 40 in the first embodiment, or may not be attachable and detachable with respect to each other.

The convex part 80E is formed on the side surface 80C. The convex part 80E is configured similar to the convex part 40E of the horizontal coupling part 40. In other words, the convex part 80E corresponds to the convex part 40E. Accordingly, the convex part 80E is capable of being inserted into the concave part 40F of the horizontal coupling part 40. In the configurations shown in FIG. 29 and FIG. 30, the convex part 80E of the vertical coupling part 80 is inserted into the concave part 40F of the horizontal coupling part 40. In this way, the vertical coupling part 80 is rotatably supported, by the horizontal coupling part 40, around an axial line parallel to the Z-direction.

As shown in FIG. 31, the convex part 80E includes a projection 80Ea on the side surface. The projection 80Ea is configured similar to the projection 40Eb provided on the convex part 40E of the horizontal coupling part 40. In other words, the projection 40Eb can constitute a holding mechanism 50 for holding the coupling of the horizontal coupling part 40 and the vertical coupling part 80, along with the annular groove 40Fb and the notched part 40Fc of the horizontal coupling part 40.

The vertical coupling part 80 may include a concave part (not illustrated) instead of the convex part 80E. This concave part is configured similar to the concave part 40F of the horizontal coupling part 40. In other words, this concave part corresponds to the concave part 40F. Accordingly, the convex part 40E of the horizontal coupling part 40 is capable of being inserted into this concave part. This concave part includes an annular groove and a notched part with the same configuration as the annular groove 40Fb and the notched part 40Fc of the horizontal coupling part 40. This annular groove and this notched part can constitute a holding mechanism 50 for holding the coupling of the horizontal coupling part 40 and the vertical coupling part 80, along with the projection 40Eb of the horizontal coupling part 40.

Note that, the vertical coupling part 80 may include a plurality of the above mentioned convex parts 80E, may include a plurality of the above mentioned concave parts, or may include both the above mentioned convex part 80E and concave part.

In the case where the rigid member 21 has a straight rod shape, and a plurality of the rigid members 21 are coupled via only the horizontal coupling part 40, the multiple junction point extendable structure 103 becomes a structure that widens in a plane shape. In contrast to this, in the case where the rigid member 21 has a straight rod shape, and a plurality of the rigid members 21 are coupled via the horizontal coupling part 40 and the vertical coupling part 80, the multiple junction point extendable structure 103 becomes a structure that also widens in a direction that intersects this surface. In other words, according to the fourth embodiment, by coupling the rigid members 21 via the vertical coupling part 80, the multiple junction point extendable structure 103 can be configured in a three-dimensional manner.

According to the fourth embodiment, since the rigid member 21 is rotatable, the extension and contraction direction of the multiple junction point extendable structure 103 can be varied.

Fifth Embodiment

Figure 32:
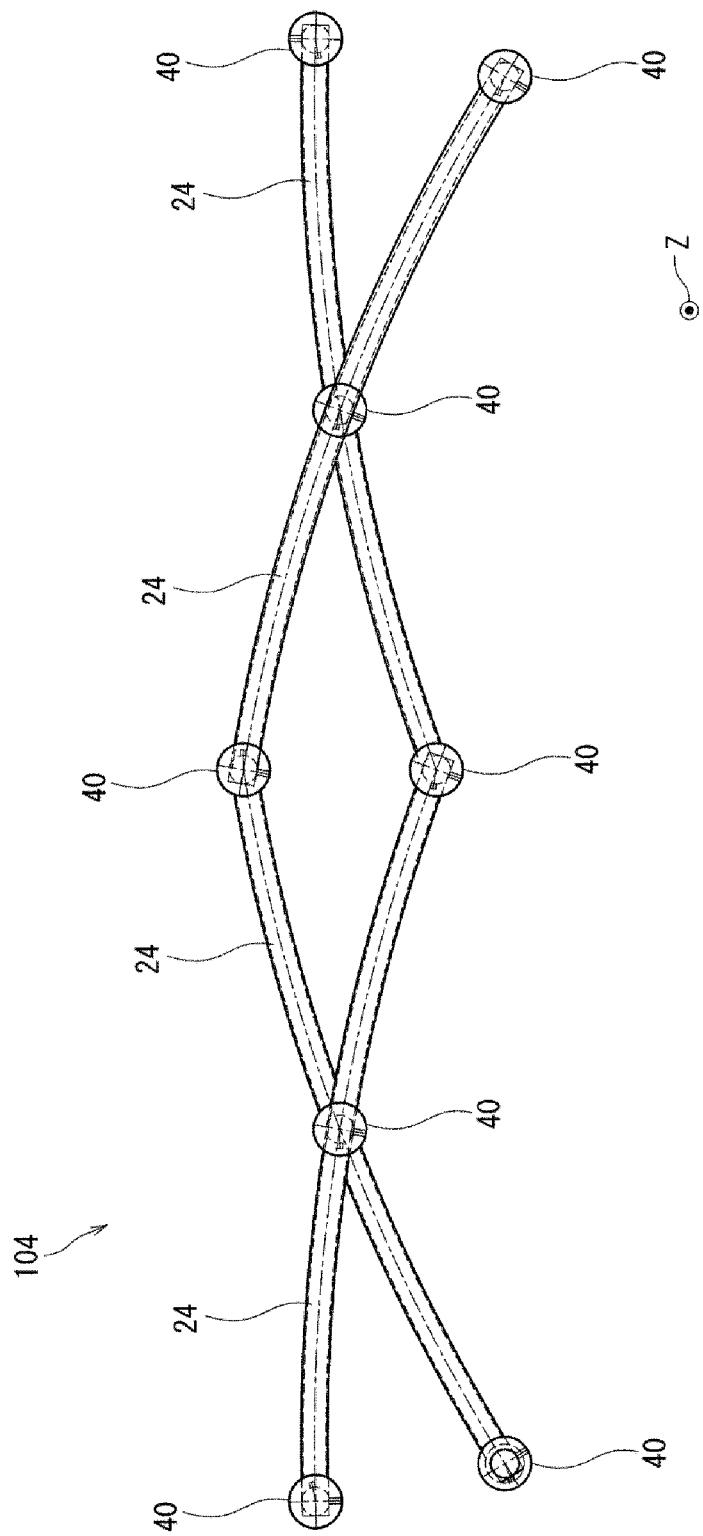
FIG. 32 is a planar view of a multiple junction point extendable structure relating to a fifth embodiment of the present invention.

FIG. 32 is a planar view of a multiple junction point extendable structure relating to a fifth embodiment of the present invention. A multiple junction point extendable structure 104 relating to the fifth embodiment is different to the multiple junction point extendable structure 10 relating to the first embodiment in that it includes a rigid member 24.

Hereinafter, the differences with the first embodiment will be described. Since the common points with the first embodiment have the same reference numerals attached, a description of these common points will be, in principle, omitted, and described as necessary.

As shown in FIG. 32, the multiple junction point extendable structure 104 includes a plurality of the rigid members 24 and a plurality of the horizontal coupling parts 40. While the rigid member 21 (refer to FIG. 1) has a rod shape extending in a straight line, the rigid member 24 has a curved rod shape. For the other points, the rigid member 24 has the same configuration as the rigid member 21. For example, the cross section shape of the rigid member 24 may be an arbitrary shape such as a round shape. Moreover, for example, the rigid member 24 may be hollow, or may not be hollow. Moreover, for example, while the configuration material of the rigid member 24 is resin, it is not limited to resin, and may be made of glass, porcelain, wood, metal or the like.

Note that, the rigid member 24 is not limited to a curved rod shape, and may have a bent rod shape. In other words, in the fifth embodiment, the rigid member 24 has a bent rod shape.

The multiple junction point extendable structure 104 may include the rigid member 21, in addition to the rigid member 24.

According to the fifth embodiment, the multiple junction point extendable structure 104 can extend and contract in a curved direction.

Sixth Embodiment

Figure 33:
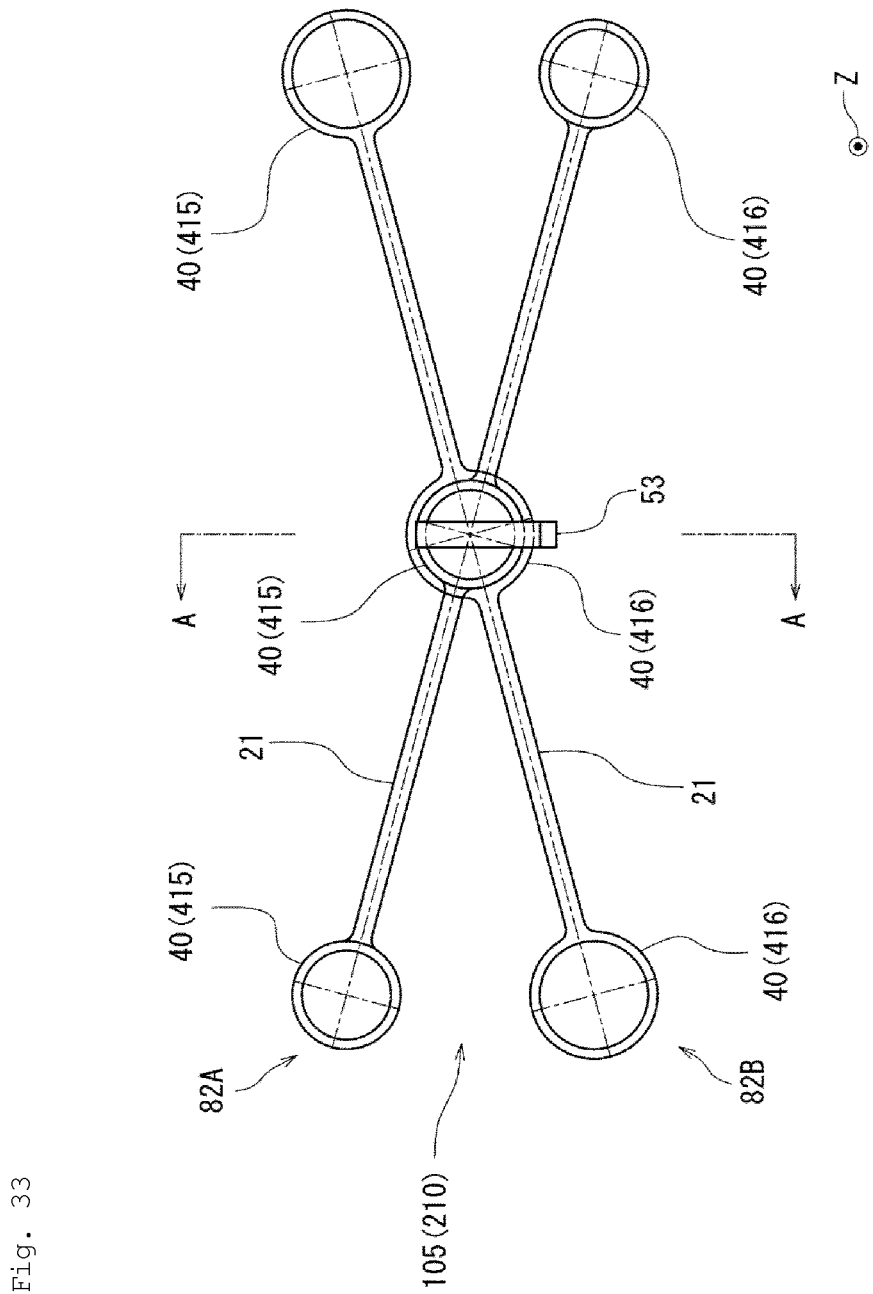
FIG. 33 is a planar view of a coupling structure constituting a multiple junction point extendable structure relating to a sixth embodiment of the present invention.
Figure 34:
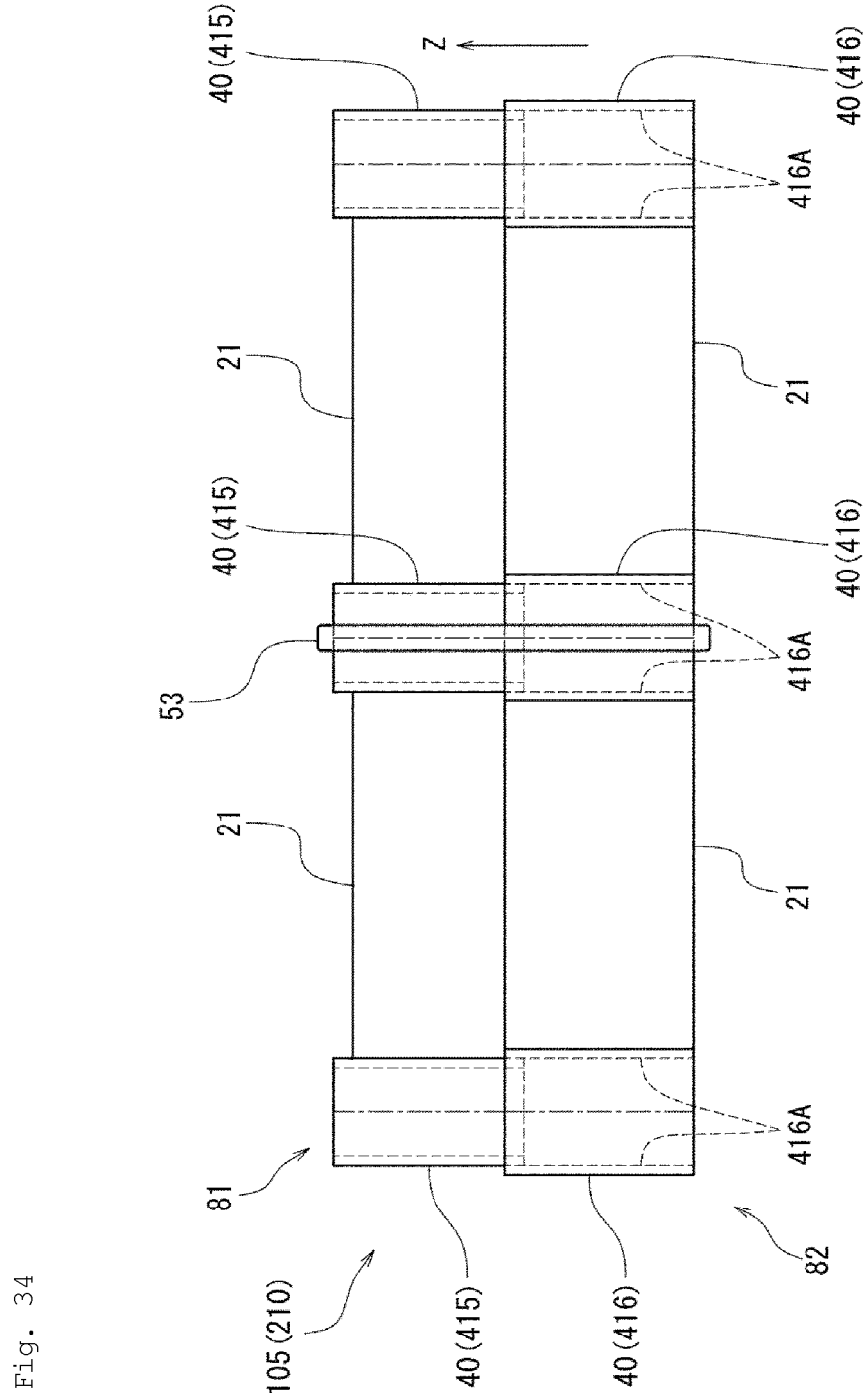
FIG. 34 is a front view of a coupling structure constituting a multiple junction point extendable structure relating to a sixth embodiment of the present invention.
Figure 35:
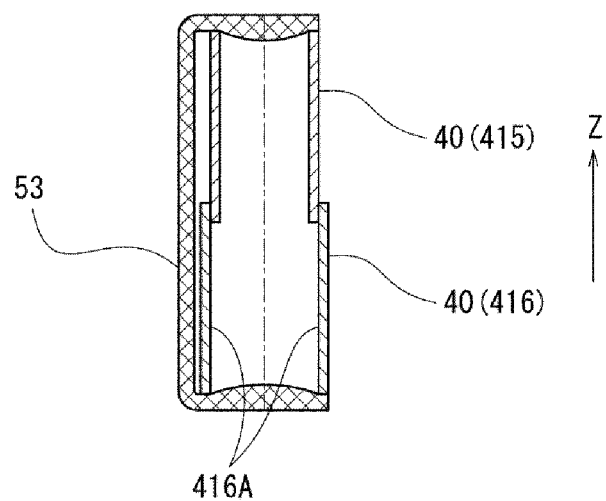
FIG. 35 is a section view showing an A-A cross-section of FIG. 33.

FIG. 33 is a planar view of a coupling structure constituting a multiple junction point extendable structure relating to a sixth embodiment of the present invention. FIG. 34 is a front view of a coupling structure constituting a multiple junction point extendable structure relating to the sixth embodiment of the present invention. FIG. 35 is a section view showing an A-A cross section of FIG. 33. A multiple junction point extendable structure 105 relating to the sixth embodiment is different to the multiple junction point extendable structure 10 relating to the first embodiment in that the horizontal coupling parts and rigid members are integrally molded. Hereinafter, the differences with the first embodiment will be described. Since the common points with the first embodiment have the same reference numerals attached, a description of these common points will be, in principle, omitted, and described as necessary.

As described below, the rigid members 21 and the horizontal coupling parts 40 may be coupled to each other by being integrally molded.

A coupling structure 210 shown in FIG. 33 is configured roughly the same as each of the coupling structures 201 to 206 shown in FIG. 1, and includes two of the rigid members 21 and six of the horizontal coupling parts 40. However, one of the two rigid members 21, and three horizontal coupling parts 415 of the six horizontal coupling parts 40, are integrally molded as an integrally molded member 82A. Moreover, the other of the two rigid members 21, and three horizontal coupling parts 416 of the six horizontal coupling parts 40, are integrally molded as an integrally molded member 82B. The coupling structure 210 is constituted by the two integrally molded members 82A and 82B.

In the sixth embodiment, while the integrally molded members 82A and 82B are made of aluminum, they may be made of a material other than aluminum (for example, various types of other metals such as copper, resin or the like).

The horizontal coupling parts 415 and 416 have a cylindrical shape. As shown in FIG. 34, the horizontal coupling part 415 is inserted into the through hole 416A of the horizontal coupling part 416. In this way, the integrally molded members 82A and 82B are capable of being rotatably coupled to each other. As shown in FIG. 33, the coupling structure 210 is formed, by inserting one of the horizontal coupling parts 415 constituting the integrally molded member 82A into one of the through holes 416A of the horizontal coupling part 416 constituting the integrally molded member 82B.

In the sixth embodiment, a holding member 53, with the same configuration as the holding member 51 (refer to FIG. 19) of modified example 5 of the first embodiment, is provided. As shown in FIG. 35, the holding member 53 holds the coupling of the horizontal coupling parts 415 and 416, by sandwiching the horizontal coupling parts 415 and 416 that are rotatably coupled to each other. Note that, the holding the coupling of the horizontal coupling parts 415 and 416 is not limited to the holding member 53, and the configurations of each of the embodiments mentioned above, for example, can be adopted.

Note that, the configuration of the sixth embodiment mentioned above, while referring to FIG. 33 to FIG. 35, is an example of a configuration in which the rigid members 21 and the horizontal coupling parts 40 are integrally molded, and may have another configuration. For example, the horizontal coupling part 415 may have a columnar shape, and not a cylindrical shape. Moreover, for example, the rigid member 21 and the horizontal coupling part 40 may be integrally molded, in each of the embodiments mentioned above and each of the embodiments mentioned later.

According to this configuration, the coupling structure 210 can be configured in a firm manner.

Seventh Embodiment

Figure 36:
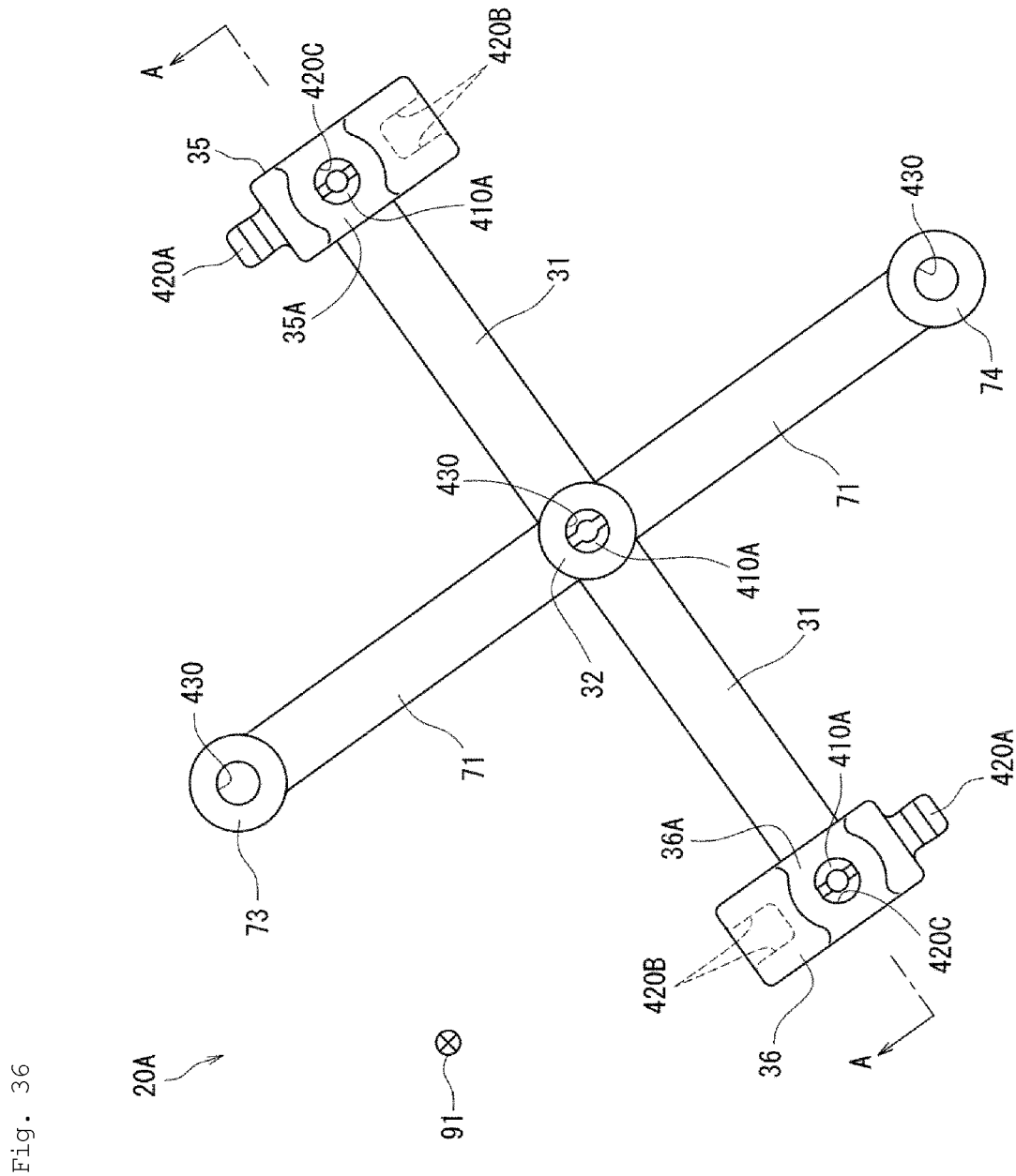
FIG. 36 is a planar view of a coupling structure included in a multiple junction point extendable structure relating to a seventh embodiment of the present invention.
Figure 37:
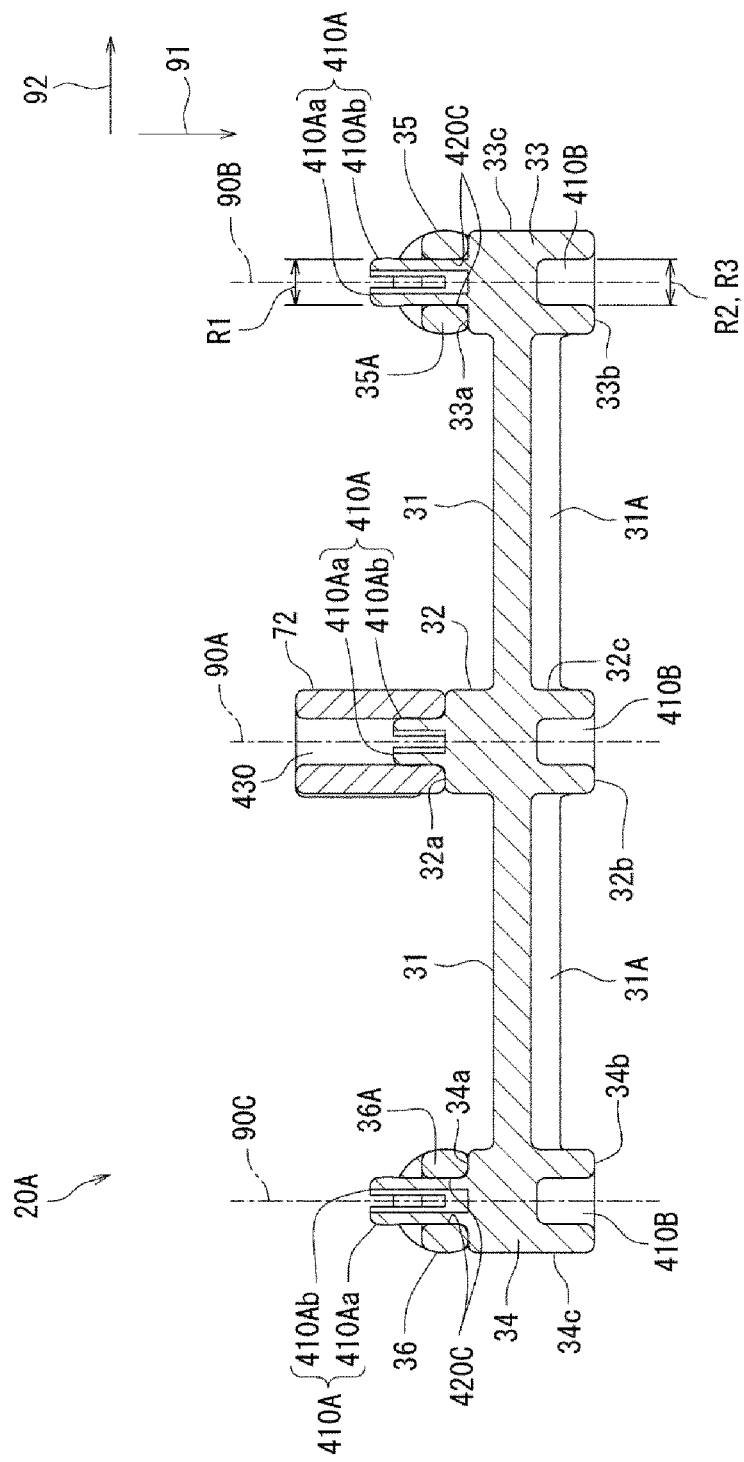
FIG. 37 is a section view showing an A-A cross-section of FIG. 36.

FIG. 36 is a planar view of a coupling structure included in a multiple junction point extendable structure 106 relating to a seventh embodiment of the present invention. FIG. 37 is a section view showing an A-A cross section of FIG. 36. In the following description, while terms showing directions such as "vertical", "upward", "downward", and "sideways" are used, these terms do not mean that the usage state or the like of the coupling structure and multiple junction point extendable structure relating to the present invention is limited.

In the seventh embodiment, a coupling structure 20A includes a first rigid member 31 and a second rigid member 71, such as shown in FIG. 36 and FIG. 37. Each of the first rigid member 31 and the second rigid member 71 is an example of a rigid member.

The first rigid member 31 and the second rigid member 71 are made of resin. Note that, the first rigid member 31 and the second rigid member 71 are not limited to resin. For example, the first rigid member 31 and the second rigid member 71 may be made of glass, porcelain, wood, metal or the like. The first rigid member 31 and the second rigid member 71 may be made of various types of the same material, or may be formed of various types of different materials.

The first rigid member 31 and the second rigid member 71 are arranged overlapped. In the following description, in the coupling structure 20A, for the sake of convenience of the description, the second rigid member 71 side will be set as an upper side and the first rigid member 31 side will be set as a lower side. In other words, the first rigid member 31 and the second rigid member 71 are arranged overlapped in a vertical direction 91, so that the second rigid member 71 is on an upper side and the first rigid member 31 is on a lower side. The vertical direction 91 is an example of an overlapping direction.

The first rigid member 31 and the second rigid member 71 are rotatably coupled to each other around a first axial line 90A parallel to the vertical direction 91. The first axial line 90A is an example of an axial line. The structure of the coupling of the first rigid member 31 and the second rigid member 71 will be mentioned later.

Each of the first rigid member 31 and the second rigid member 71 has a rod shape extending in a straight line when seen from the vertical direction 91. In this way, the first rigid member 31 and the second rigid member 71 constitute coupling structures that intersect each other when seen from the vertical direction 91. Note that, each of the first rigid member 31 and the second rigid member 71 is not limited to a rod shape extending in a straight line, and may have, for example, a bent rod shape, a curved rod shape, a plate shape, or a square columnar shape. Examples of shapes other than a rod shape extending in a straight line will be described in the embodiments mentioned later.

The coupling structure 20A includes the first rigid member 31, a first intermediate coupling part 32, a first one side coupling part 33, a first other side coupling part 34, a first joint member 35, and a second joint member 36. The first intermediate coupling part 32, the first one side coupling part 33, and the first other side coupling part 34 are examples of horizontal coupling parts. The first intermediate coupling part 32 is an example of an intermediate coupling part. The first one side coupling part 33 is an example of a one side coupling part. The first other side coupling part 34 is an example of an other side coupling part. Each of the first joint member 35 and the second joint member 36 is an example of a horizontal joint member.

Note that, in the seventh embodiment, while three of the horizontal coupling parts are provided in the first rigid member 31, the horizontal coupling parts provided in the first rigid member 31 are not limited to three. A configuration other than three of the horizontal coupling parts is described in a twelfth embodiment, which will be mentioned later.

The first rigid member 31, the first intermediate coupling part 32, the first one side coupling part 33, and the first other side coupling part 34 are integrally formed. The first joint member 35 and the second joint member 36 are separate members from the first rigid member 31, the first intermediate coupling part 32, the first one side coupling part 33, and the first other side coupling part 34. Note that, each of the first rigid member 31, the first intermediate coupling part 32, the first one side coupling part 33, and the first other side coupling part 34 may be formed as a separate member. In this case, at least one of the first intermediate coupling part 32, the first one side coupling part 33, and the first other side coupling part 34 may be attachable and detachable with respect to the first rigid member 31. Moreover, in this case, each of the first rigid member 31, the first intermediate coupling part 32, the first one side coupling part 33, and the first other side coupling part 34 may be made of the same material, or may be made of different materials.

The first rigid member 31 has a rod shape with a circular shaped cross section. Note that, the shape of the first rigid member 31 is not limited to a rod shape with a circular shaped cross section. For example, the first rigid member 31 may be hollow. Moreover, for example, the cross section of the first rigid member 31 may not have a circular shape, and may have a square shape. Moreover, the first rigid member 31 may not have a rod shape. For example, the first rigid member 31 may be a plate shaped member, or may have a three-dimensional structure.

As shown in FIG. 37, the first rigid member 31 includes a groove 31A. The groove 31A is formed so as to open underneath the first rigid member 31. The groove 31A extends along the first rigid member 31 in the longitudinal direction. A panel (for example, the plate shaped member 83 of FIG. 26) or the like can be fitted into the groove 31A. Note that, the groove 31A may be formed so as to open upward or sideways. The first rigid member 31 may include a plurality of the grooves 31A. In the seventh embodiment, while the groove 31A is formed only on the first rigid member 31, the groove 31A may be formed not only on the first rigid member 31, but also across the first intermediate coupling part 32, the first one side coupling part 33, and the first other side coupling part 34.

The first intermediate coupling part 32 is formed on a center part of the first rigid member 31 in the longitudinal direction. The first one side coupling part 33 is formed on one end part of the first rigid member 31 in the longitudinal direction. The first other side coupling part 34 is formed on the other end part of the first rigid member 31 in the longitudinal direction. In other words, the first intermediate coupling part 32 is formed between the first one side coupling part 33 and the first other side coupling part 34. When seen from the vertical direction 91, the first intermediate coupling part 32 is positioned on a straight line connecting the first one side coupling part 33 and the first other side coupling part 34.

Note that, the positions of each of the first intermediate coupling part 32, the first one side coupling part 33, and the first other side coupling part 34 are not limited to the positions mentioned above. For example, the first intermediate coupling part 32 may not be necessarily positioned right in the middle of the first one side coupling part 33 and the first other side coupling part 34, and may be positioned close to the first one side coupling part 33. In other words, the distance between the first intermediate coupling part 32 and the first one side coupling part 33 may be longer than, or may be shorter than, the distance between the first intermediate coupling part 32 and the first other side coupling part 34. Moreover, for example, the first one side coupling part 33 and the first other side coupling part 34 may be formed at positions other than at the end parts of the first rigid member 31 in the longitudinal direction. Moreover, for example, the first one side coupling part 33 may be formed between the first intermediate coupling part 32 and the first other side coupling part 34.

Each of the first intermediate coupling part 32, the first one side coupling part 33, and the first other side coupling part 34 may have mutually different positions when seen from the vertical direction 91. In other words, the first intermediate coupling part 32 may not necessarily be positioned on a straight line connecting the first one side coupling part 33 and the first other side coupling part 34. In the example mentioned above, the positions of each of the first intermediate coupling part 32, the first one side coupling part 33, and the first other side coupling part 34 are exemplified in the case where the first rigid member 31 has a rod shape. An example of the positions of each of the first intermediate coupling part 32, the first one side coupling part 33, and the first other side coupling part 34 in the case where the first rigid member 31 has a shape other than a rod shape will be described in an embodiment, which will be mentioned later.

The first intermediate coupling part 32, the first one side coupling part 33, and the first other side coupling part 34 have a columnar shape in which bottom surfaces 32a, 33a, and 34a face upward, bottom surfaces 32b, 33b, and 34b face downward, and side surfaces 32c, 33c, and 34c face a horizontal direction 92 orthogonal to the vertical direction 91. The bottom surfaces 32a, 33a, and 34a, and the bottom surfaces 32b, 33b, and 34b, are examples of pairs of first surfaces. The side surfaces 32c, 33c, and 34c are examples of a second surface. The horizontal direction 92 is an example of an intersecting direction. Note that, the first intermediate coupling part 32, the first one side coupling part 33, and the first other side coupling part 34 are not limited to a columnar shape, and may have a square columnar shape, or may have a spherical shape, for example. Note that, in the case where the first intermediate coupling part 32, the first one side coupling part 33, and the first other side coupling part 34 have a spherical shape, for example, the portions having a component in the vertical direction 91 of the surface of the sphere correspond to a pair of first surfaces, and the portions other than these correspond to a second surface.

Each of the first intermediate coupling part 32, the first one side coupling part 33, and the first other side coupling part 34 includes a convex part 410A protruding upward on the columnar bottom surfaces 32a, 33a, and 34a, and includes a concave part 410B recessed upward on the columnar bottom surfaces 32b, 33b, and 34b. The convex part 410A is capable of being inserted into the concave part 410B along the vertical direction 91. The convex part 410A is an example of a first convex part. The concave part 410B is an example of a first concave part.

Each of the convex parts 410A included in the coupling structure 20A is capable of being inserted into the concave part 410B included in another coupling structure. The convex part 410A included in another coupling structure is capable of being inserted into each of the concave parts 410B included in the coupling structure 20A. In this way, the coupling structure 20A is capable of rotatably coupling with another coupling structure.

Note that, each of the first intermediate coupling part 32, the first one side coupling part 33, and the first other side coupling part 34 may include at least one of the convex part 410A and the concave part 410B. For example, the first one side coupling part 33, contrary to that described, may include the concave part 410B recessed downward on a columnar upper surface (bottom surfaces 32a, 33a, and 34a), or may include a convex part 410A protruding downward on a columnar lower surface (bottom surfaces 32b, 33b, and 34b). Moreover, for example, the first one side coupling part 33 may include the convex part 410A or the concave part 410B on a columnar upper surface, while on the other hand, may not include either of the convex part 410A and the concave part 410B on a columnar lower surface. Moreover, for example, the first one side coupling part 33 may include the convex part 410A on both a columnar upper surface and lower surface, and may not include the concave part 410B on both a columnar upper surface and lower surface. This is the same for the first intermediate coupling part 32 and the first other side coupling part 34.

The convex part 410A includes a pair of plate parts 410Aa and 410Ab. Each of the plate parts 410Aa and 410Ab protrudes upward, and opposite each other in the horizontal direction 92. A distal end part of each of the pair of plate parts 410Aa and 410Ab is thicker than a proximal end part of each of the pair of plate parts 410Aa and 410Ab. In this way, a diameter R1 of the convex part 410A at the distal end part becomes larger than a diameter R2 of the convex part 410A at the proximal end part. Moreover, the diameter R1 of the convex part 410A at the distal end part becomes larger than an inner diameter R3 of the concave part 410B. Note that, the diameter R2 of the convex part 410A at the proximal end part is the same or approximately the same as the diameter R1 of the convex part 410A at the distal end part.

By having the convex part 410A configured such as described above, a state can be maintained where the convex part 410A is inserted into the concave part 410B. In detail, since the diameter R1 of the convex part 410A at the distal end part is larger than the inner diameter R3 of the concave part 410B, at the time when the convex part 410A is inserted into the concave part 410B, the pair of plate parts 410Aa and 410Ab are bent in the horizontal direction 92 so as to be close to each other. In this way, the elasticity of the pair of plate parts 410Aa and 410Ab acts on the concave part 410B. As a result of this, a state is maintained where the convex part 410A is inserted into the concave part 410B. In the case where the convex part 410A penetrates through the concave part 410B, while the pair of plate parts 410Aa and 410Ab return to the state prior to bending, it is necessary for the convex part 410A to be pulled out from the concave part 410B, by resisting the elasticity of the pair of plate parts 410Aa and 410Ab. Accordingly, a state is maintained where the convex part 410A penetrates through the concave part 410B.

As shown in FIG. 36 and FIG. 37, the first joint member 35 is supported, by the first one side coupling part 33, above the first one side coupling part 33. The second joint member 36 is supported, by the first other side coupling part 34, above the first other side coupling part 34. In other words, the first joint member 35 and the second joint member 36 are positioned on the second rigid member 71 side in the vertical direction 91 with respect to the first rigid member 31. The first one side coupling part 33 and the first other side coupling part 34 are examples of support coupling parts.

In the seventh embodiment, the first joint member 35 and the second joint member 36 have the same configuration. Accordingly, in the following description, while the configuration of the first joint member 35 will be described, a description of the configuration of the second joint member 36 will be, in principle, omitted, and described as necessary. Note that, the first joint member 35 and the second joint member 36 may have different configurations, with the condition of including a convex part 420A and a concave part 420B, which will be mentioned later.

The first joint member 35 has a roughly columnar shape, which has a pair of bottom surfaces facing the horizontal direction 92, and a side surface connecting the pair of bottom surfaces. Note that, the first joint member 35 is not limited to a columnar shape, and may have a square columnar shape, for example.

The first joint member 35 includes the convex part 420A protruding sideways (the horizontal direction 92) on one of the pair of bottom surfaces, and includes the concave part 420B recessed sideways on the other of the pair of bottom surfaces. The convex part 420A is capable of being inserted into the concave part 420B along the horizontal direction 92. The convex part 420A is an example of a second convex part. The concave part 420B is an example of a second concave part. Note that, the convex part 420A and the concave part 420B may not necessarily be formed along the horizontal direction 92 (a direction orthogonal to the vertical direction 91), and may be formed along a direction that intersects the vertical direction 91. In other words, the convex part 420A may protrude diagonally upward or diagonally downward with respect to the horizontal direction 92. Moreover, the concave part 420B may be a part into which the convex part 420A is inserted, along a diagonally upward or diagonally downward direction with respect to the horizontal direction 92. In this case, the protrusion direction of the convex part 420A and the insertion direction of the convex part 420A to the concave part 420B correspond to intersecting directions.

In the seventh embodiment, the convex part 420A has the same configuration as the convex part 410A, and the concave part 420B has the same configuration as the concave part 410B. In other words, the convex part 420A is capable of being inserted into the concave part 410B, and the convex part 410A is capable of being inserted into the concave part 420B. Note that, the convex part 420A may have a configuration different to that of the convex part 410A, and the concave part 420B may have a configuration different to that of the concave part 410B.

The first joint member 35 includes a through hole 420C penetrating through in the vertical direction 91. As shown in FIG. 36, in the seventh embodiment, the through hole 420C is positioned between the convex part 420A and the concave part 420B when seen from the vertical direction 91.

The convex part 410A and the convex part 420A are capable of being inserted into the through hole 420C. As shown in FIG. 37, in the seventh embodiment, the convex part 410A of the first one side coupling part 33 is inserted into the through hole 420C of the first joint member 35. In this way, the first joint member 35 is rotatably supported, by the first one side coupling part 33, around a second axial line 90B. The second axial line 90B is an example of an axial line. Similarly, the convex part 410A of the first other side coupling part 34 is inserted into the through hole 420C of the second joint member 36. In this way, the second joint member 36 is rotatably supported, by the first other side coupling part 34, around a third axial line 90C. The third axial line 90C is an example of an axial line. The second axial line 90B and the third axial line 90C are parallel to the vertical direction 91. Note that, the configuration in which the first joint member 35 is rotatably supported by the first one side coupling part 33, and the configuration in which the second joint member 36 is rotatably supported by the first other side coupling part 34, are not limited to the configurations mentioned above, and various publicly known configurations are capable of being applied.

In the seventh embodiment, a peripheral part 35A of the through hole 420C of the first joint member 35 is configured to be thinner than the other portions of the first joint member 35. In other words, the peripheral part 35A is shorter than the other portions of the first joint member 35 in the vertical direction 91. Note that, a peripheral part 36A of the through hole 420C of the second joint member 36 is also configured to be thinner than the other portions of the second joint member 36, similar to the peripheral part 35A.

The convex part 410A of the first one side coupling part 33 is longer than the peripheral part 35A in the vertical direction 91. In this way, the convex part 410A of the first one side coupling part 33 protrudes upward more than the first joint member 35, by penetrating through the through hole 420C formed on the peripheral part 35A. The portion protruding upward more than the first joint member 35 in the convex part 410A of the first one side coupling part 33 is capable of being inserted to the concave part 410B and the concave part 420B of another coupling structure. Similarly, the convex part 410A of the first other side coupling part 34 protrudes upward more than the second joint member 36.

Each of the convex part 410A of the first one side coupling part 33 and the convex part 410A of the first other side coupling part 34 is longer than the convex part 410A of the first intermediate coupling part 32 in the vertical direction 91. In the seventh embodiment, the length in the vertical direction 91 of the portion protruding upward from the first joint member 35 and the second joint member 36, from among the convex part 410A of the first one side coupling part 33 and the convex part 410A of the first other side coupling part 34, is the same as the length in the vertical direction 91 of the convex part 410A of the first intermediate coupling part 32.

As shown in FIG. 36 and FIG. 37, the coupling structure 20A includes the second rigid member 71, a second intermediate coupling part 72, a second one side coupling part 73, and a second other side coupling part 74. The second intermediate coupling part 72, the second one side coupling part 73, and the second other side coupling part 74 are examples of horizontal coupling parts. The second intermediate coupling part 72 is an example of an intermediate coupling part. The second one side coupling part 73 is an example of a one side coupling part. The second other side coupling part 74 is an example of an other side coupling part.

In the seventh embodiment, the second rigid member 71 has a shape the same as the first rigid member 31, and has a rod shape with a circular shaped cross section. Moreover, the second rigid member 71 has a groove with the same configuration as the groove 31A. However, similar to the first rigid member 31, the shape of the second rigid member 71 is not limited to a rod shape with a circular shaped cross section. Moreover, the second rigid member 71 may have a shape different to that of the first rigid member 31.

The positions of the second intermediate coupling part 72, the second one side coupling part 73, and the second other side coupling part 74 in the second rigid member 71 are the same as the positions of the first intermediate coupling part 32, the first one side coupling part 33, and the first other side coupling part 34 in the first rigid member 31.

In other words, the second intermediate coupling part 72 is formed on a center part of the second rigid member 71 in the longitudinal direction. The second one side coupling part 73 is formed on one end part of the second rigid member 71 in the longitudinal direction. The second other side coupling part 74 is formed on the other end part of the second rigid member 71 in the longitudinal direction. In other words, the second intermediate coupling part 72 is formed between the second one side coupling part 73 and the second other side coupling part 74.

Note that, similar to the first intermediate coupling part 32, the first one side coupling part 33, and the first other side coupling part 34, the positions of each of the second intermediate coupling part 72, the second one side coupling part 73, and the second other side coupling part 74 are not limited to the positions mentioned above. Each of the second intermediate coupling part 72, the second one side coupling part 73, and the second other side coupling part 74 may have mutually different positions when seen from the vertical direction 91.

While the second intermediate coupling part 72, the second one side coupling part 73, and the second other side coupling part 74 have a columnar shape in which the bottom surfaces face the vertical direction 91 and the side surface faces the horizontal direction 92, similar to the first intermediate coupling part 32, the first one side coupling part 33, and the first other side coupling part 34, they are not limited to a columnar shape.

Each of the second intermediate coupling part 72, the second one side coupling part 73, and the second other side coupling part 74 includes a through hole 430 penetrating through the column in the vertical direction 91. The through hole 430 is opened on a columnar upper surface (one of the columnar bottom surfaces) and a columnar lower surface (the other of the columnar bottom surfaces). The convex parts 410A and 420A are capable of being inserted into the opening of the through hole 430 formed on the columnar upper surface along the vertical direction 91 from above, and are capable of being inserted into the opening of the through hole 430 formed on the columnar lower surface along the vertical direction 91 from below. The through hole 430 is an example of a first concave part. In other words, in the seventh embodiment, each of the second intermediate coupling part 72, the second one side coupling part 73, and the second other side coupling part 74 includes a first concave part on both the columnar upper surface and lower surface.

In the seventh embodiment, the inner diameter of the through hole 430 is the same or appropriately the same as the inner diameter R3 of the concave part 410B. Accordingly, each of the convex parts 410A and 420A included in the coupling structure 20A is capable of being inserted into the through hole 430 included in another coupling structure. In this way, the coupling structure 20A is capable of being rotatably coupled with another coupling structure.

Note that, each of the second intermediate coupling part 72, the second one side coupling part 73, and the second other side coupling part 74 may include at least one of a first convex part and a first concave part, similar to the first intermediate coupling part 32, the first one side coupling part 33, and the first other side coupling part 34. For example, the second one side coupling part 73, instead of the through hole 430, may include the concave part 410B recessed upward on the columnar lower surface, and may include the convex part 410A protruding upward on the columnar upper surface. This is the same for the second intermediate coupling part 72 and the second other side coupling part 74.

As shown in FIG. 37, the convex part 410A protruding from the columnar upper surface of the first intermediate coupling part 32 is inserted into the opening of the through hole 430 in the columnar lower surface of the second intermediate coupling part 72. In this way, the first intermediate coupling part 32 and the second intermediate coupling part 72 are rotatably coupled to each other around the first axial line 90A. In other words, as mentioned above, the first rigid member 31 and the second rigid member 71 are rotatably coupled to each other around the first axial line 90A.

The second intermediate coupling part 72 includes the opening of the through hole 430 on the columnar upper surface. In other words, the second intermediate coupling part 72 includes the first concave part on an opposite side to the first intermediate coupling part 32 in the vertical direction 91. On the other hand, the first intermediate coupling part 32 includes the concave part 410B on the columnar lower surface. In other words, the first intermediate coupling part 32 includes the first concave part on an opposite side to the second intermediate coupling part 72 in the vertical direction 91. Note that, the second intermediate coupling part 72 may include the first convex part (convex part 410A) on an opposite side to the first intermediate coupling part 32 in the vertical direction 91, and the first intermediate coupling part 32 may include the first convex part (convex part 410A) on an opposite side to the second intermediate coupling part 72 in the vertical direction 91.

Figure 38:
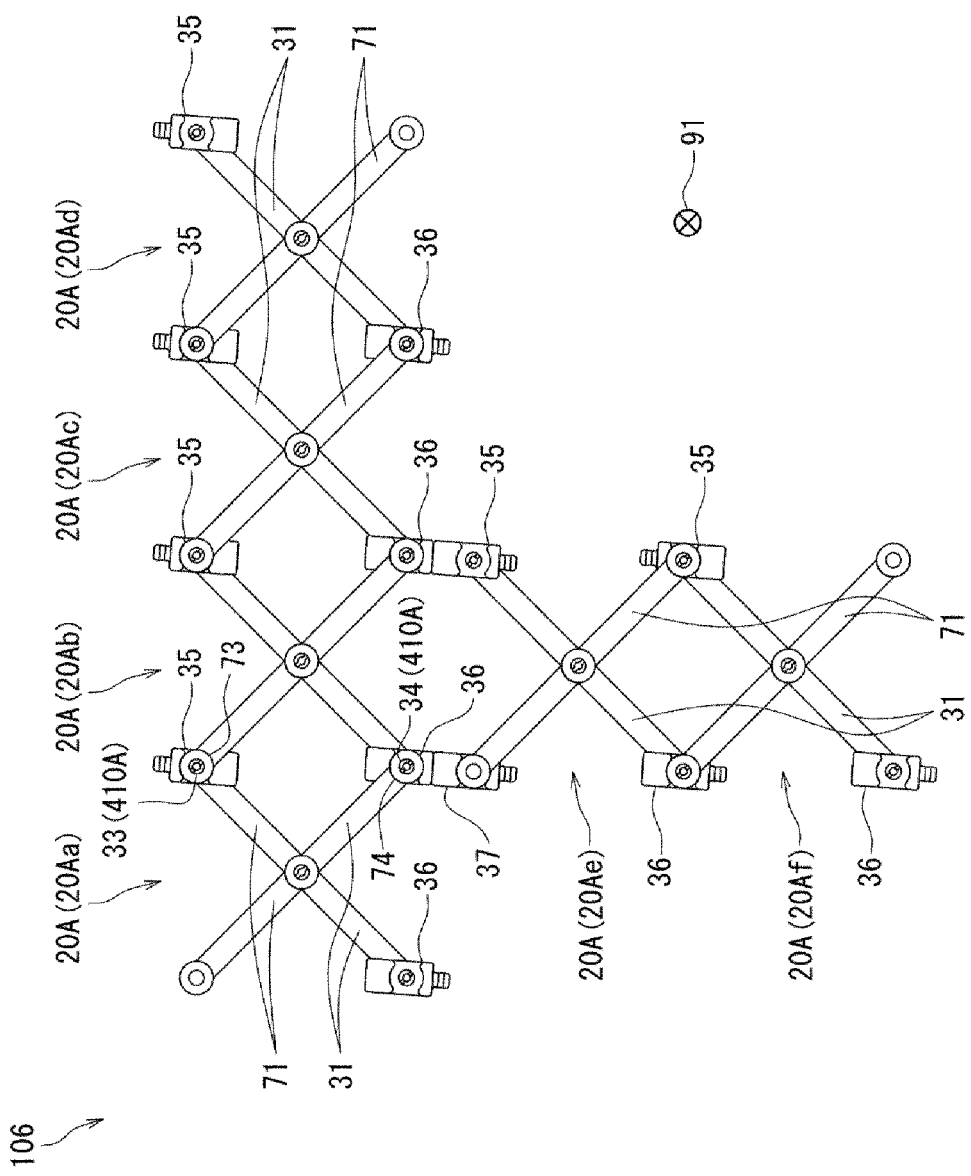
FIG. 38 is a planar view of a multiple junction point extendable structure relating to a seventh embodiment of the present invention.
Figure 39:
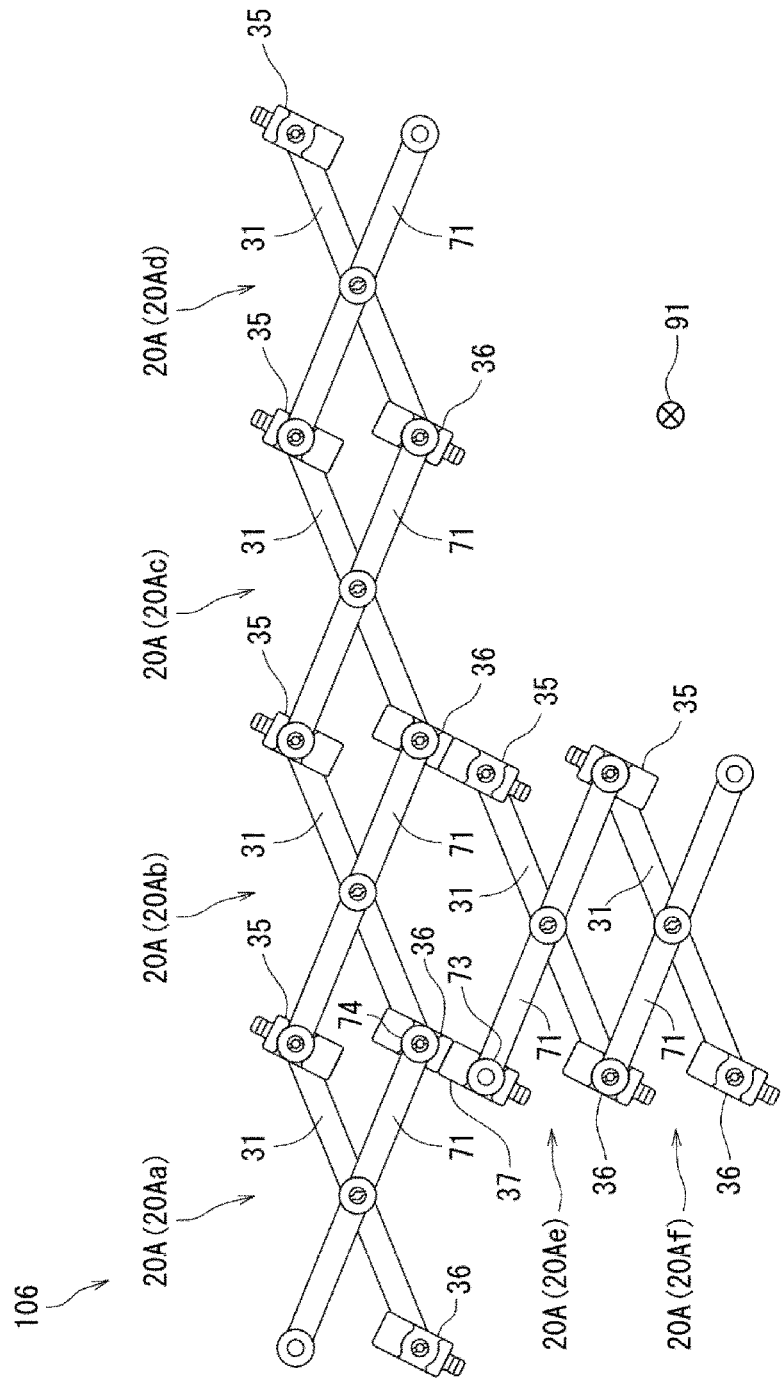
FIG. 39 is a planar view of a multiple junction point extendable structure relating to a seventh embodiment of the present invention.

Multiple junction point extendable structures of various shapes can be constructed, by coupling a plurality of the coupling structures 20A. FIG. 38 and FIG. 39 are planar views of a multiple junction point extendable structure that includes a coupling structure relating to the seventh embodiment of the present invention.

The multiple junction point extendable structure 106 shown in FIG. 38 and FIG. 39 includes six of the coupling structures 20A (coupling structures 20Aa to 20Af).

Each of the four coupling structures 20Aa to 20Ad and two coupling structures 20Ae and 20Af is coupled linearly.

Hereinafter, the coupling of the plurality of coupling structures 20A will be described in detail.

The convex part 410A of the first one side coupling part 33 of the first rigid member 31 of the coupling structure 20Aa is inserted into the through hole 430 of the second one side coupling part 73 of the second rigid member 71 of the coupling structure 20Ab. Moreover, the convex part 410A of the first other side coupling part 34 of the first rigid member 31 of the coupling structure 20Ab is inserted into the through hole 430 of the second other side coupling part 74 of the second rigid member 71 of the coupling structure 20Aa. In this way, the coupling structures 20Aa and 20Ab are coupled to each other.

At this time, the first joint member 35 of the coupling structure 20Aa is sandwiched between the first one side coupling part 33 of the first rigid member 31 of the coupling structure 20Aa and the second one side coupling part 73 of the second rigid member 71 of the coupling structure 20Ab. Moreover, the second joint member 36 of the coupling structure 20Ab is sandwiched between the first other side coupling part 34 of the first rigid member 31 of the coupling structure 20Ab and the second other side coupling part 74 of the second rigid member 71 of the coupling structure 20Aa.

This is the same for the coupling of the coupling structures 20Ab and 20Ac, the coupling of the coupling structures 20Ab and 20Ac, and the coupling of the coupling structures 20Ae and 20Af.

The coupling structure 20Ae is coupled to the coupling structures 20Ab and 20Ac, such as described below.

The convex part 420A of the second joint member 36 of the first rigid member 31 of the coupling structure 20Ac is inserted into the concave part 420B of the first joint member 35 of the first rigid member 31 of the coupling structure 20Ae. In this way, the coupling structures 20Ae and 20Ac are coupled to each other.

The coupling structure 20Ae is coupled to the coupling structure 20Ab via a joint member 37. The joint member 37 has the same configuration as the first joint member 35 and the second joint member 36. The joint member 37 is rotatably supported, by the second one side coupling part 73 of the second rigid member 71 of the coupling structure 20Ae, around an axial line parallel to the first axial line 90A. Note that, various publicly known means are capable of being adopted as this support means. The convex part 420A of the second joint member 36 of the first rigid member 31 of the coupling structure 20Ab is inserted into the concave part 420B of the joint member 37. In this way, the coupling structures 20Ae and 20Ab are coupled to each other via the joint member 37.

The multiple junction point extendable structure 106, in which six of the coupling structures 20Aa to 20Af are coupled, such as described above, performs an extension and contraction action such as described below, for example. In the state shown in FIG. 38, when the coupling structures 20Aa to 20Ad extend, the coupling structures 20Ae and 20Af contract in conjunction with this (refer to FIG. 39). On the other hand, in the state shown in FIG. 39, when the coupling structures 20Aa to 20Ad contract, the coupling structures 20Ae and 20Af extend in conjunction with this (refer to FIG. 38). Similarly, the coupling structures 20Aa to 20Ad extend and contract, in conjunction with an extension and contraction action of the coupling structures 20Ae and 20Af.

Note that, the multiple junction point extendable structure 106 shown in FIG. 38 has a shape different to that of the multiple junction point extendable structure 106 shown in FIG. 39. In other words, the multiple junction point extendable structure 106 is not only configured to extend and contract, but is also configured for shape variation.

In the multiple junction point extendable structure 106 shown in FIG. 38 and FIG. 39, the coupling structure 20Ae is coupled to each of the two coupling structures 20A at one location. Specifically, the first rigid member 31 of the coupling structure 20Ae is coupled to the coupling structure 20Ac, and the second rigid member 71 of the coupling structure 20Ae is coupled to the coupling structure 20Ab. However, the coupling state of the four coupling structures 20Aa to 20Ad of the coupling structure 20Ae is not limited to this.

For example, the coupling structure 20Ae may be coupled at two locations to one coupling structure 20A. Specifically, the first rigid member 31 of the coupling structure 20Ae may be coupled to the first rigid member 31 of the coupling structure 20Aa, and the second rigid member 71 of the coupling structure 20Ae may be coupled to the second rigid member 71 of the coupling structure 20Aa. Moreover, on the other hand, the first rigid member 31 of the coupling structure 20Ae may be coupled to the second rigid member 71 of the coupling structure 20Aa, and the second rigid member 71 of the coupling structure 20Ae may be coupled to the first rigid member 31 of the coupling structure 20Aa. This is the same in the other embodiments.

Note that, it is possible for the first rigid member 31 of the coupling structure 20Ae to be coupled to the first one side coupling part 33 of the first rigid member 31 of the coupling structure 20Aa, and for the second rigid member 71 of the coupling structure 20Ae to be coupled to the first other side coupling part 34 of the first rigid member 31 of the coupling structure 20Aa. However, in this case, the coupling structures 20Ae and 20Af do not extend and contract.

In all of the embodiments, the multiple junction point extendable structure may be constituted by only coupling structures, or may be constituted by coupling structures and a member other than a coupling structure. In other words, the multiple junction point extendable structure may include coupling structures. The multiple junction point extendable structure 106 in the seventh embodiment is constituted by the coupling structure 20A and the joint member 37 (a member other than a coupling structure 20A). Moreover, in the case where a panel is fitted into the groove 31A, the multiple junction point extendable structure is constituted by coupling structures and the panel (a member other than a coupling structure). Moreover, for example, the multiple junction point extendable structure may be constituted by the coupling structures 20A and a coupling structure of another embodiment. In this case, at least one of a plurality of coupling structures included in the multiple junction point extendable structure includes a joint member (at least one of the first joint member 35, the second joint member 36, and the joint member 37).

According to the seventh embodiment, the multiple junction point extendable structure 106, which has a function of at least one of extending and contracting and shape variation, can be assembled by coupling a plurality of the coupling structures 20A. For example, in the case where the first rigid member 31 and the second rigid member 71 are intersecting when seen from the vertical direction 91, the multiple junction point extendable structure 106 which is extendable and contractable can be assembled by coupling a plurality of the coupling structures 20A linearly. Moreover, for example, a shape-variable multiple junction point extendable structure, which performs a shape variation exceeding an easily anticipated range by coupling the plurality of coupling structures 20A in a frame shape or the like, can be assembled by a relative position with respect to the first one side coupling part 33, the first other side coupling part 34, and the second one side coupling part 73 of the coupling structure 20A, and the first intermediate coupling part 32 and the second intermediate coupling part 72 of the second other side coupling part 74.

According to the seventh embodiment, a plurality of the coupling structures 20A can be coupled to each other, by simply inserting the convex parts 410A and 420A into the concave parts 410B and 420B and the through hole 430. In this way, since the coupling of the plurality of coupling structures 20A is performed by a simple means such as the insertion of a convex part, assembly of the multiple junction point extendable structure 106 formed with a plurality of the coupling structures 20A can be easily performed, without using a tool such as a screwdriver.

According to the seventh embodiment, the coupling structure 20A can be coupled to a different coupling structure 20A, via the first joint member 35 and the second joint member 36. In this way, the member formed from a plurality of the coupling structures 20A can be widened on a virtual surface that intersects the vertical direction 91.

According to the seventh embodiment, since the first joint member 35 and the second joint member 36 are rotatable, one of the two coupling structures 20A coupled via the first joint member 35 and the second joint member 36 can be rotated with respect to the other. In this way, complex actions can be performed by the multiple junction point extendable structure 106 formed with a plurality of the coupling structures 20A.

According to the seventh embodiment, since the first intermediate coupling part 32 and the second intermediate coupling part 72 include either the convex part 410A and the concave part 410B or the through hole 430, each of the first intermediate coupling part 32 and the second intermediate coupling part 72 can be rotatably coupled to the first one side coupling part 33, the first other side coupling part 34, the second one side coupling part 73, and the second other side coupling part 74.

Eighth Embodiment

Figure 40:
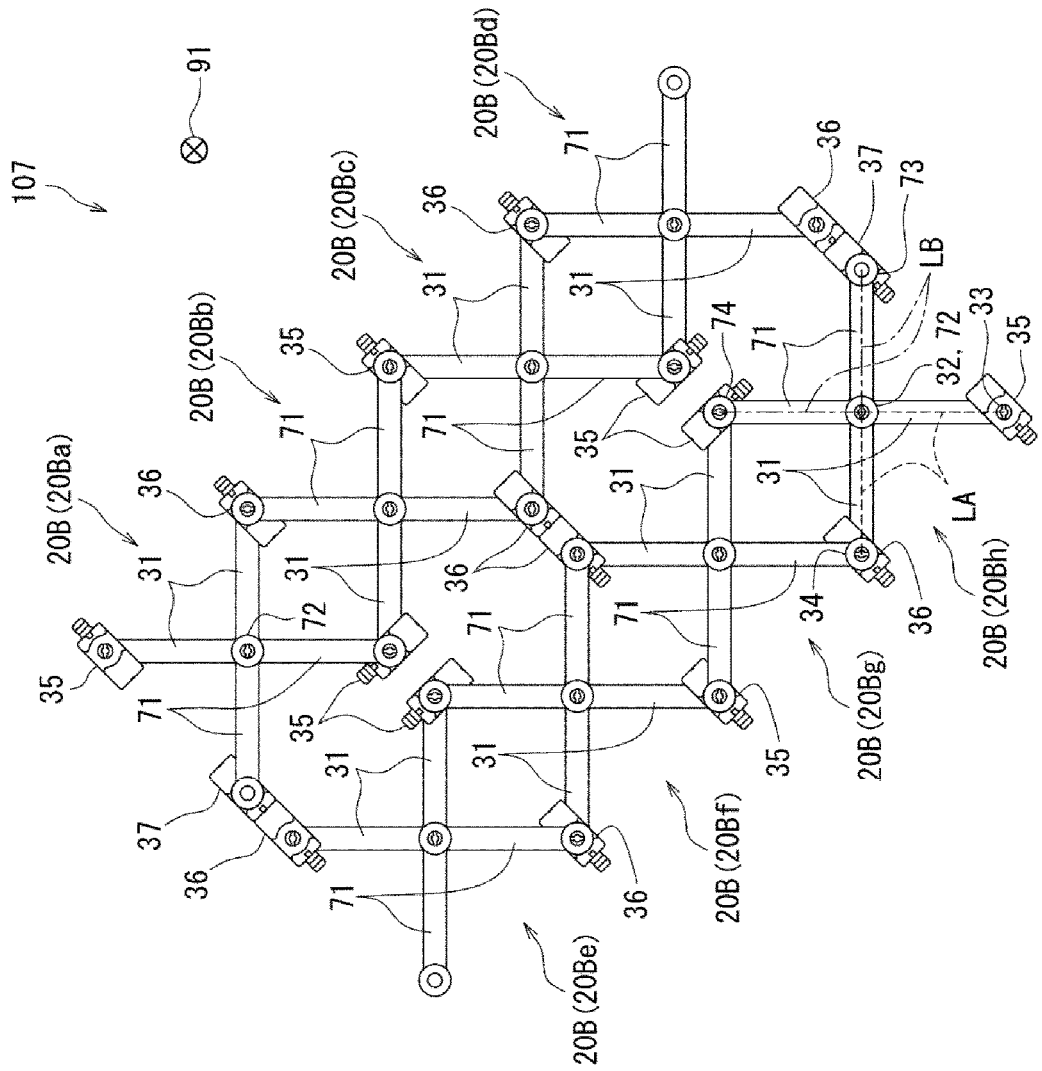
FIG. 40 is a planar view of a multiple junction point extendable structure relating to an eighth embodiment of the present invention.
Figure 41:
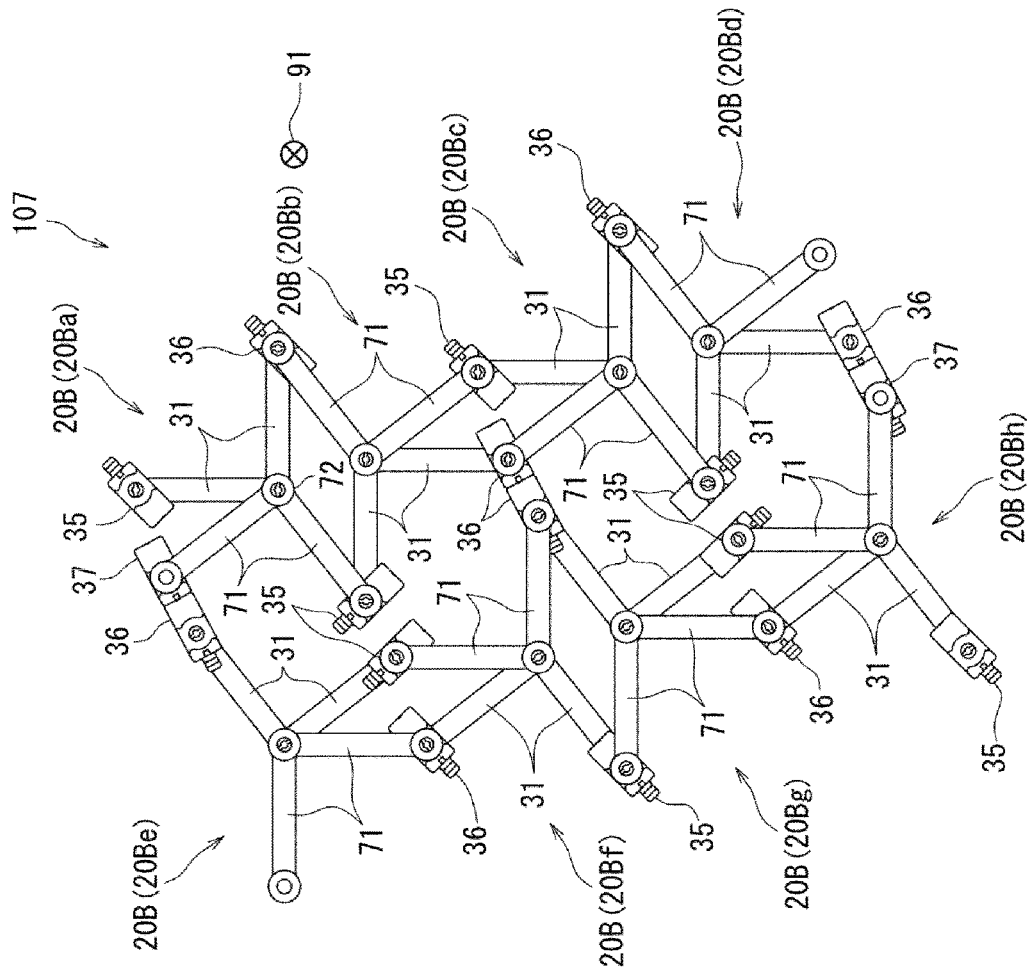
FIG. 41 is a planar view of a multiple junction point extendable structure relating to an eighth embodiment of the present invention.

FIG. 40 and FIG. 41 are planar views of a multiple junction point extendable structure that includes a coupling structure relating to an eighth embodiment of the present invention.

A multiple junction point extendable structure 107 relating to the Eight Embodiment is different to the multiple junction point extendable structure 106 relating to the seventh embodiment in that it includes a coupling structure 20B. The coupling structure 20B is different to the coupling structure 20A included in the multiple junction point extendable structure 106 relating to the seventh embodiment in that the first intermediate coupling part 32 is not positioned on a straight line connecting the first one side coupling part 33 and the first other side coupling part 34, when seen from the vertical direction 91. Hereinafter, the differences with the seventh embodiment will be described. Since the common points with the seventh embodiment have the same reference numerals attached, a description of these common points will be, in principle, omitted, and described as necessary.

The multiple junction point extendable structure 107 shown in FIG. 40 and FIG. 41 includes eight of the coupling structures 20B (coupling structures 20Ba to 20Bh). Each of the coupling structures 20Ba to 20Bh has the same configuration. Here, the configuration of the coupling structure 20Bh will be described, and a description of the configurations of the another coupling structures 20Ba to 20Bg will be, in principle, omitted, and described as necessary.

The first rigid member 31 and the second rigid member 71 of the coupling structure 20Bh are bent when seen from the vertical direction 91.

The first intermediate coupling part 32 is provided on a bent part of the first rigid member 31. The first one side coupling part 33 is provided on one end part of the first rigid member 31. The first other side coupling part 34 is provided on the other end part of the first rigid member 31. In this case, a first virtual line LA, from the first one side coupling part 33 to the first other side coupling part 34 via the first intermediate coupling part 32, has a V-shape when seen from the vertical direction 91.

The second intermediate coupling part 72 is provided on a bent part of the second rigid member 71. The second one side coupling part 73 is provided on one end part of the second rigid member 71. The second other side coupling part 74 is provided on the other end part of the second rigid member 71. In this way, a second virtual line LB, from the second one side coupling part 73 to the second other side coupling part 74 via the second intermediate coupling part 72, has a V-shape when seen from the vertical direction 91.

Moreover, the bent part of the first rigid member 31 and the bent part of the second rigid member 71 have the same position, when seen from the vertical direction 91. Accordingly, the first virtual line LA and the second virtual line LB do not intersect.

Note that, the shapes of the first rigid member 31 and the second rigid member 71 are arbitrary, on the condition that the first virtual line LA and the second virtual line LB satisfy the above mentioned conditions. In other words, it is not necessary for the first rigid member 31 and the second rigid member 71 to have a V-shape along the first virtual line LA and the second virtual line LB. For example, the first rigid member 31 may be a plate shaped member with a semicircular shape when seen from the vertical direction 91. In this case, the first one side coupling part 33, the first intermediate coupling part 32, and the first other side coupling part 34 are provided on the semicircular shaped surface of this plate shaped member. In this case, the virtual line LA, from the first one side coupling part 33 to the first other side coupling part 34 via the first intermediate coupling part 32, has a V-shape.

In the multiple junction point extendable structure 107 shown in FIG. 40 and FIG. 41, each of the four coupling structures 20Ba to 20Bd and the four coupling structures 20Be to 20Bh are coupled linearly, similar to the seventh embodiment.

Moreover, each of the coupling structures 20Ba and 20Be and the coupling structures 20Bd and 20Bh are coupled to each other via the joint member 37, similar to the seventh embodiment. Moreover, the coupling structures 20Bc and 20Bg are coupled to each other by coupling each of the second joint members 36 to each other. Note that, in the eighth embodiment, in each of the coupling structures 20Bb and 20Bf and the coupling structures 20Bd and 20Bh, while the first joint members 35 are facing each other, and are capable of being coupled to each other, they are not coupled to each other.

The multiple junction point extendable structure 107, in which eight of the coupling structures 20Ba to 20Bh are coupled, such as described above, operates such as described below, for example. From the state shown in FIG. 40, for example, when the second rigid member 71 of the coupling structure 20Ba is rotated clockwise in FIG. 40 around the second intermediate coupling part 72, it changes to the shape shown in FIG. 41. Since the shape after the change shown in FIG. 41, from the original shape of the multiple junction point extendable structure 107 shown in FIG. 40, exceeds an easily anticipated range, the visual interest of a person is significantly stimulated.

Note that, the lengths of the coupling structures 20Ba to 20Bd in the longitudinal direction shown in FIG. 40 are longer than the lengths of the coupling structures 20Ba to 20Bd in the longitudinal direction shown in FIG. 41. In other words, the multiple junction point extendable structure 107 is not only configured for shape variation, but is also configured to extend and contract.

By coupling a plurality of the coupling structures 20B such as in the eighth embodiment, the shape-variable multiple junction point extendable structure 107, which has a shape before and after an action that is different to the extent of being beyond anticipation, can be assembled.

Ninth Embodiment

Figure 42:
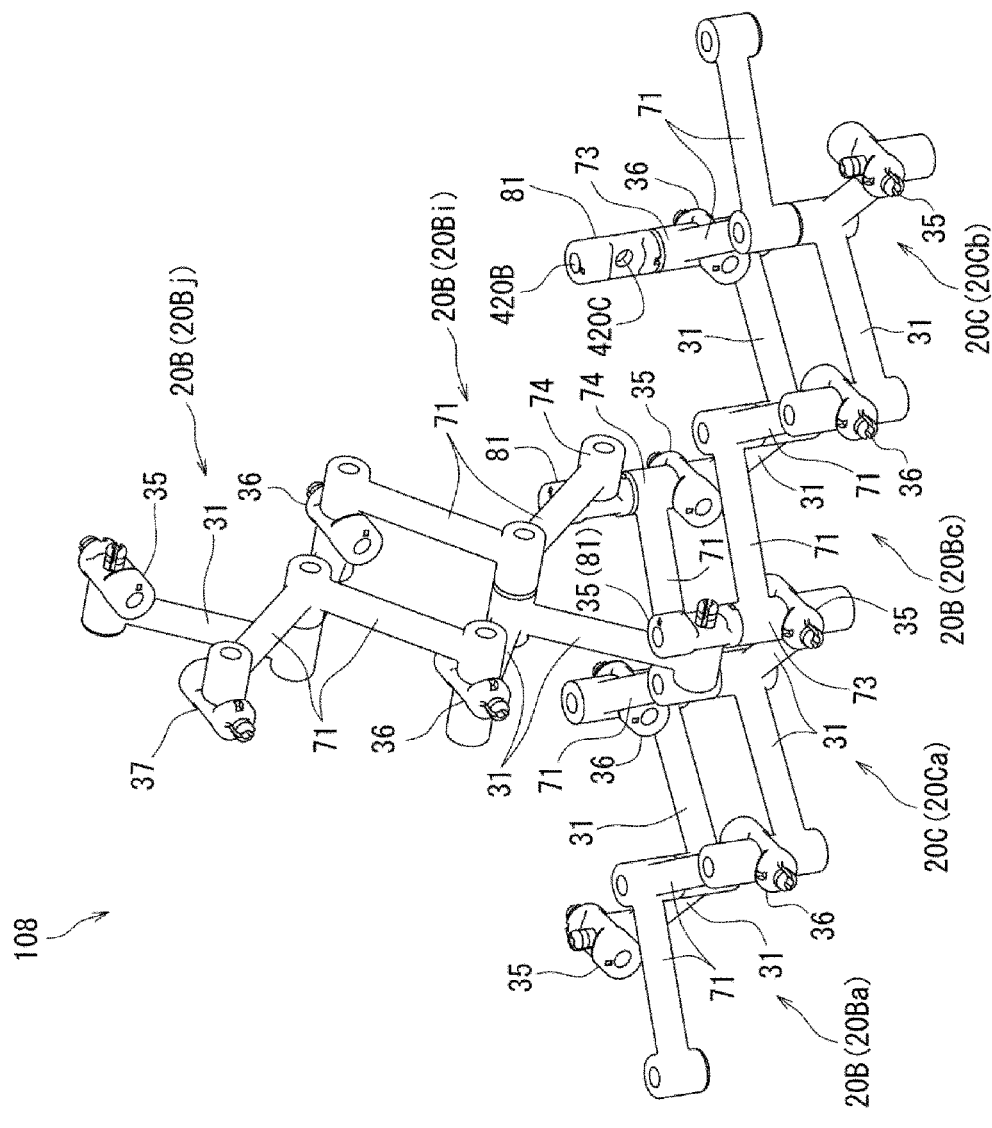
FIG. 42 is a perspective view of a multiple junction point extendable structure relating to a ninth embodiment of the present invention.

FIG. 42 is a perspective view of a multiple junction point extendable structure that includes a coupling structure relating to a ninth embodiment of the present invention.

A multiple junction point extendable structure 108 relating to the ninth embodiment is different to the multiple junction point extendable structure 107 relating to the eighth embodiment in that it includes a coupling structure 20C. The coupling structure 20C relating to the ninth embodiment is different to the coupling structure 20B included in the multiple junction point extendable structure 107 relating to the eighth embodiment in that it additionally includes a vertical joint member 81. Hereinafter, the differences with the seventh embodiment will be described. Since the common points with the Eight Embodiment have the same reference numerals attached, a description of these common points will be, in principle, omitted, and described as necessary.

The multiple junction point extendable structure 108 shown in FIG. 42 includes four of the coupling structures 20B (coupling structures 20Ba, 20Bc, 20Bi, and 20Bj) and two of the coupling structures 20C (coupling structures 20Ca and 20Cb). The configurations of each of the four coupling structures 20B are the same as the eighth embodiment.

The coupling structures 20Ca and 20Cb are coupling structures in which the vertical joint member 81 is attached to the coupling structures 20B.

In the ninth embodiment, the vertical joint member 81 has the same shape as the first joint member 35, the second joint member 36, and the joint member 37. In other words, the vertical joint member 81 has a roughly columnar shape, and includes the convex part 420A, the concave part 420B, and the through hole 420C. However, this columnar shape has a bottom surface that faces the vertical direction 91 and a side surface that faces the horizontal direction 92. Accordingly, the convex part 420A protrudes in the vertical direction 91, and the concave part 420B is recessed in the vertical direction 91. Moreover, the through hole 420C is a hole along the horizontal direction 92. In the ninth embodiment, the through hole 420C is an example of an inserted part, and the horizontal direction 92 is an example of an intersecting direction. The convex parts 410A and 420A of another coupling structure can be inserted into the through hole 420C.

Note that, the vertical joint member 81 may have a shape different to that of the first joint member 35, the second joint member 36, and the joint member 37. For example, the vertical joint member 81 may include, instead of the through hole 420C, a convex part that protrudes in the horizontal direction 92, and is capable of being inserted into the concave parts 410B and 420B and the through hole 430 of another coupling structure, along the horizontal direction 92. In this case, this convex part is an example of an insertion part. Moreover, the through hole 420C and the convex x part may not necessarily be formed along the horizontal direction 92 (a direction orthogonal to the vertical direction 91), and may be formed along a direction that intersects the vertical direction 91. In other words, this convex part may protrude diagonally upward or diagonally downward with respect to the horizontal direction 92. Moreover, the through hole 420C may be a hole into which the convex part 410A and the convex part 420A are inserted, along a diagonally upward or diagonally downward direction with respect to the horizontal direction 92.

The vertical joint member 81 is rotatably supported, by at least one of the first one side coupling part 33, the first other side coupling part 34, the second one side coupling part 73, and the second other side coupling part 74, around an axial line parallel to the vertical direction 91, by inserting the convex part 420A of the vertical joint member 81 into the first concave part (concave part 410B, through hole 430), or by inserting the first convex part (convex part 410A) into the concave part 420B of the vertical joint member 81. In the ninth embodiment, the vertical joint member 81 of the coupling structure 20Ca is rotatably supported by the second other side coupling part 74 of the second rigid member 71 of the coupling structure 20Ca. The vertical joint member 81 of the coupling structure 20Cb is rotatably supported by the second one side coupling part 73 of the second rigid member 71 of the coupling structure 20Cb.

In the multiple junction point extendable structure 108 shown in FIG. 42, each of the four coupling structures 20Ba, 20Ca, 20Bc, and 20Cb and the two coupling structures 20Bi and 20Bj are coupled linearly, similar to the eighth embodiment.

Moreover, the coupling structure 20Bi is coupled to the coupling structures 20Ca and 20Bc, such as described below.

The convex part 420A of the first joint member 35 of the first rigid member 31 of the coupling structure 20Bi is inserted into the through hole 430 of the second one side coupling part 73 of the second rigid member 71 of the coupling structure 20Bc. In this way, the coupling structures 20Bi and 20Bc are coupled to each other. In this case, the first joint member 35 of the first rigid member 31 of the coupling structure 20Bi functions as the vertical joint member 81.

The second other side coupling part 74 of the second rigid member 71 of the coupling structure 20Bi is inserted into the through hole 420C of the vertical joint member 81. In this way, the coupling structures 20Bi and 20Ca are coupled to each other via the vertical joint member 81.

The multiple junction point extendable structure 108, in which four of the coupling structures 20B (coupling structures 20Ba, 20Bc, 20Bi, and 20Bj) and two of the coupling structures 20C (coupling structures 20Ca and 20Cb) are coupled, such as described above, extends and contracts along with performing shape variation exceeding an easily anticipated range, similar to the multiple junction point extendable structure 107 relating to the eighth embodiment. In addition, the multiple junction point extendable structure 108 performs shape variation in the vertical direction 91, in addition to the horizontal direction 92. In other words, the multiple junction point extendable structure 108 performs shape variation in a three-dimensional manner.

In the multiple junction point extendable structure 108 shown in FIG. 42, the coupling structure 20Bi is coupled at one location to each of the two coupling structures 20Ca and 20Bc. Specifically, the second other side coupling part 74 of the coupling structure 20Bi is coupled to the coupling structure 20Ca via the vertical joint member 81, and the first joint member 35 of the coupling structure 20Bi is coupled to the coupling structure 20Bc. However, the coupling state of the four coupling structures 20Ba, 20Ca, 20Bc, and 20Cb of the coupling structure 20Bi is not limited to this.

For example, the coupling structure 20Bi may be coupled at two locations to one of the coupling structure 20C, via the vertical joint member 81 (or the first joint member 35 or the second joint member 36 that functions as the vertical joint member 81). Specifically, the first rigid member 31 of the coupling structure 20Bi may be coupled to the first rigid member 31 of the coupling structure 20C, and the second rigid member 71 of the coupling structure 20Bi may be coupled to the second rigid member 71 of the coupling structure 20C. Moreover, on the other hand, the first rigid member 31 of the coupling structure 20Bi may be coupled to the second rigid member 71 of the coupling structure 20C, and the second rigid member 71 of the coupling structure 20Bi may be coupled to the first rigid member 31 of the coupling structure 20C. It is needless to say that the coupling structure 20Bi may be coupled at two locations to one of the coupling structures 20B. This is the same in the other embodiments.

Note that, it is possible for the first rigid member 31 of the coupling structure 20Bi to be coupled to the first one side coupling part 33 of the first rigid member 31 of the coupling structure 20Ca, and for the second rigid member 71 of the coupling structure 20Bi to be coupled to the first other side coupling part 34 of the first rigid member 31 of the coupling structure 20Ca. However, in this case, the coupling structures 20Bi and 20Bj do not extend and contract.

According to the ninth embodiment, by coupling a plurality of the coupling structures 20B and 20C via the vertical joint member 81, the multiple junction point extendable structure 108 can be configured in a three-dimensional manner.

Tenth Embodiment

Figure 43:
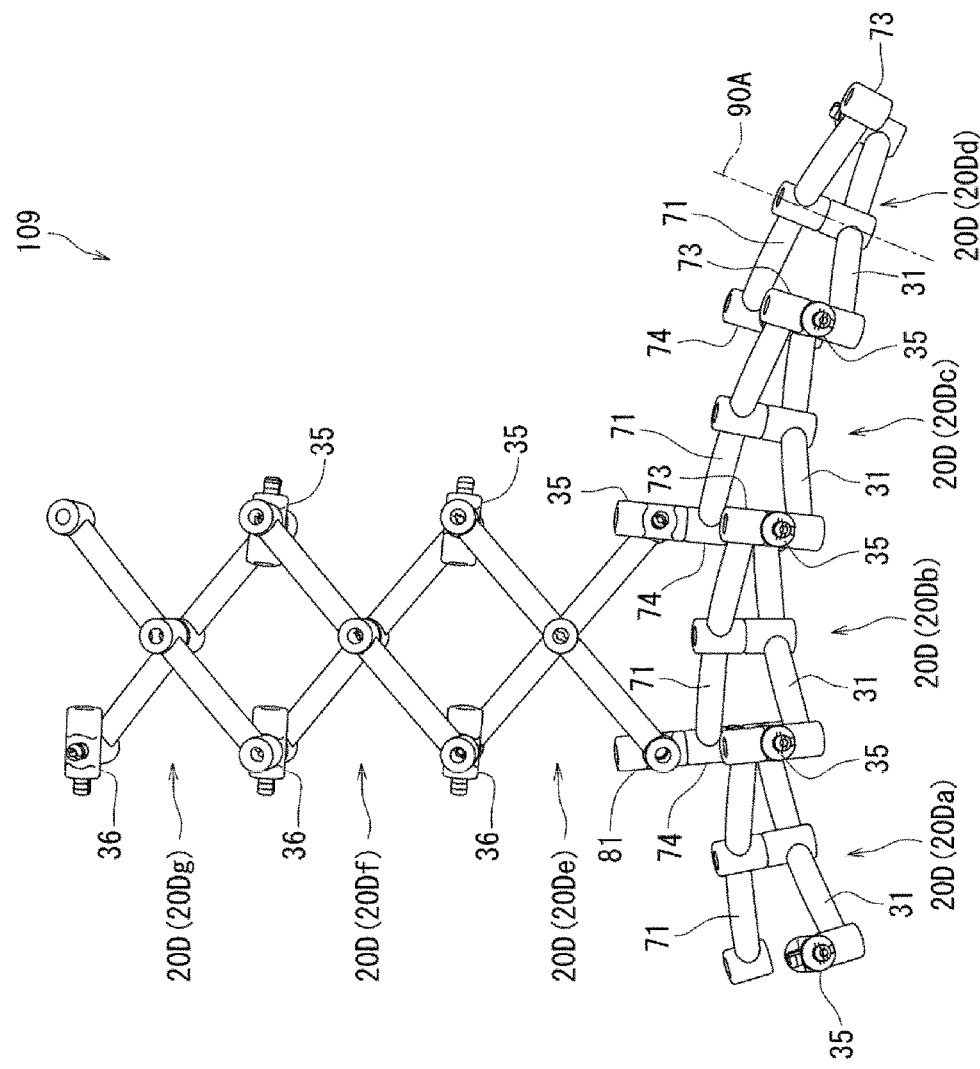
FIG. 43 is a perspective view of a multiple junction point extendable structure relating to a tenth embodiment of the present invention.

FIG. 43 is a perspective view of a multiple junction point extendable structure that includes a coupling structure relating to a tenth embodiment of the present invention.

A multiple junction point extendable structure 109 relating to the tenth embodiment is different to the multiple junction point extendable structure 106 relating to the seventh embodiment in that it includes a coupling structure 20D. The coupling structure 20D is different to the coupling structure 20A included in the multiple junction point extendable structure 106 relating to the seventh embodiment in that the first rigid member 31 and the second rigid member 71 are curved on a circular arc. Hereinafter, the differences with the seventh embodiment will be described. Since the common points with the seventh embodiment have the same reference numerals attached, a description of these common points will be, in principle, omitted, and described as necessary.

The multiple junction point extendable structure 109 shown in FIG. 43 includes seven of the coupling structures 20 (coupling structures 20Da to 20Dg), and a vertical joint member 81. Each of the coupling structures 20Da to 20Dg have the same configuration. Accordingly, here, the configuration of the coupling structure 20Dd will be described, and a description of the configurations of the another coupling structures 20Da to 20Dc, and 20De to 20Dg, will be, in principle, omitted, and described as necessary. Moreover, since the configuration of the vertical joint member 81 has been described in the ninth embodiment, a description of the configuration of the vertical joint member 81 will be omitted.

Each of the first rigid member 31 and the second rigid member 71 of the coupling structure 20Dd is curved in a circular arc shape. Here, the direction of the curve is not limited to the direction shown in FIG. 43. For example, while the first rigid member 31 and the second rigid member 71 of the coupling structure 20Dd shown in FIG. 43 are curved along a virtual surface orthogonal to a first axial line 90A, they may be curved along a virtual surface parallel to the first axial line 90A. Moreover, for example, in the coupling structure 20Dd shown in FIG. 43, while the direction of the curve of the circular arc of the first rigid member 31 is a direction the same as the direction of the curve of the circular arc of the second rigid member 71, they may be different directions.

Only one of the first rigid member 31 and the second rigid member 71 of the coupling structure 20Dd may be curved in an arc shape. The first rigid member 31 and the second rigid member 71 of the coupling structure 20Dd may be curved in a wave shape, for example, other than an arc shape.

In the multiple junction point extendable structure 109 shown in FIG. 43, each of the four coupling structures 20Da to 20Dd and the three coupling structures 20De to 20Bg are coupled linearly, similar to the seventh embodiment.

Moreover, the coupling structure 20Be is coupled to the coupling structures 20Bb and 20Bc, similar to the ninth embodiment. The coupling structure 20Be is coupled to the vertical joint member 81 included in the coupling structure 20Bb. Moreover, the first joint member 35 of the coupling structure 20Be is coupled to the coupling structure 20Bc.

The multiple junction point extendable structure 109, in which the seven coupling structures 20Da to 20Dg are coupled, such as described above, operates as follows, for example. In the state shown in FIG. 43, when the coupling structures 20Da to 20Dd contract, the coupling structures 20Be to 20Bg extend in conjunction with this. On the other hand, in the state shown in FIG. 43, when the coupling structures 20Da to 20Dd extend, the coupling structures 20De to 20Dg contract in conjunction with this. Similarly, the coupling structures 20Da to 20Dd extend and contract, in conjunction with an extension and contraction action of the coupling structures 20De to 20Dg.

According to the tenth embodiment, a circular shaped multiple junction point extendable structure can be assembled by coupling a plurality of the coupling structures 20D.

Eleventh Embodiment

Figure 44:
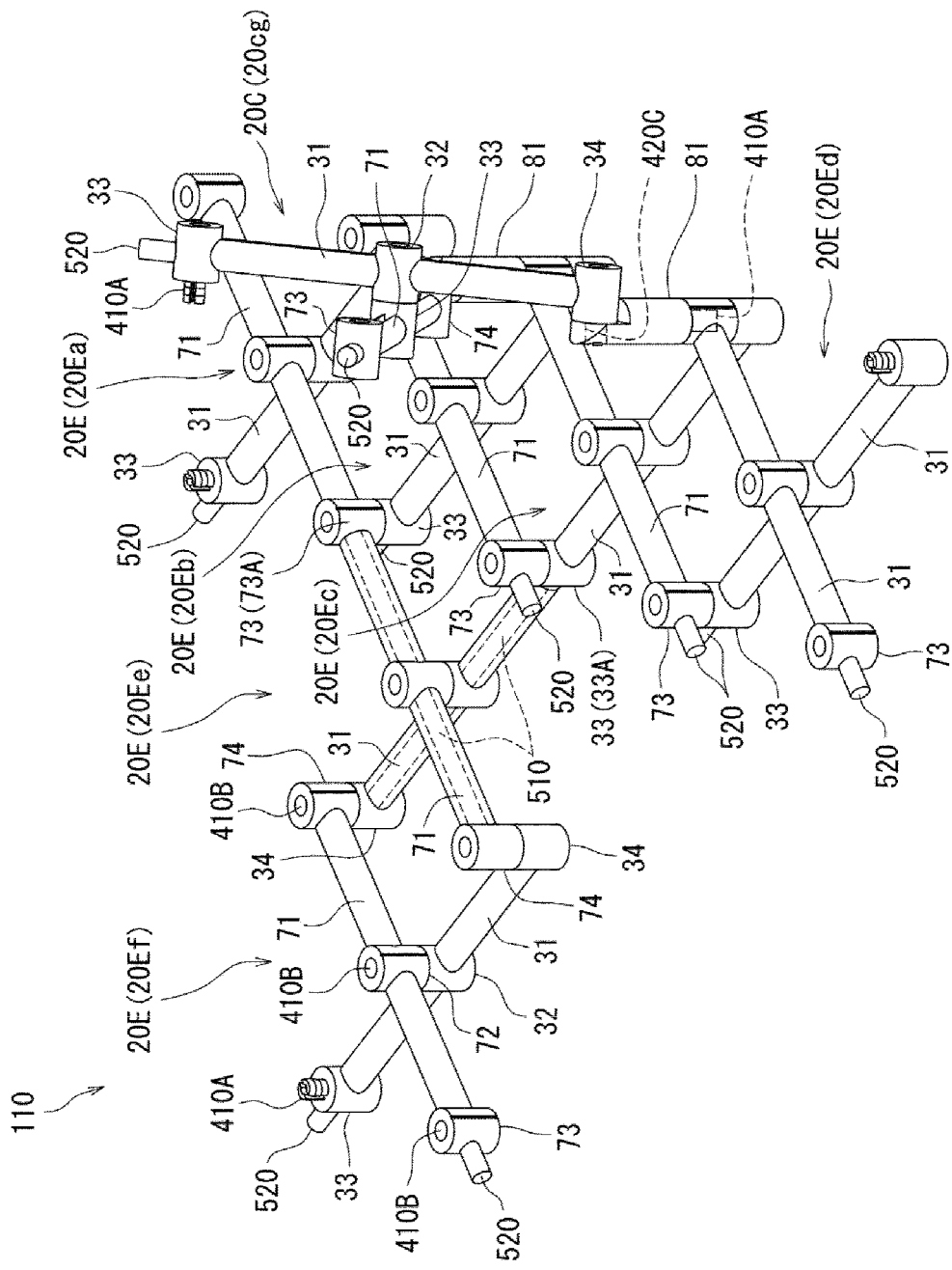
FIG. 44 is a perspective view of a multiple junction point extendable structure relating to an eleventh embodiment of the present invention.
Figure 45:
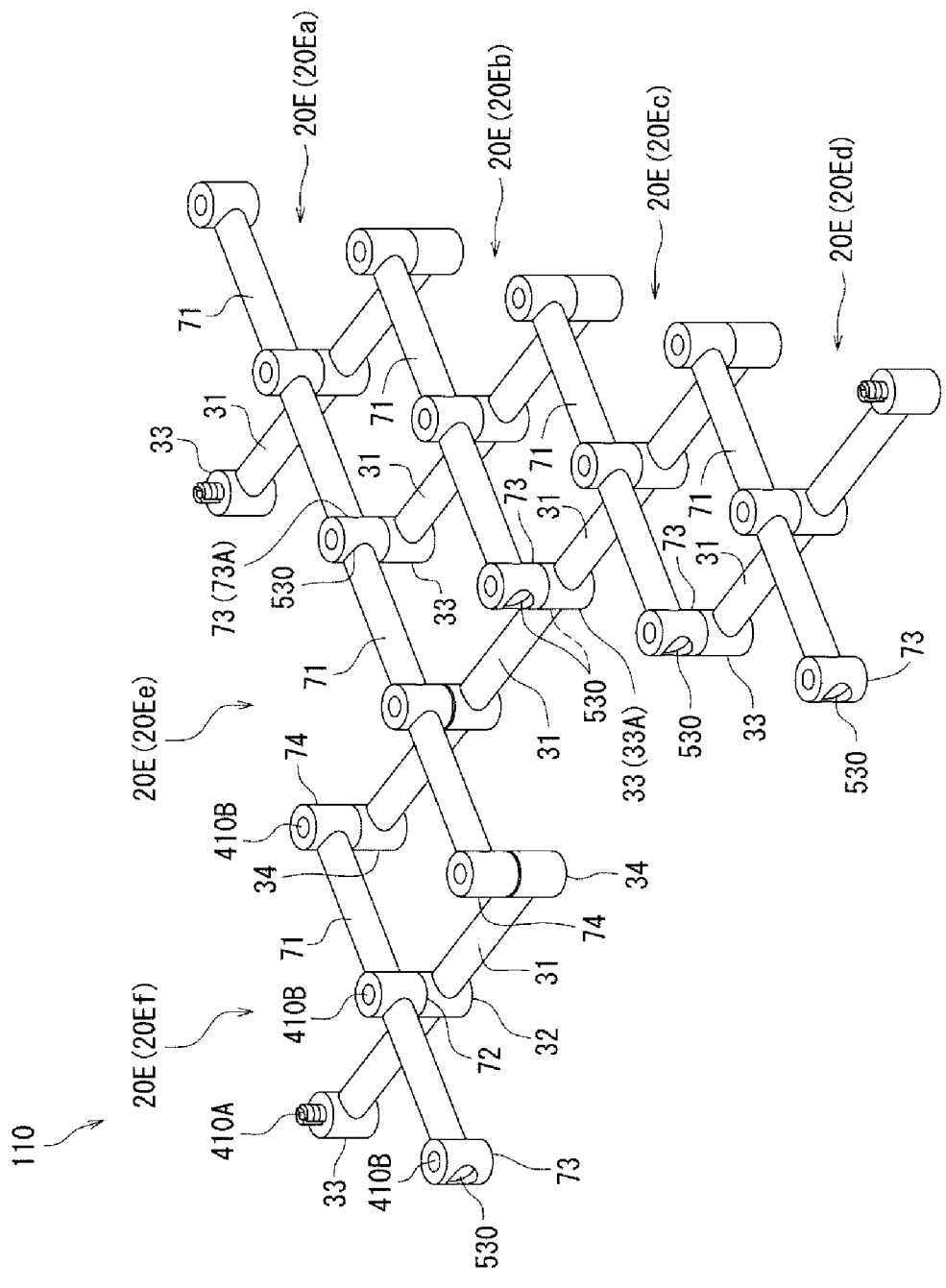
FIG. 45 is a perspective view of an example of a multiple junction point extendable structure relating to an eleventh embodiment of the present invention.

FIG. 44 and FIG. 45 are perspective views of a multiple junction point extendable structure relating to an eleventh embodiment of the present invention.

A multiple junction point extendable structure 110 relating to the eleventh embodiment is different to the multiple junction point extendable structure 106 relating to the seventh embodiment in that it includes a coupling structure 20E. The coupling structure 20E is different to the coupling structure 20A included in the multiple junction point extendable structure 106 relating to the seventh embodiment in that it does not include the first joint member 35 and the second joint member 36. Hereinafter, the differences with the seventh embodiment will be described. Since the common points with the seventh embodiment have the same reference numerals attached, a description of these common points will be, in principle, omitted, and described as necessary.

The multiple junction point extendable structure 110 shown in FIG. 44 includes seven of the coupling structures 20E (coupling structures 20Ea to 20Eg), and two of the vertical joint members 81. Each of the coupling structures 20Ea to 20Eg has the same configuration. Accordingly, here, the configuration of the coupling structure 20Ef will be described, and a description of the configurations of the another coupling structures 20Ea to 20Ee, and 20Eg, will be, in principle, omitted, and described as necessary. Moreover, since the configuration of the vertical joint member 81 has been described in the ninth embodiment, a description of the configuration of the vertical joint member 81 will be omitted.

The coupling structure 20Ef does not include the first joint member 35 and the second joint member 36. The coupling structure 20Ef includes a fitting part and a fitted part, such as described below.

The first rigid member 31 and the second rigid member 71 are hollow. In other words, the first rigid member 31 and the second rigid member 71 have a cylindrical shape. In other words, in FIG. 44, as shown by the dashed lines in the coupling structure 20Ee, the first rigid member 31 and the second rigid member 71 include a through hole 510. The through hole 510 is an example of a fitting part.

Each of the first one side coupling part 33 and the second one side coupling part 73 includes two projections 520. The two projections 520 are provided on columnar side surfaces of each of the first one side coupling part 33 and the second one side coupling part 73. The two projections 520 protrude in a horizontal direction 92. In the eleventh embodiment, the two projections 520 protrude in mutually opposite orientations. The projection 520 is an example of a fitted part. Note that, the number of projections 520 included in each of the first one side coupling part 33 and the second one side coupling part 73 is not limited to two.

Each of the two projections 520 is capable of being fitted with the through hole 510 along the horizontal direction 92. By fitting one of the two projections 520 with the through hole 510, the first one side coupling part 33 is attachable and detachable with respect to the first rigid member 31, and the second one side coupling part 73 is attachable and detachable with respect to the second rigid member 71. Note that, the first one side coupling part 33 is attachable and detachable with respect to the second rigid member 71, and the second one side coupling part 73 is attachable and detachable with respect to the first rigid member 31.

The other of the two projections 520 is capable of being fitted with the through hole 510 of another coupling structure. In this way, the coupling structure 20Ef is capable of being coupled with another coupling structure.

Note that, the direction in which the projection 520 and the through hole 510 are fitted is not limited to the horizontal direction 92 (a direction orthogonal to the vertical direction 91), and may be a direction that intersects the vertical direction 91. In other words, the projection 520 may protrude diagonally upward or diagonally downward with respect to the horizontal direction 92. Moreover, the through hole 510 may be a hole into which the projection 520 is inserted, along a diagonally upward or diagonally downward direction with respect to the horizontal direction 92.

In the multiple junction point extendable structure 110 shown in FIG. 44, each of the four coupling structures 20Ea to 20Ed and the two coupling structures 20Ee and 20Ef are coupled linearly, similar to the seventh embodiment. Moreover, the coupling structure 20Eg is coupled to the coupling structures 20Ec and 20Ed via the vertical joint member 81, similar to the ninth embodiment and the tenth embodiment.

The coupling structure 20Ee is coupled to the coupling structures 20Ea and 20Ec. In this case, the first one side coupling part 33 and the second one side coupling part 73 of the coupling structure 20Ee are detached from the first rigid member 31 and the second rigid member 71. The projection 520 of the first one side coupling part 33A of the coupling structure 20Ec is inserted into an end part of the first rigid member 31, from which the first one side coupling part 33 has been detached. In this way, the coupling structure 20Ee is coupled to the coupling structure 20Ec. Moreover, the projection 520 of the second one side coupling part 73A of the coupling structure 20Ea is inserted into an end part of the second rigid member 71, from which the second one side coupling part 73 has been detached. In this way, the coupling structure 20Ee is coupled to the coupling structure 20Ea.

Note that, in the configuration shown in FIG. 44, while the first one side coupling part 33 and the second one side coupling part 73 include the projection 520, the first other side coupling part 34 and the second other side coupling part 74 may include the projection 520. In other words, at least one of the first one side coupling part 33, the first other side coupling part 34, the second one side coupling part 73, and the second other side coupling part 74 may include the projection 520. Moreover, the through hole 510 is capable of being fitted with an arbitrary coupling part provided with the projection 520, from among the first one side coupling part 33, the first other side coupling part 34, the second one side coupling part 73, and the second other side coupling part 74. In other words, the through hole 510 is capable of being selectively fitted with the first one side coupling part 33, the first other side coupling part 34, the second one side coupling part 73, and the second other side coupling part 74.

Moreover, in the configuration shown in FIG. 44, while the through hole 510 corresponds to a fitting part, and the projection 520 corresponds to a fitted part, the fitting part and the fitted part may be configurations capable of being mutually fitted, and are not limited to the through hole 510 and the projection 520. For example, as shown in FIG. 45, each of the first one side coupling part 33 and the second one side coupling part 73 may include two concave parts 530, in which the first rigid member 31 and the second rigid member 71 are capable of being inserted, instead of the two projections 520. In this case, the concave part 530 corresponds to a fitting part. Moreover, the portions inserted into the concave parts 530 in the first rigid member 31 and the second rigid member 71, in other words, end parts of the first rigid member 31 and the second rigid member 71 in the longitudinal direction, correspond to fitting parts. Note that, in the case of the configuration shown in FIG. 45, the first rigid member 31 and the second rigid member 71 may not be hollow.

According to the eleventh embodiment, the multiple junction point extendable structure 110 having a function of at least one of extending and contracting and shape variation can be assembled by coupling a plurality of the coupling structures 20E. For example, in the case where the first rigid member 31 and the second rigid member 71 are intersecting when seen from the vertical direction 91, the multiple junction point extendable structure 110 which is extendable and contractable can be assembled by coupling the plurality of coupling structures 20E linearly. Moreover, for example, a shape-variable multiple junction point extendable structure, which performs a shape variation exceeding an easily anticipated range by coupling the plurality of coupling structures 20E in a frame shape or the like, can be assembled by a relative position with respect to the first one side coupling part 33, the first other side coupling part 34, and the second one side coupling part 73 of the coupling structure 20E, and the first intermediate coupling part 32 and the second intermediate coupling part 72 of the second other side coupling part 74.

According to the eleventh embodiment, a plurality of the coupling structures 20E can be coupled to each other, by simply inserting the convex parts 410A and 420A into the concave parts 410B and 420B and the through hole 430. In this way, since the coupling of a plurality of the coupling structures 20E is performed by a simple means such as the insertion of a convex part, assembly of the multiple junction point extendable structure 110 formed with a plurality of the coupling structures 20E can be easily performed, without using a tool such as a screwdriver.

According to the eleventh embodiment, by fitting the through hole 510 and the projection 520, the coupling structure 20E can be coupled to a different coupling structure 20E. In this way, the multiple junction point extendable structure 110 formed with a plurality of the coupling structures 20E can be widened on a virtual surface that intersects the vertical direction 91.

Twelfth Embodiment

Figure 46:
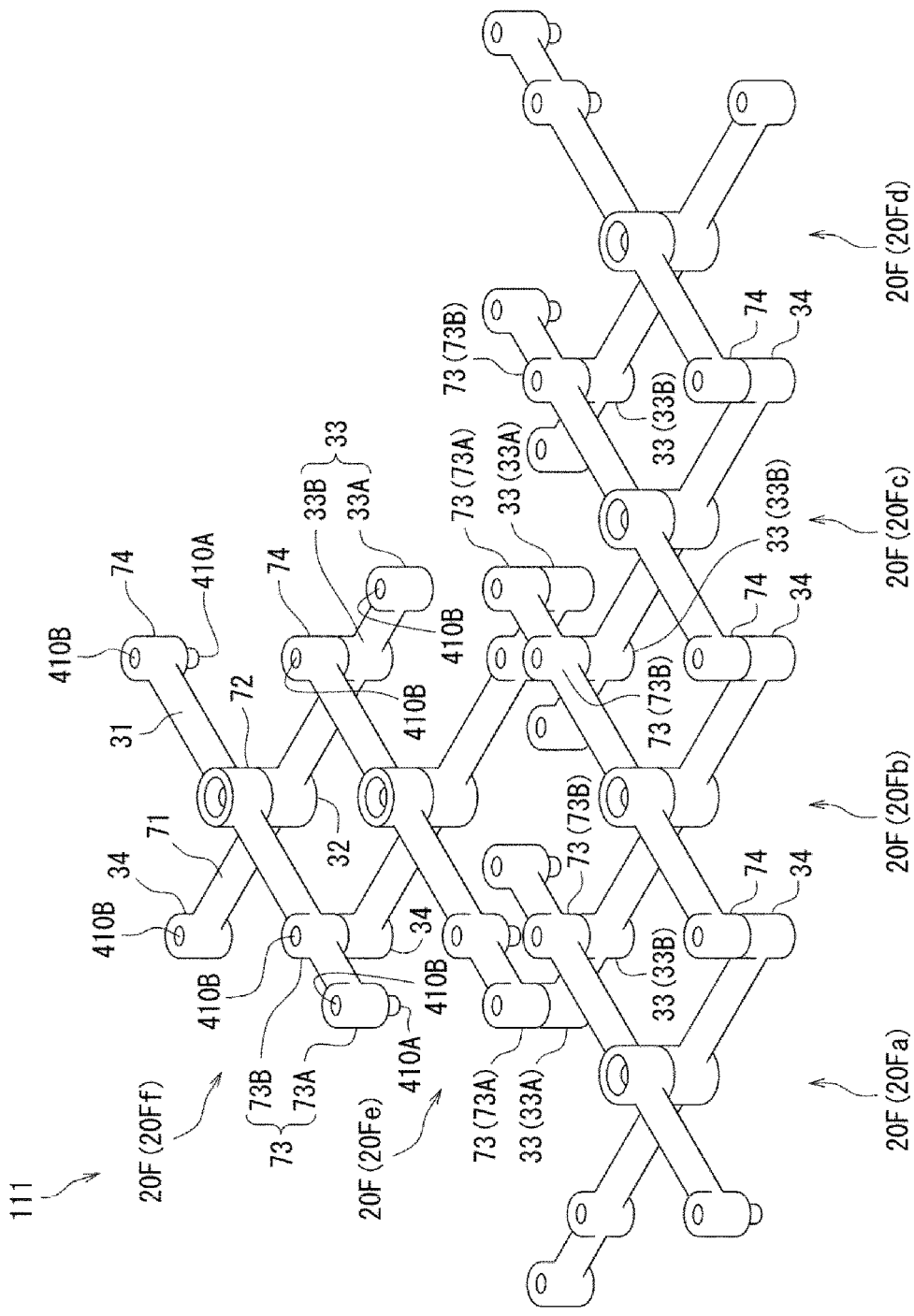
FIG. 46 is a perspective view of a multiple junction point extendable structure relating to a twelfth embodiment of the present invention.

FIG. 46 is a perspective view of a multiple junction point extendable structure including a coupling structure relating to a twelfth embodiment of the present invention.

A multiple junction point extendable structure 111 relating to the twelfth embodiment is different to the multiple junction point extendable structure 106 relating to the seventh embodiment in that it includes a coupling structure 20F. The coupling structure 20F is different to the coupling structure 20A included in the multiple junction point extendable structure 106 relating to the seventh embodiment in that the first rigid member 31 includes a plurality of at least one of the first one side coupling part 33 and the first other side coupling part 34, and the second rigid member 71 includes a plurality of at least one of the second one side coupling part 73 and the second other side coupling part 74. Hereinafter, the differences with the seventh embodiment will be described. Since the common points with the seventh embodiment have the same reference numerals attached, a description of these common points will be, in principle, omitted, and described as necessary.

The multiple junction point extendable structure 111 shown in FIG. 46 includes six of the coupling structures 20F (coupling structures 20Fa to 20Ff). Each of the coupling structures 20Fa to 20Ff has the same configuration. Accordingly, here, the configuration of the coupling structure 20Ff will be described, and a description of the configurations of the another coupling structures 20Fa to 20Fe will be, in principle, omitted, and described as necessary.

The first rigid member 31 of the coupling structure 20Ff includes two first one side coupling parts 33A and 33B. The first one side coupling part 33A is formed on one end part of the first rigid member 31 in a longitudinal direction. The first one side coupling part 33B is formed between the first one side coupling part 33A and the first intermediate coupling part 32.

The second rigid member 71 of the coupling structure 20Ff includes two second one side coupling parts 73A and 73B. The second one side coupling part 73A is formed on one end part of the second rigid member 71 in a longitudinal direction. The second one side coupling part 73B is formed between the second one side coupling part 73A and the second intermediate coupling part 72.

In the multiple junction point extendable structure 111 shown in FIG. 46, each of the four coupling structures 20Fa to 20Fd and the two coupling structures 20Fe and 20Ff are coupled linearly, similar to the seventh embodiment. Moreover, the coupling structure 20Fe is coupled to the coupling structure 20Gb, similar to the seventh embodiment.

However, different to the seventh embodiment, one or both of the first one side coupling parts 33A and 33B are capable of being coupled to the second rigid member 71. Moreover, one or both of the second one side coupling parts 73A and 73B are capable of being coupled to the first rigid member 31.

For example, in the multiple junction point extendable structure 111 shown in FIG. 46, the second one side coupling part 73A of the coupling structure 20Fb is coupled to the first one side coupling part 33A of the coupling structure 20Ge, and the second one side coupling part 73B of the coupling structure 20Fb is coupled to the first one side coupling part 33B of the coupling structure 20Gc. In this case, both the second one side coupling parts 73A and 73B of the coupling structure 20Fb are coupled to the first rigid member 31.

Moreover, for example, in the multiple junction point extendable structure 111 shown in FIG. 46, the first one side coupling part 33B of the coupling structure 20Ff is coupled to the second other side coupling part 74 of the coupling structure 20Fe. On the other hand, the first one side coupling part 33A of the coupling structure 20Ff is not coupled to another coupling structure. In this case, only one of the first one side coupling parts 33A and 33B of the coupling structure 20Ff is coupled to the second rigid member 71.

In the multiple junction point extendable structure 111 shown in FIG. 46, the first rigid member 31 of the coupling structure 20F includes two of the first one side coupling parts 33A and 33B, and one of the first other side coupling part 34. Moreover, the second rigid member 71 of the coupling structure 20F includes two of the second one side coupling parts 73A and 73B and one of the second other side coupling part 74. However, the numbers of the first one side coupling part 33, the first other side coupling part 34, the second one side coupling part 73, and the second other side coupling part 74 are not limited to those described. In other words, the first rigid member 31 of the coupling structure 20F may include one or three or more of the first one side coupling part 33, and may include two or more of the first other side coupling part 34. Moreover, the second rigid member 71 of the coupling structure 20F may include one or three or more of the second one side coupling part 73, and may include two or more of the second other side coupling part 74.

For example, the first rigid member 31 of the coupling structure 20F may include a plurality of the first one side coupling parts 33 and a plurality of the first other side coupling part 34. In other words, the first rigid member 31 includes a plurality of at least one of the first one side coupling parts 33 and the first other side coupling parts 34. Moreover, for example, the second rigid member 71 of the coupling structure 20F may include a plurality of the second one side coupling parts 73 and a plurality of the second other side coupling parts 74. In other words, the second rigid member 71 includes a plurality of at least one of the second one side coupling parts 73 and the second other side coupling parts 74.

In the multiple junction point extendable structure 111 shown in FIG. 46, all of the coupling structures 20F include two of each of the first one side coupling part 33 and the second one side coupling part 73, and include one of each of the first other side coupling part 34 and the second other side coupling part 74. However, the numbers of the first one side coupling part 33, the first other side coupling part 34, the second one side coupling part 73, and the second other side coupling part 74 included in each of the coupling structures 20F may be different.

According to the twelfth embodiment, by a configuration in which one of each of the first one side coupling part 33 and the first other side coupling part 34 is included in the first rigid member 31, many types of coupling states of a plurality of the coupling structures 20F can be performed.

According to the twelfth embodiment, by a configuration in which one of each of the second one side coupling part 73 and the second other side coupling part 74 is included in the second rigid member 71, many types of coupling states of a plurality of coupling structures 20F can be performed.

Figure 47:
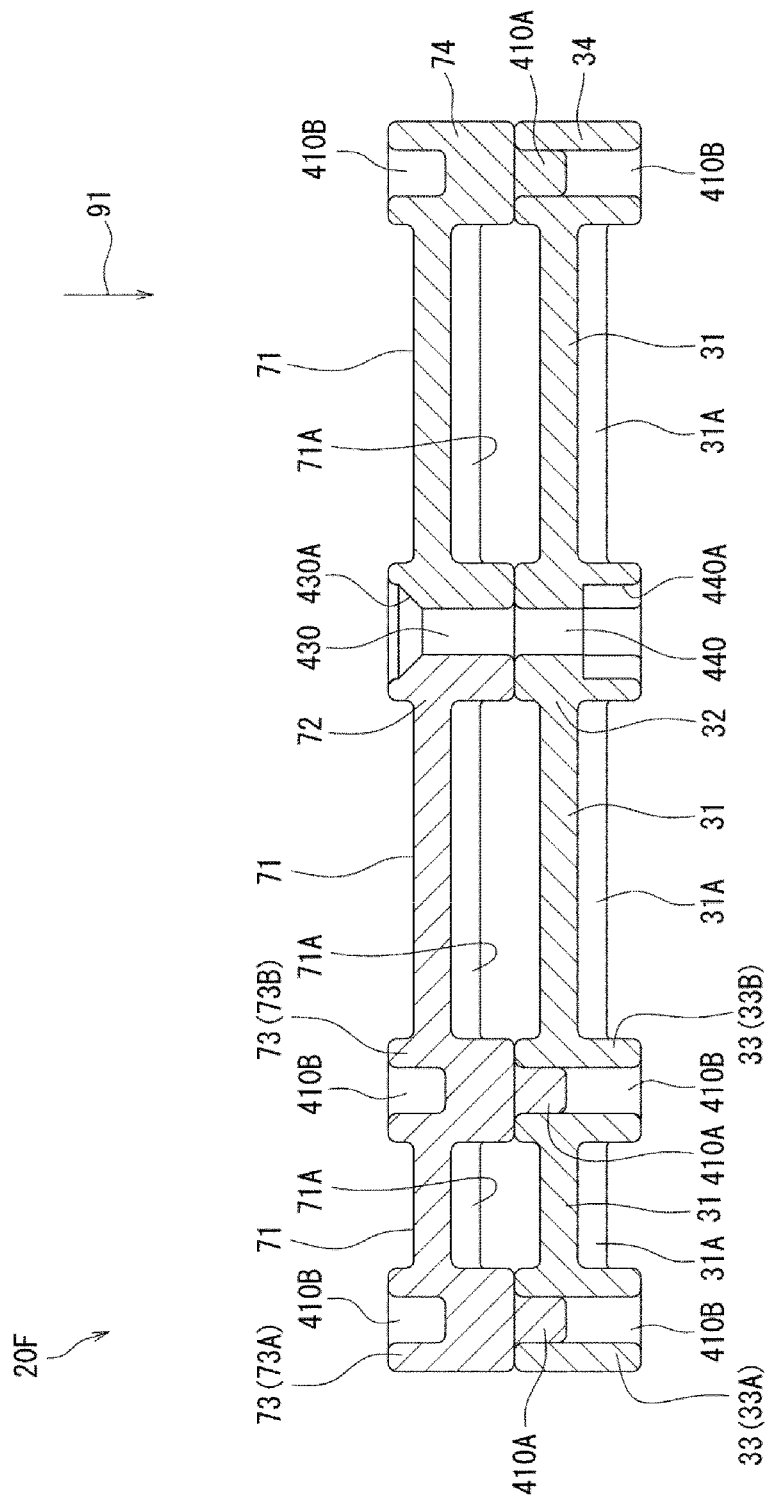
FIG. 47 is a vertical section view of a coupling structure included in a multiple junction point extendable structure relating to a twelfth embodiment of the present invention.

FIG. 47 is a vertical section view of a coupling structure included in a multiple junction point extendable structure relating to the twelfth embodiment of the present invention. In the twelfth embodiment, the coupling between the first intermediate coupling part 32 and the second intermediate coupling part 72 is different to that of the other embodiments.

In the coupling structure 20F shown in FIG. 47, the first intermediate coupling part 32 and the second intermediate coupling part 72 are coupled by a bolt (not illustrated) and a nut (not illustrated). The first intermediate coupling part 32 includes a through hole 440 such as shown in FIG. 47, instead of the convex part 410A and concave part 410B (refer to FIG. 37). A counter bore 440A that matches the shape of the nut is formed on the lower part of the through hole 440. Moreover, a counter bore 430A that matches the shape of the flat head of the bolt is formed on the upper part of the through hole 430 of the second intermediate coupling part 72. The first intermediate coupling part 32 and the second intermediate coupling part 72 are rotatably coupled to each other, by screwing together the nut fitted into the counter bore 440A and the bolt that penetrates through the through holes 430 and 440.

The configuration of the coupling between the first intermediate coupling part 32 and the second intermediate coupling part 72 described above can also be applied to the other embodiments. Moreover, the configuration of the coupling between the first intermediate coupling part 32 and the second intermediate coupling part 72 in the other embodiments may be applied to the twelfth embodiment. Moreover, the configuration of the first intermediate coupling part 32 and the second intermediate coupling part 72 described above may be applied to the first one side coupling part 33, the first other side coupling part 34, the second one side coupling part 73, and the second other side coupling part 74.

While the present invention is sufficiently described in association with preferred embodiments, while referring to appropriate figures, various transformations or modifications will be obvious for people skilled in this technology. Such transformations or modifications should be understood as included within the scope of the present invention, as long as they do not deviate from the scope of the present invention according to the attached claims.

INDUSTRIAL APPLICABILITY

The multiple junction point extendable structure relating to the present invention not only simply extends and contracts, but also has rigid members coupled via coupling structures. Accordingly, it is easy to provide multiple junction points of the rigid members.

Moreover, an interlocking extendable structure relating to the present invention can variously set the proportion of extension and contraction and the size of extension and contraction of a plurality of extendable arms coupled via the interlocking extendable structure. Accordingly, a structure capable of various types of complicated extension and contraction actions can be constructed.

Moreover, the coupling structure relating to the present invention can be configured to extend and contract and configured to enable shape variation, by combining a plurality of the coupling structures. A coupling structure can be coupled with another coupling structure along both the vertical direction 91 and the horizontal direction 92. Accordingly, a three-dimensional structure can be assembled. In other words, by this coupling structure, a multiple junction point extendable structure or an interlocking extendable structure of various types of shapes, which are configured so that at least one of extension and contraction and shape variation is enabled, can be assembled.

A user, who is provided from a manufacturer with a necessary number of coupling structures, based on the function, shape, size, and material of a multiple junction point extendable structure or an interlocking extendable structure planned by the user himself or herself, can implement this multiple junction point extendable structure or interlocking extendable structure by assembling by himself or herself, from a provided necessary number of coupling structures. Since the user himself or herself assembles a multiple junction point extendable structure or an interlocking extendable structure, the user can obtain a multiple junction point extendable structure or an interlocking extendable structure at a lower cost than purchasing a completed product of a multiple junction point extendable structure or an interlocking extendable structure from a manufacturer.

The coupling system of the coupling structures relating to the present invention is a system by simple convex/concave fitting. Accordingly, not only people having professional knowledge of design or professional skill of manufacturing, but also men and woman of all ages, which include children, elderly people, and people with disabilities, can be assumed as the user. For example, in the case where a child assembles a three-dimensional structure, familiarity of geometrical three-dimensional structures of the child can be increased. Moreover, a favorable influence can be expected for the way of work, income, and communication with other people, of elderly people and people with disabilities.

Moreover, a panel can be installed on individual coupling structures constituting a multiple junction point extendable structure or an interlocking extendable structure. An example of the installation of a panel is described as the groove 31A formed on the first rigid member 31.

Moreover, in the multiple junction point extendable structure, coupling structure, and interlocking extendable structure relating to the present invention, various types of materials can be adopted, as the rigid members. Moreover, in the multiple junction point extendable structure, coupling structure, and interlocking extendable structure relating to the present invention, various shapes of the rigid members can be used. The multiple junction point extendable structure, coupling structure, and interlocking extendable structure can be applied to, for example, products capable of being assembled by a user as a kit, and products using materials that break easily such as glass and porcelain, by taking into consideration these features.

According to the above description, a fabric, curtain, tapestry, clothing, colored pencil, interior, art object, art, decoration, illumination, lighting equipment including a light-emitting diode (LED) and an organic electro-luminescence EL (OEL), child's toys such as education toys, and model toys for use not only by children, but also by adults, can be provided, for example, as specific products capable of applying the multiple junction point extendable structure, coupling structure, and interlocking extendable structure relating to the present invention.

Moreover, the multiple junction point extendable structure, coupling structure, and interlocking extendable structure relating to the present invention can be applied, for example, to a tent, partition, furniture, body of a vehicle or the like, fence for surrounding a child or pet (child circle or pet circle), container, delivery box, room, building (for example, mansion apartment, apartment, bridge, antenna, radio tower or the like), or vegetable factory.

Moreover, the multiple junction point extendable structure, coupling structure, and interlocking extendable structure relating to the present invention can be applied to buildings used and installed in space (outer space or the moon surface), on the sea, within the sea, and on the sea floor.

REFERENCE SIGNS LIST

10 Multiple Junction Point Extendable Structure
20 Coupling Structure
20A Coupling Structure
20K Coupling Structure (Intervening Part)
21 Rigid Member
22 Rigid Member
23 Rigid Member
31 First Rigid Member (Rigid Member)
32 First Intermediate Coupling Part (Horizontal Coupling Part)
32a Bottom Surface (First Surface)
32b Bottom Surface (First Surface)
32c Side Surface (Second Surface)
33 First One Side Coupling Part (Other Side Coupling Part, Support Coupling Part, Horizontal Coupling Part)
33a Bottom Surface (First Surface)
33b Bottom Surface (First Surface)
33c Side Surface (Second Surface)
34 First Other Side Coupling Part (Other Side Coupling Part, Support Coupling Part, Horizontal Coupling Part)
34a Bottom Surface (First Surface)
34b Bottom Surface (First Surface)
34c Side Surface (Second Surface)
35 First Joint Member (Horizontal Joint Member)

36 Second Joint Member (Horizontal Joint Member)
40 Horizontal Coupling Part
40A Bottom Surface (First Surface)
40B Bottom Surface (First Surface)
40C Side Surface (Second Surface)
40D Hole (Fitting Part)
40E Convex Part
40Ea Outside Surface
40Eb Projection
40Ec Annular Groove
40Ed Notched Part
40F Concave Part
40Fa Inner Side Surface
40Fb Annular Groove
40Fc Notched Part
40Ka Groove Part
40Kb Groove Part
41 Horizontal Coupling Part (Intermediate Coupling Part)
42 Horizontal Coupling Part (Intermediate Coupling Part)
49 Horizontal Coupling Part (High Back Coupling Part)
50 Holding Mechanism
60 Extension Coupling Part
60C Extension Part
71 Second Rigid Member (Rigid Member)
72 Second Intermediate Coupling Part (Horizontal Coupling Part)
73 Second One Side Coupling Part (One Side Coupling Part, Support Coupling part, Horizontal Coupling Part)
74 Second Other Side Coupling Part (Other Side Coupling Part, Support Coupling Part, Horizontal Coupling Part)
80 Vertical Coupling Part (Vertical Joint Member)
80D Support Part (Inserted Part)
81 Vertical Joint Member
200A Extendable Arm (Second Extendable Arm)
200B Extendable Arm (First Extendable Arm)
311 One Side Rigid Member
312 Other Side Rigid Member
410A Convex Part (First Convex Part)
410B Concave Part (First Concave Part)
420A Convex Part (Second Convex Part)
420B Concave Part (Second Concave Part)
420C Through Hole (Inserted Part)
430 Through Hole (First Concave Part)

The invention claimed is:

1. A coupling structure used for a shape-variable member configured to extend and contract by coupling a plurality of coupling structures, the coupling structure comprising:
   a first member having a first intermediate coupling part, a pair of first extension parts extending laterally from the first intermediate coupling part, and a first end side coupling part on an end side of each of the first extension parts, the pair of first extension parts extending linearly or in an arc shape via the first intermediate coupling part; and
   a second member having a second intermediate coupling part, a pair of second extension parts extending laterally from the second intermediate coupling part, and a second end side coupling part on an end side of each of the second extension parts, the pair of second extension parts extending linearly or in an arc shape via the second intermediate coupling part,
   wherein one of a convex shaped engaging part and a concave shaped engaged part capable of being engaged with the engaging part is arranged on a first facing part facing the second intermediate coupling part in the first intermediate coupling part,
   wherein the other of the engaging part and the engaged part is arranged on a second facing part facing the first facing part in the second intermediate coupling part,
   wherein one of the engaging part and the engaged part arranged on the first facing part engages with the other of the engaging part and the engaged part arranged on the second facing part to form a coupling structure in which the first intermediate coupling part and the second intermediate coupling part are coupled oppositely in a vertical direction, and to enable a rotation action centered on a rotation axis extending in the vertical direction,
   wherein the engaging part or the engaged part is arranged on a first opposing part positioned on an opposite side in the vertical direction to the first facing part in the first intermediate coupling part, and another coupling structure is coupled by stacking in the vertical direction to enable a rotation action centered on a rotation axis extending in the vertical direction,
   wherein one of each of a convex shaped end side engaging part and a concave shaped end side engaged part capable of being engaged with the end side engaging part is arranged on each of the first end side coupling part and the second end side coupling part,
   wherein the first end side coupling part engages with one of the first end side coupling part and the second end side coupling part of the another coupling structure to enable a rotation action centered on a rotation axis extending in the vertical direction,
   wherein the second end side coupling part engages with the other of the first end side coupling part and the second end side coupling part of the another coupling structure to enable a rotation action centered on a rotation axis extending in the vertical direction, and
   wherein the first member and the second member constituting one of the coupling structures intersect in an X-shape when seen from the vertical direction by positioning the first end side coupling parts on different sides straddling the second member and positioning the second end side coupling parts on different sides straddling the first member.

2. The coupling structure according to claim 1, further comprising:
   a third end side coupling part arranged between the first intermediate coupling part and the first end side coupling part on each of the pair of first extension parts, and/or a fourth end side coupling part arranged between the second intermediate coupling part and the second end side coupling part on each of the pair of second end side coupling parts,
   wherein the end side engaging part or the end side engaged part is arranged on at least one of a portion facing one of the third end side coupling parts in the vertical direction or a portion facing the other one of the third end side coupling parts in the vertical direction, and/or the end side engaging part or the end side engaged part is arranged on at least one of a portion facing one of the fourth end side coupling parts in the vertical direction or a portion facing the other one of the fourth end side coupling parts in the vertical direction.

3. The coupling structure according to claim 1,
   wherein at least one of the first intermediate coupling part, the second intermediate coupling part, the first end side coupling part, and the second end side coupling part is longer in the vertical direction than the other of the first intermediate coupling part, the second intermediate coupling part, the first end side coupling part, and the second end side coupling part.

4. The coupling structure according to claim 1, further comprising:
a plate shaped member extending in the vertical direction and laterally,
wherein at least one of the first intermediate coupling part, the second intermediate coupling part, the first end side coupling part, and the second end side coupling part has a groove part recessed in the vertical direction and extending laterally, and
wherein the plate shaped member is fitted into the groove part.

5. The coupling structure according to claim 1, further comprising:
a horizontal joint member arranged on at least one of the first end side coupling part and the second end side coupling part to enable a coupling to another coupling structure,
wherein the horizontal joint member has a horizontal joint convex part protruding laterally, and a horizontal joint concave part capable of being engaged with the horizontal joint convex part, and
wherein the horizontal joint member is rotatably supported around a rotation axis extending in the vertical direction by the arranged first end side coupling part or second end side coupling part.

6. The coupling structure according to claim 1, further comprising:
a vertical joint member arranged on at least one of the first end side coupling part and the second end side coupling part to enable a coupling to another coupling structure,
wherein the vertical joint member has a vertical joint convex part protruding laterally and capable of being engaged with the engaged part or the end side engaged part of the another coupling structure, or a vertical joint concave part recessed laterally and capable of being engaged with the engaging part or the end side engaging part of the another coupling structure, and
wherein the vertical joint member is rotatably supported around a rotation axis extending in the vertical direction by the arranged first end side coupling part or second end part coupling part.

7. The coupling structure according to claim 6,
wherein the vertical joint member has a support part for rotatably supporting at least one of the first extension part, the second extension part, the first end side coupling part, and the second end side coupling part in the another coupling structure, and
wherein the another coupling structure supported by the support part is rotatable around a rotation axis extending laterally with respect to the support part.

8. The coupling structure according to claim 1, further comprising:
a flat plate shaped extension coupling part connected to at least one of the first end side coupling part and the second end side coupling part,
wherein the extension coupling part is rotatable around a rotation axis extending in the vertical direction with respect to the connected first end side coupling part or second end side coupling part.

9. The coupling structure according to claim 1,
wherein a first hole is formed in at least one of a side surface of the first intermediate coupling part and a side surface of the first end side coupling part, the first extension part having a one-rod shape capable of being inserted into the first hole, and/or wherein a second hole is formed in at least one of a side surface of the second intermediate coupling part and a side surface of the second end side coupling part, the second extension part having a one-rod shape capable of being inserted into the second hole.

10. The coupling structure according to claim 1,
wherein the first extension part is attachable and detachable with respect to at least one of the first intermediate coupling part and the first end side coupling part, and/or the second extension part is attachable and detachable with respect to at least one of the second intermediate coupling part and the second end side coupling part.

11. The coupling structure according to claim 1,
wherein the first extension part is integrated with respect to at least one of the first intermediate coupling part and the first end side coupling part, and/or the second extension part is integrated with respect to at least one of the second intermediate coupling part and the second end side coupling part.

12. The coupling structure according to claim 1,
wherein the engaging part takes an engaging state or a separation state with respect to the engaged part, and/or the end side engaging part takes an engaging state or a separation state with respect to the end side engaged part.

13. The coupling structure according to claim 12, further comprising:
a holding mechanism for holding an engaging state of the engaging part with respect to the engaged part or an engaging state of the end side engaging part with respect to the end side engaged part.

14. The coupling structure according to claim 13,
wherein the holding mechanism has
a projection provided on each of the engaging part and the end side engaging part, or on each of the engaged part and the end side engaged part,
an annular groove formed on each of the engaging part and the end side engaging part, or on each of the engaged part and the end side engaged part, to enable an engagement with the projection, and
a notched part enabling the projection to be inserted into and pulled out of the annular groove.

15. The coupling structure according to claim 1,
wherein the engaging part and the end side engaging part each have a tapered truncated cone shape or cone shape.

16. The coupling structure according to claim 1,
wherein the pair of first extension parts and the pair of second extension parts each have a curved shape.

17. The coupling structure according to claim 1,
wherein the pair of first extension parts and the pair of second extension parts each have a shape bent in a V-shape when seen from the vertical direction.

18. The coupling structure according to claim 1,
wherein the pair of first extension parts and the pair of second extension parts each have rigidity.

19. The coupling structure according to claim 1,
wherein the pair of first extension parts and the pair of second extension parts each have a round pipe shape, a round rod shape, a rectangular section shape, a plate shape, or a three-dimensional structure.

20. The coupling structure according to claim 1,
wherein the pair of first extension parts and the pair of second extension parts are each made of a resin, glass, porcelain, wood, bamboo, or metal material.

21. The coupling structure according to claim 1, wherein at least one of a bending angle formed by the pair of first extension parts and a bending angle formed by the pair of second extension parts is variable.

22. A shape-variable member constituted by coupling a plurality of the coupling structures according to claim 1.

* * * * *